(12) United States Patent
Honda

(10) Patent No.: US 7,665,380 B2
(45) Date of Patent: Feb. 23, 2010

(54) HYPOID GEAR DESIGN METHOD

(75) Inventor: Sho Honda, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 10/204,413

(22) PCT Filed: Feb. 27, 2001

(86) PCT No.: PCT/JP01/01450

§ 371 (c)(1),
(2), (4) Date: Aug. 28, 2002

(87) PCT Pub. No.: WO01/65148

PCT Pub. Date: Sep. 7, 2001

(65) Prior Publication Data
US 2003/0056371 A1 Mar. 27, 2003

(30) Foreign Application Priority Data
Feb. 29, 2000 (JP) ............................... 2000-054886

(51) Int. Cl.
*F16H 55/17* (2006.01)
(52) U.S. Cl. .......................................... 74/458; 74/416
(58) Field of Classification Search ................... 74/409, 74/425, 458, 459.5, 462, 468, 416; 29/898.067, 29/898.068, 898.066, 898.065, 898.064, 29/898.063, 898.062, 898
See application file for complete search history.

(56) References Cited

U.S. PATENT DOCUMENTS

| 1,694,028 | A | * | 12/1928 | Wildhaber | .................. 74/459.5 |
| 2,896,467 | A | | 7/1959 | Saari | |
| 2,954,704 | A | * | 10/1960 | Saari | ............................ 74/466 |
| 3,768,326 | A | * | 10/1973 | Georgiev et al. | ............... 74/425 |
| 5,174,699 | A | * | 12/1992 | Faulstich | ....................... 409/26 |
| 5,454,702 | A | * | 10/1995 | Weidhass | ................... 418/206.5 |
| 5,802,921 | A | * | 9/1998 | Rouverol | ...................... 74/458 |
| 5,941,124 | A | * | 8/1999 | Tan | ............................... 74/409 |
| 6,128,969 | A | * | 10/2000 | Litvin et al. | ................... 74/458 |
| 6,129,793 | A | * | 10/2000 | Tan et al. | ..................... 148/586 |
| 6,537,174 | B2 | * | 3/2003 | Fleytman | ..................... 475/228 |
| 6,602,115 | B2 | * | 8/2003 | Tan | .............................. 451/47 |

FOREIGN PATENT DOCUMENTS

| JP | 6-341508 | 12/1994 |
| JP | 7-208582 | 8/1995 |
| JP | 8-28659 | 2/1996 |
| JP | 9-32908 | 2/1997 |
| JP | 9-53702 | 2/1997 |
| JP | 10-331957 | 12/1998 |
| WO | 99/58878 | 11/1999 |

* cited by examiner

*Primary Examiner*—Richard W L Ridley
*Assistant Examiner*—Terence Boes
(74) *Attorney, Agent, or Firm*—Oblon, Spivak, McClelland, Maier & Neustadt, L.L.P.

(57) ABSTRACT

A hypoid gear tooth surface design method, wherein normal lines and helical angles of two tooth surfaces are properly selected so as to position action limit curves ($L_{3Acc}$) on the outer of the areas ($R_{2t}$ to $R_{2h}$) where the tooth surfaces are formed, whereby undercut to a gear small end side can be prevented and, by setting the involute helicoids of two tooth surfaces on a pinion side to an equal lead, a pinion top land and a gear top land ($z_{2h}=0$) can be made generally equal to each other in tooth lengthwise direction, such that sharpening of the top land can be prevented.

25 Claims, 41 Drawing Sheets

$V_s (0 \leq \Gamma_s \leq \pi/2)$ $V_s (\pi/2 < \Gamma_s \leq \pi)$

PLANE $S_H$

US 7,665,380 B2

HYPOID GEAR DESIGN METHOD

TECHNICAL FIELD

The present invention relates to a hypoid gear tooth surface design method.

BACKGROUND ART

The applicant of the application concerned has proposed a method for uniformly describing a tooth surface of a pair of gears in Japanese Patent Laid-Open Publication No. Hei 9-53702. That is, a method for describing a tooth surface, which can uniformly be used in various situations including for a pair of parallel axes gears, which is the most widely used configuration, and a pair of gears whose axes do not intersect and are not parallel with each other (skew position), has been shown. Furthermore, it has been shown that, in power transmission gearing, it is necessary that the path of contact of the tooth surfaces should be a straight line in order to reduce a fluctuation of a load applied to bearings supporting shafts of gears. In addition, it has been clarified that a configuration wherein at least one tooth surface is an involute helicoid and the other tooth surface is a conjugate surface satisfies the condition that a path of contact of the tooth surfaces should be a straight line. In the case of parallel axes gears, such as spur gears, helical gears, this conclusion is identical with a conclusion of a conventional design method.

Furthermore, conventional gear design methods for non-parallel axes gears have been empirically obtained.

In the case of non-parallel axes gears, it has not yet been clarified that there actually exists a pair of gears wherein one gear has an involute helicoidal tooth surface and the other gear has a conjugate tooth surface for the involute helicoidal tooth surface and, further, an efficient method for obtaining such a pair of tooth surfaces was unknown.

DISCLOSURE OF INVENTION

An object of the present invention is to provide a method for designing a gear set, in particular a gear set comprising a pair of gears whose axes do not intersect and which are not parallel with each other.

The present invention provides a design method for a pair of gears whose axes do not intersect and are not parallel with each other, such as hypoid gears. Hereinafter, a small diameter gear in a pair of hypoid gears is referred to as a pinion and a large diameter gear is referred to as a large gear. In this specification, hypoid gears include a pair of gears in which a pinion is a cylindrical gear having its teeth formed on a cylinder and a large gear is a so-called face gear having teeth on a surface perpendicular to an axis of a disk.

Tooth surfaces of a hypoid gear can be described by a method disclosed in Japanese Patent Laid-Open Publication No. Hei 9-53702 described above.

First, let us consider (a) a stationary coordinate system in which one of three orthogonal coordinate axes coincides with a rotation axis of the gear and one of other two coordinate axes coincides with a common perpendicular for the rotation axis of the gear and the rotation axis of the mating gear to be engaged with the gear, (b) a rotary coordinate system in which one of three orthogonal coordinate axes coincides with the axis of the stationary coordinate system that coincides with the rotation axis of the gear, the rotary coordinate system rotates about the coincided axis together with the gear, and other two coordinate axes of three orthogonal coordinate axes coincide with other two coordinate axes of the stationary coordinate system respectively when the rotation angle of the gear is 0, and (c) a parameter coordinate system in which the stationary coordinate system is rotated about the rotation axis of the gear so that one of other two coordinate axes of the stationary coordinate system becomes parallel with the plane of action of the gear, respectively. Next, in the parameter coordinate system, a path of contact of a pair of tooth surfaces of the gear and the mating gear which are engaging with each other during the rotation of the gears and an inclination angle of the common normal which is a normal at each point of contact for the pair of tooth surfaces are described in terms of a first function, in which a rotation angle of the gear is used as a parameter. Furthermore, in the stationary coordinate system, the path of contact and the inclination angle of the common normal are described respectively in terms of a second function, in which a rotation angle of the gear is used as a parameter, based on the first function and the relationship between the relative positions of the stationary coordinate system and the parameter coordinate system. Furthermore, the path of contact and the inclination angle of the common normal in the stationary coordinate system are acquired, respectively, and in the rotary coordinate system, a tooth profile is obtained by describing the path of contact and the inclination angle of the common normal, respectively, in terms of a third function, in which a rotation angle of the gear is used as a parameter, based on the second function and the relationship between the relative positions of the rotary coordinate system and the stationary coordinate system.

From the obtained tooth profile, the surface of action for the pair of tooth surfaces is obtained. In a gear pair wherein a tooth surface of one gear (first gear) is an involute helicoid and the other gear (second gear) has a tooth surface conjugated with the tooth surface of the first gear, in the obtained surface of action, a zone where effective contact of a pair of tooth surfaces is realized (hereinafter, referred to as an effective surface of action) is limited to a part of the obtained surface of action. First, the effective surface of action must exist between action limit curves which are orthogonal projections of the axes of the two gears on the surface of action. Further, the effective surface of action must exist on the root side of a surface generated by the top of the gear, that is, a trajectory surface of the top of the gear due to the rotation of the gear. Therefore, the effective surface of action must exist between the line of intersection of the face surface formed by the rotation of the top of the gear and the surface of action (hereinafter, referred to as a tip line) and the action limit curves. Therefore, it is preferable that the area enclosed by the action limit curves and the tip line (that is, the effective surface of action) exists at least over the whole facewidth of the gear. When the effective surface of action exists on only a part of the facewidth, the residual facewidth is not useful as a gear, and such a design is nonsensical, or at least wasteful.

Furthermore, in order to actually form gear teeth, it is necessary that the teeth have necessary strength. Specifically, a required thickness must be given to a tooth surface of a drive side and a tooth surface of a coast side, and a root must be thicker than a top in a normal cross section profile of a tooth. In order to make the root sufficiently thick, it is necessary to properly select an intersection angle of the respective paths of contact for the tooth surface of the drive side and the tooth surface of the coast side. It is empirically appropriate that the intersection angle of the respective paths of contact for the tooth surface of the drive side and the tooth surface of the coast side is selected to be in the range from 38° to 40°, which corresponds to the vertex angle in conventional racks. Furthermore, it is empirically appropriate that the line of contact in the drive side is selected so as to nearly coincide with one of the limiting paths of contact ($g_{2z}$, $g_t$, $g_{1K}$) described below.

In order to generate the tooth described above on the first gear, it is necessary to acquire a profile of an equivalent rack. It can be considered that the equivalent rack is a generalized rack for involute spur gears.

Furthermore, when the tooth surface of the second gear is obtained using the determined path of contact and the face surface of the second gear is given, the tip lines for both normal and coast sides are obtained and the distance between both tip lines can be obtained; a small distance indicates that the face surface width of the second gear is narrow.

The effective surface of action is likely to be insufficient at a small end of a large gear, and the distance between both tip lines of the second gear (face surface width) is likely to be insufficient at a large end. When the effective surface of action is insufficient at a small end side, a design reference point is shifted toward the small end side of the gear, and acquisition of the tooth profile and the effective surface of action are carried out again. Further, when the distance between both tip lines is insufficient at the large end side, a design reference point is shifted toward the large end side of the large gear, and acquisition of the tooth profile and the effective surface of action is carried out. When the effective surface of action is insufficient at a small end side, and at the same time, the distance between both tip lines is insufficient at the large end side, the facewidth is reduced.

The above design processes can be executed using a computer by describing the processes by a predetermined computer program. Input means for receiving specifications of gears and selection of variables and output means for outputting design results or calculated results until a midterm stage of the design processes are connected to the computer.

BEST MODE FOR CARRYING OUT THE INVENTION

Hereinafter, embodiments of the present invention are described in accordance with the attached drawings. First, the gear design method disclosed in Japanese Patent Laid-Open Publication No. Hei 9-53702 is described.

A. New Tooth Profile Theory

1. Tooth Profile in the New Tooth Profile Theory

Figure 1:
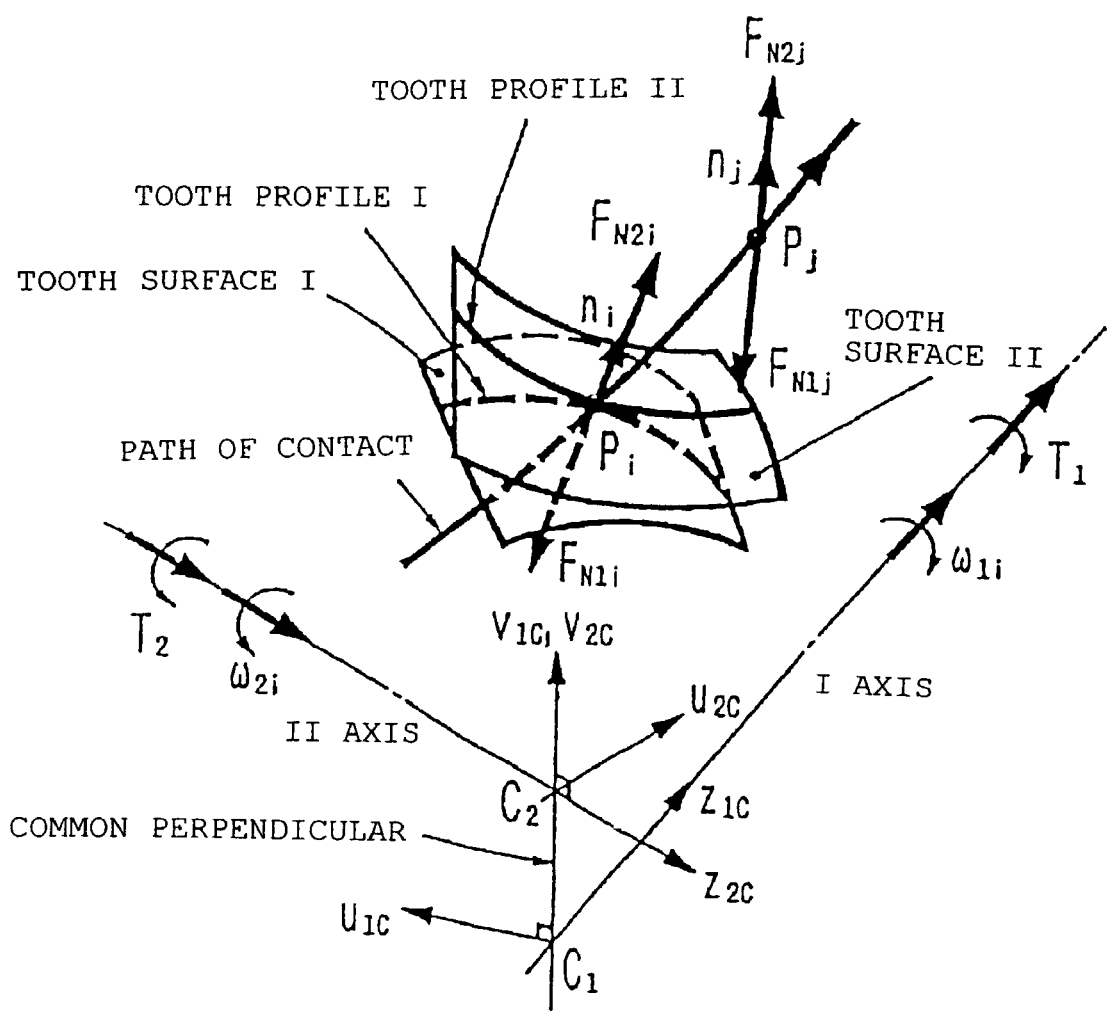
FIG. 1 is a schematic figure showing coordinate axes of respective coordinate systems, tooth surfaces of gears, tooth profiles, and a path of contact.

FIG. 1 shows a state of tooth surfaces I, II contacting each other at point $P_i$. The tooth surfaces I, II rotate at angular velocities $\omega_{1i}$, $\omega_{2i}$ (being vectors having normal directions shown in the figure), respectively, and respectively transmit certain input and output torque $T_1$, $T_2$ (having normal vectors in the same directions as those of the angular velocities $\omega_{1i}$ and $\omega_{2i}$, respectively) at a certain instance. In the aforesaid contact state, the tooth surface II receives a normal force $F_{N2i}$ of a concentrated load, and the tooth surface I receives a normal force $F_{N1i}$ (=−$F_{N2i}$) as the reaction of the normal force $F_{N2i}$. If a common normal of the tooth surfaces I, II at the point of contact $P_i$ is expressed by a unit vector $n_i$, the $n_i$, on the other hand, indicates a line of action (directed) of the normal force of the concentrated load.

If it is supposed that, when a pair of gears has rotated to a certain angular extent, the point of contact has moved to $P_j$ and the angular velocities have changed to $\omega_{1j}$, $\omega_{2j}$, and further the normal forces of the concentrated load have changed to $F_{N1j}$, $F_{N2j}$, $P_iP_j$ draws a path of contact such that common normals are $n_i$, $n_j$, respectively, at each point of contact. If the path of contact $P_iP_j$ and the common normals $n_i$, $n_j$ are transformed into a space rotating with each gear, the path of contact $P_iP_j$ is defined as a space curve on which the tooth profiles I, II transmit quite the same motion as those of the tooth surfaces I, II, and the path of contact $P_iP_j$ expresses a path of movement (tooth bearing) of the concentrated load on the tooth surface. The tooth profiles I, II are tooth profiles in the new tooth profile theory, and the tooth profiles I, II are space curves having a normal (or a microplane) at each point.

Consequently, when considering a contact state of the tooth surfaces I, II nearby a point of contact and mechanical motions of the pair of gears, it is sufficient to consider the tooth profiles I, II in place of the tooth surfaces I, II. Furthermore, if the Tooth profiles I, II are given, the tooth surfaces I, II transmitting quite the same mechanical motions may be a pair of curved surfaces including the tooth profiles I, II and not interfering with each other, with the pair of tooth surfaces being conjugate to each other being only one possible configuration.

As used herein, the concentrated load and its point of action refer to a resultant force of a distributed load (forming an osculating ellipse) of an arbitrary pair of tooth surfaces and its point of action. Consequently, the point of contact is the point of action of the concentrated load on the other hand, and the point of contact includes a deflection according to the concentrated load. Furthermore, because each of the pair of tooth surfaces is the same curved surface having one pitch of a phase difference from each other, the pair of tooth surfaces draws the same path of contact (including a deflection) in a static space according to its loaded state. In a case wherein a plurality of tooth surfaces are engaged with each other, concentrated loads borne by an adjoining pair of tooth surfaces at arbitrary rotation angles are in a row on the path of contact in the state of their phases being shifted from each other by pitches.

2. Basic Coordinate System

Figure 2:
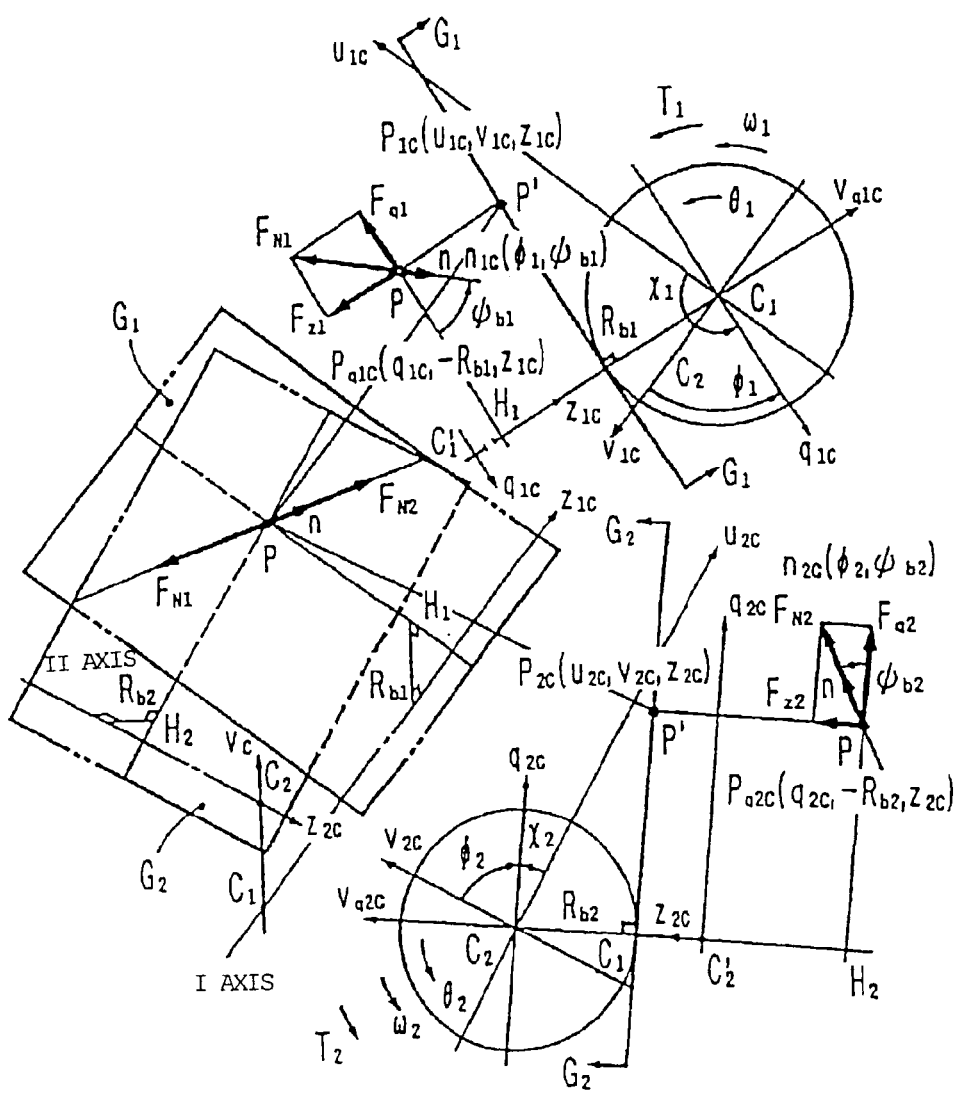
FIG. 2 is a figure for explaining relationships between respective coordinate systems.

For an arbitrary point P on a path of contact $P_iP_j$, FIG. 2 shows the point P, normal forces $F_{N2}$, $F_{N1}$ of the concentrated loads at the point P, and a common normal n (a line of action of the concentrated load) at the point P by means of coordinate systems $C_1$, $C_2$ and coordinate systems $C_{q1}$, $C_{q2}$.

A shaft angle $\Sigma$, an offset E ($\geq$0, a distance between a point $C_1$ and a point $C_2$), and the directions of angular velocities $\omega_1$, $\omega_2$ of two axes I, II are given. It is supposed that, when a common perpendicular of the two axes I, II is made to have a direction in which the direction of $\omega_2 \times \omega_1$ is positive to be a directed common perpendicular $v_c$, the intersection points of the two axes I, II and the common perpendicular $v_c$ are designated by $C_1$, $C_2$ and a situation wherein the $C_2$ is on the $C_1$ with respect to the $v_c$ axis will be considered in the following. A case wherein the $C_2$ is under the $C_1$ would be very similar.

Planes including the normal force $F_{N2}$ (common normal n) of the concentrated load and parallel to each of the gear axes I, II are defined as planes of action $G_1$, $G_2$. Consequently, the $F_{N2}$ (common normal n) exists on the line of intersection of the planes of action $G_1$, $G_2$. Cylinders being tangent to the planes of action $G_1$, $G_2$ and having axes being the axis of each gear are defined as base cylinders, and their radii are designated by reference marks $R_{b1}$, $R_{b2}$.

The coordinate systems $C_2$, $C_{q2}$ of a gear II are defined as follows. The origin of the coordinate system $C_2$ ($u_{2c}$, $v_{2c}$, $z_{2c}$) is set at $C_2$, its $z_{2c}$ axis is set to extend into the $\omega_2$ direction on a II axis, its $V_{2c}$ axis is set as the common perpendicular $v_c$ in the same direction as that of the common perpendicular $v_c$, and its $u_{2c}$ axis is set to be perpendicular to both the axes to form a right-handed coordinate system. The coordinate system $C_{q2}$ ($q_2$, $v_{q2}$, $z_{2c}$) has the origin $C_2$ and the $z_{2c}$ axis in common, and is a coordinate system formed by the rotation of the coordinate system $C_2$ around the $z_{2c}$ axis as a rotation axis by $\chi_2$ (the direction shown in the figure is positive) such that the plane $v_{2c}$ (=0) is parallel to the plane of action $G_2$. Its $u_{2c}$ axis becomes a $q_{2c}$ axis, and its $v_{2c}$ axis becomes a $v_{q2c}$ axis.

The plane of action $G_2$ is expressed by $v_{q2c}$=−$R_{b2}$ by means of the coordinate system $C_{q2}$. To the coordinate system $C_2$, the inclination angle of the plane of action $G_2$ to the plane $v_{2c}$ (=0) is the angle $\chi_2$, and the plane of action $G_2$ is a plane tangent to the base cylinder (radius $R_{b2}$).

The relationships between the coordinate systems $C_2$ and $C_{q2}$ become as follows because the $z_{2c}$ axis is in common.

$$u_{2c} = q_{2c} \cos\chi_2 - v_{q2c} \sin\chi_2$$

$$v_{2c} = q_{2c} \sin\chi_2 + v_{q2c} \cos\chi_2$$

Because the plane of action $G_2$ meets $v_{q2c} = -R_{b2}$, the following expressions (1), are concluded if the plane of action $G_2$ is expressed by the radius $R_{b2}$ of the base cylinder.

$$u_{2c} = q_{2c} \cos\chi_2 + R_{b2} \sin\chi_2$$

$$v_{2c} = q_{2c} \sin\chi_2 - R_{b2} \cos\chi_2$$

$$z_{2c} = z_{2c} \quad (1)$$

If the common normal n is defined to be on the plane of action $G_2$ and also defined such that the common normal n is directed in the direction in which the $q_{2c}$ axis component is positive, an inclination angle of the common normal n from the $q_{2c}$ axis can be expressed by $\psi_{b2}$ (the direction shown in the figure is positive). Accordingly, the inclination angle of the common normal n in the coordinate system $C_2$ is defined to be expressed by the form of n ($\phi_2$, $\psi_{b2}$) by means of the inclination angles $\phi_2$ (the complementary angle of the $\chi_2$) of the plane of action $G_2$ to the directed common perpendicular $v_c$, and the $\psi_{b2}$.

Here, the positive direction of the normal force $F_{N2}$ of the concentrated load is the direction of then and the $q_{2c}$ axis direction component, and the $Z_{2c}$ axis direction component of the $F_{N2}$ are designated by $F_{q2}$, $F_{z2}$, respectively.

As for the gear I, coordinate systems $C_1$ ($u_{1C}$, $v_{1c}$, $z_{1c}$), $C_{q1}$ ($q_{1C}$, $v_{q1c}$, $z_{1c}$), a plane of action $G_1$, a radius $R_{b1}$ of the base cylinder, and the inclination angle n ($\phi_1$, $\psi_{b1}$) of the common normal n can be similarly defined. Because the systems share a common $z_{1c}$ axis, the relationship between the coordinate systems $C_1$ and $C_{q1}$ can also be expressed by the following expressions (2).

$$u_{1c} = q_{1c} \cos\chi_1 + R_{b1} \sin\chi_1$$

$$v_{1c} = q_{1c} \sin\chi_1 - R_{b1} \cos\chi_1$$

$$z_{1c} = z_{1c} \quad (2)$$

The relationship between the coordinate systems $C_1$ and $C_2$ is expressed by the following expressions (3).

$$u_{1c} = -u_{2c} \cos\Sigma - z_{2c} \sin\Sigma$$

$$v_{1c} = v_{2c} + E$$

$$z_{1c} = u_{2c} \sin\Sigma - z_{2c} \cos\Sigma \quad (3)$$

The coordinate systems $C_1$ and $C_2$, and the coordinate systems $C_{q1}$ and $C_{q2}$, all defined above, are the basic coordinate systems of the new tooth profile theory proposed newly by the inventor of the present invention. The basic coordinate systems make it possible that the application scope of the present invention can be considered to include a hypoid gear and a bevel gear as well as cylindrical gears.

The relationship between inclination angles n($\phi_1$, $\psi_{b1}$) and n($\phi_2$, $\psi_{b2}$) of the common normal n can be obtained as follows because the n exists on the line of intersection of the planes of actions $G_1$, $G_2$. Each axis direction component of the coordinate system $C_2$ of the n can be expressed as follows.

$L_{u2c} = \cos\psi_{b2} \sin\phi_2$ ($L_{u2c}$: the $u_{2c}$ axis direction component of the n)

$L_{v2c} = \cos\psi_{b2} \cos\phi_2$ ($L_{v2c}$: the $v_{2c}$ axis direction component of the n)

$L_{z2c} = \sin\psi_{b2}$ ($L_{z2c}$: the $z_{2c}$ axis direction component of the n)

Incidentally, the absolute value of the common normal n is 1.

If each axis direction component of the coordinate system $C_1$ is expressed by each axis direction component of the coordinate system $C_2$, it can be expressed as follows by means of the expressions (3).

$L_{u1c} = -L_{u2c} \cos\Sigma - L_{z2c} \sin\Sigma$ ($L_{u1c}$: the $u_{1c}$ axis direction component of the n)

$L_{v1c} = L_{v2c}$ ($L_{v1c}$: the $v_{1c}$ axis direction component of the n)

$L_{z1c} = L_{u2c} \sin\Sigma - L_{z2c} \cos\Sigma$ ($L_{z1c}$: the $z_{1c}$ axis direction component of the n)

Consequently, the following expressions (4) and (5), can be obtained.

$$\tan\varphi_1 = L_{u1c}/L_{v1c} \quad (4)$$
$$= -\tan\varphi_2 \cos\Sigma - \tan\psi_{b2} \sin\Sigma/\cos\varphi_2$$

$$\sin\psi_{b1} = L_{z1c} \quad (5)$$
$$= \cos\psi_{b2} \sin\varphi_2 \sin\Sigma - \sin\psi_{b2} \cos\Sigma$$

Whereupon, the following expressions can be obtained.

$$\phi_1 = \pi/2 - \chi_1$$

$$\phi_2 = \pi/2 - \chi_2$$

3. Path of Contact and its Common Normal

Figure 3:
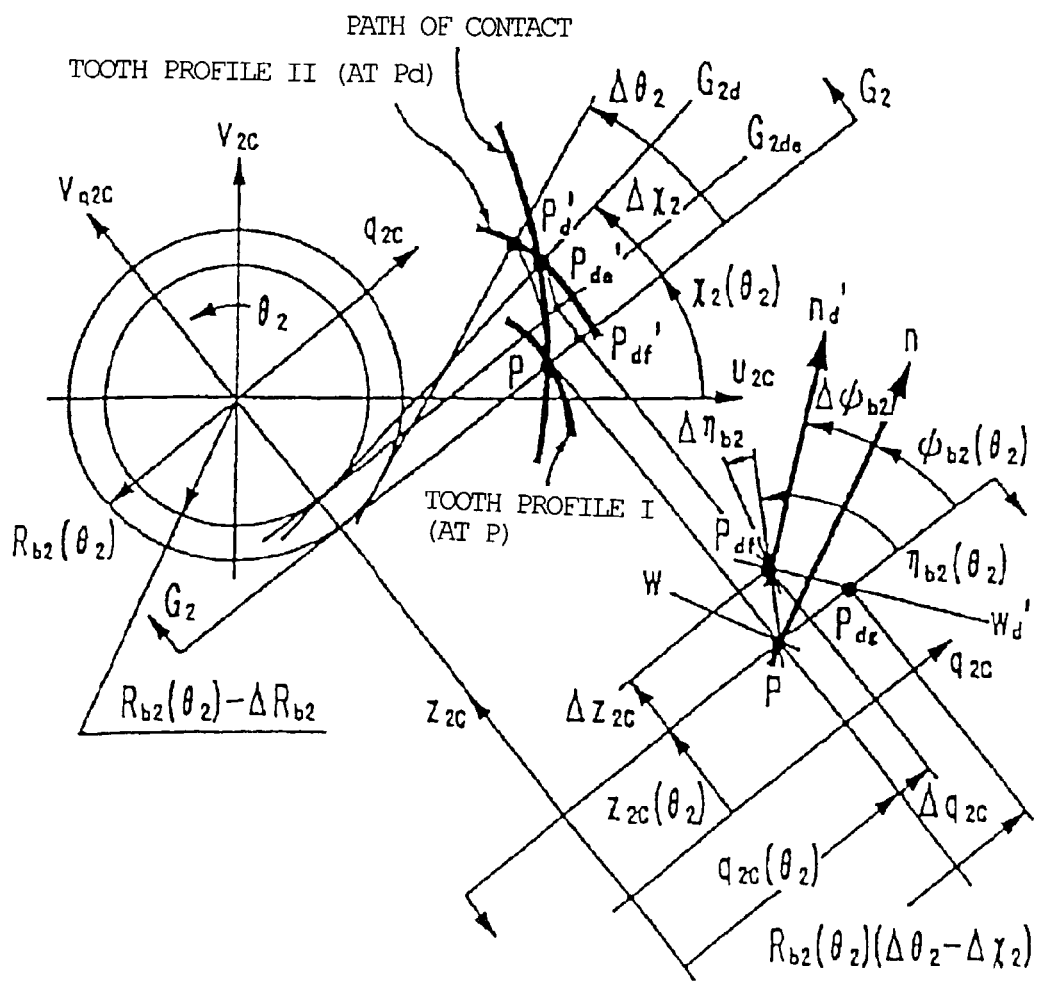
FIG. 3 is a figure for explaining the obtaining of a path of contact and a tooth profile.

FIG. 3 shows the relationships among the point P on a path of contact, the common normal n, and a tangential plane W (shown by a line of intersection w with the plane of action $G_2$), and a point of contact $P_d$, a common normal $n_d$, and a tangential plane $W_d$ after the rotation of the former set by a minute angle $\Delta\theta_2$ in the coordinate systems $C_2$ and $C_{q2}$. Here, the inclination angles of an arbitrary point of contact P and the common normal n at the point of contact P are expressed as follows by the coordinate system $C_2$ using the rotation angle $\theta_2$ of the gear II as a parameter.

$$P\{u_{2c}(\theta_2), v_{2c}(\theta_2), z_{2c}(\theta_2)\}$$

$$n\{\phi_2(\theta_2), \psi_{b2}(\theta_2)\}$$

The positive direction of the rotation angle $\theta_2$ is the direction shown in the figure. The, the following expression is realized.

$$\phi_2(\theta_2) = \pi/2 - \chi_2(\theta_2)$$

When the point P is expressed by means of the aforesaid expressions (1) by the use of the coordinate system $C_{q2}$, the point P can be expressed as follows.

$$P\{q_{2c}(\theta_2), -R_{b2}(\theta_2), z_{2c}(\theta_2)\}$$

Furthermore, if the inclination angle on the plane of action $G_2$ of a tangential line of a path of contact is designated by $n_{b2}$ ($\theta_2$), the following expression (6) holds true.

$$(dz_{2c}/d\theta_2)/(dq_{2c}/d\theta_2)=\tan\eta_{b2}(\theta_2) \qquad (6)$$

If it is supposed that the gear II has rotated by the small angle $\Delta\theta_2$, the point of contact P has changed to $P_d$, and the common normal n has changed to the $n_d$. $P_d$ and $n_d$ can be expressed as follows.

$$P_d\{q_{2c}(\theta_2)+\Delta q_{2c}, -R_{b2}(\theta_2)+\Delta R_{b2}, z_{2c}(\theta_2)+\Delta z_{2c}\}$$

$$n_d\{\pi/2-\chi_2(\theta_2)-\Delta\chi_2, \psi_{b2}(\theta_2)+\Delta\psi_{b2}\}$$

It is supposed that a plane of action passing through the point $P_d$ is designated by $G_{2d}$, and that, when the gear II has been rotated by $\Delta\chi_2$ such that the $G_{2d}$ has become parallel to the plane of action $G_2$, the plane of action $G_{2d}$ has moved to $G_{2de}$ and the point $P_d$ has moved to $P_{de}$. Moreover, the orthogonal projection of the point $P_{de}$ to the plane of action $G_2$ is designated by $P_{df}$. The line of intersection of the plane of action $G_{2d}$ and the tangential plane $W_d$ at the point $P_d$ is designated by $w_d$, and the $w_d$ is expressed by $w_d'$ passing at the point $P_{df}$ by being projected on the plane of action $G_2$ as a result of the aforesaid movement. Furthermore, $n_d$ is designated by $n_d'$. The intersection point of the $w_d'$ and a plane of rotation passing at the point P is designated by $P_{dg}$. The $w_d'$ is located at a position where the $w_d'$ has rotated to the w by $\Delta\theta_2-\Delta\chi_2$ on the plane of action $G_2$ as a result of the rotation by $\Delta\theta_2$. Furthermore, the $w_d'$ inclines to the w by $\Delta\psi_{b2}$ at the point $P_{df}$. Consequently, the amount of movement $PP_{dg}$ of the $w_d'$ to the w in the $q_{2c}$ axis direction can be expressed as follows.

$$PP_{dg} = \{R_{b2}(\theta_2) - \Delta R_{b2}/2\}(\Delta\theta_2 - \Delta\chi_2) + \Delta z_{2c}\Delta\psi_{b2}/\cos^2\psi_{b2}(\theta_2)$$
$$= R_{b2}(\theta_2)(\Delta\theta_2 - \Delta\chi_2)$$

Consequently, a minute displacement $\Delta z_{2c}$ on the plane of action $G_2$ caused by the minute angle $\Delta\theta_2$ becomes as follows.

$$\Delta z_{2c}[\tan\{\psi_{b2}(\theta_2)+\Delta\psi_{b2}\}+1/\tan\{\eta_{b2}(\theta_2)+\Delta\eta_{b2}\}]=R_{b2}(\theta_2)(\Delta\theta_2-\Delta\chi_2)$$

By the omission of second order minute amounts, the expression can be expressed as follows.

$$\Delta z_{2c}=R_{b2}(\theta_2)(\Delta\theta_2-\Delta\chi_2)/\{\tan\psi_{b2}(\theta_2)+1/\tan\eta_{b2}(\theta_2)\}$$

By the use of the aforesaid expression (6), $\Delta q_{2c}$ can be expressed as follows.

$$\Delta q_{2c}=R_{b2}(\theta_2)(\Delta\theta_2-\Delta\chi_2)/\{\tan\psi_{b2}(\theta_2)\tan\eta_{b2}(\theta_2)+1\}$$

Because $\Delta R_{b2}$, $\Delta\chi_2$, $\Delta\psi_{b2}$ and $\Delta\eta_{b2}$ are functions of $\theta_2$, they can be expressed by the use of $\Delta\theta_2$ formally as follows.

$$\Delta R_{b2}=(dR_{b2}/d\theta_2)\Delta\theta_2$$

$$\Delta\eta_{b2}=(d\eta_{b2}/d\theta_2)\Delta\theta_2$$

$$\Delta\chi_2=(d\chi_2/d\theta_2)\Delta\theta_2$$

$$\Delta\psi_{b2}=(d\psi_{b2}/d\theta_2)\Delta\theta_2$$

By integration of the above expressions from 0 to $\theta_2$, the following expressions (7) can be obtained.

$$q_{2c}(\theta_2) = \int (R_{b2}(\theta_2)(1 - d\chi_2/d\theta_2)/\{\tan\psi_{b2}(\theta_2)\tan\eta_{b2}(\theta_2)+1\}) \qquad (7)$$

-continued
$$d\theta_2 + q_{2c}(0)$$

$$R_{b2}(\theta_2) = \int (dR_{b2}/d\theta_2)d\theta_2 + R_{b2}(0)$$

$$z_{2c}(\theta_2) = \int [R_{b2}(\theta_2)(1 - d\chi_2/d\theta_2)/\{\tan\psi_{b2}(\theta_2) + 1/\tan\eta_{b2}(\theta_2)\}]$$
$$d\theta_2 + z_{2c}(0)$$

$$\eta_{b2}(\theta_2) = \int (d\eta_{b2}/d\theta_2)d\theta_2 + \eta_{b2}(0)$$

$$\chi_2(\theta_2) = \int (d\chi_2/d\theta_2)d\theta_2 + \chi_2(0) = \Pi/2 - \varphi_2(\theta_2)$$

$$\psi_{b2}(\theta_2) = \int (d\psi_{b2}/d\theta_2)d\theta_2 + \psi_{b2}(0)$$

The constants of integration indicate the coordinates of the point of contact $P_0$ at the time of the $\theta_2=0$, the inclination angle of the common normal $n_0$ at the point of contact $P_0$, and the inclination angle of the tangential line of a path of contact on a plane of action. The expressions (7) are equations that express a path of contact and the common normal thereof by the coordinate system $C_{q2}$ and uses the $\theta_2$ as a parameter. For the determination of the expressions (7), it is sufficient that the specifications at a design reference point $P_0$ ($\theta_2=0$), i.e. the following ten variables in total, can be given.

$$P_0\{q_{2c}(0), -R_{b2}(0), z_{2c}(0)\}$$

$$\eta_{b2}(0)$$

$$n_0\{\pi/2-\chi_2(0), \psi_{b2}(0)\}$$

$$dR_{b2}/d\theta_2$$

$$d\eta_{b2}/d\theta_2$$

$$d\chi_2/d\theta_2$$

$$d\psi_{b2}/d\theta_2$$

The expressions (7) are basic expressions of the new tooth profile theory for describing a tooth profile. Furthermore, the expressions (7) are a first function of the present invention.

If the point P is transformed to the coordinate system $C_2$ ($u_{2c}$, $v_{2c}$, $z_{2c}$), because $z_{2c}$ is common, the following expressions (8) can be obtained from expressions (1).

$$u_{2c}(\theta_2)=q_{2c}(\theta_2)\cos\chi_2(\theta_2)+R_{b2}(\theta_2)\sin\chi_2(\theta_2)$$

$$v_{2c}(\theta_2)=q_{2c}(\theta_2)\sin\chi_2(\theta_2)-R_{b2}(\theta_2)\cos\chi_2(\theta_2)$$

$$z_{2c}(\theta_2)=z_{2c}(\theta_2) \qquad (8)$$

The expressions (8) are a second function of the present invention. By the use of the aforesaid expressions (2), (3), (4), and (5), the point of contact P and the inclination angle of the common normal n at the point of contact P can be expressed by the following expressions (9), by means of the coordinate systems C, and $C_{q1}$ by the use of the $\theta_2$ as a parameter.

$$P\{u_{1c}(\theta_2), v_{1c}(\theta_2), z_{1c}(\theta_2)\}$$

$$n\{\phi_1(\theta_2), \psi_{b1}(\theta_2)\}$$

$$P\{q_{1c}(\theta_2), -R_{b1}(\theta_2), z_{1c}(\theta_2)\} \qquad (9)$$

4. Requirement for Contact and Rotation Angle $\theta_1$ of Gear I

Because the common normal n of the point of contact P exists on the line of intersection of the planes $G_1$ and $G_2$, the requirements for contact can be expressed by the following expression (10).

$$R_{b1}(\theta_2)(d\theta_1/dt)\cos\psi_{b1}(\theta_2) = R_{b2}(\theta_2)(d\theta_2/dt)\cos\psi_{b2}(\theta_2) \quad (10)$$

Consequently, the ratio of angular velocity $i(\theta_2)$ and the rotation angle $\theta_1$ of the gear I can be expressed by the following expressions (11).

$$i(\theta_2) = (d\theta_1/dt)/(d\theta_2/dt) \quad (11)$$
$$= R_{b2}(\theta_2)\cos\psi_{b2}(\theta_2)/\{R_{b1}(\theta_2)\cos\psi_{b1}(\theta_2)\}$$
$$\theta_1 = \int i(\theta_2)d\theta_2 \text{ (integrated from 0 to } \theta_2\text{)}$$

It should be noted that it is assumed that $\theta_1=0$ when $\theta_2=0$.

5. Equations of Tooth Profile

5.1 Equations of Tooth Profile II

Figure 4:
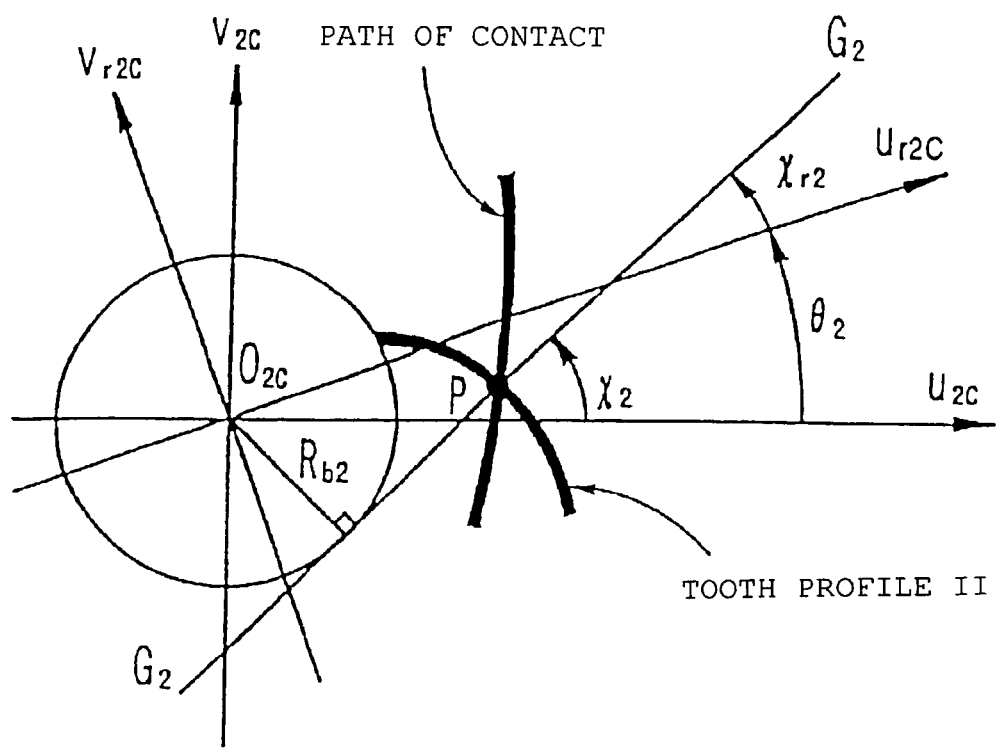
FIG. 4 is a figure showing a path of contact and a tooth profile.

FIG. 4 shows point P in a coordinate system $C_{r2}$ ($u_{r2c}$, $v_{r2c}$, $z_{r2c}$) rotating along with the gear II. The coordinate system $C_{r2}$ has an origin $C_2$ and $z_{2c}$ axis in common with the coordinate system $C_2$ and rotates around the $z_{2c}$ axis by the $\theta_2$. The $u_{r2c}$ axis coincides with the $u_{2c}$ axis when $\theta_2=0$. Because a path of contact and the common normal thereof are given by the above expressions (7), the point $P(u_{r2c}, v_{r2c}, z_{r2c})$ and the normal $n(\phi_{r2}, \psi_{b2})$ at the point P, both being expressed in the coordinate system $C_{r2}$, can be expressed by the following expressions (12).

$$\chi_{r2} = \chi_2(\theta_2) - \theta_2 = \pi/2 - \phi_2(\theta_2) - \theta_2$$
$$\phi_{r2} = \phi_2(\theta_2) + \theta_2$$
$$u_{r2c} = q_{2c}(\theta_2)\cos\chi_{r2} + R_{b2}(\theta_2)\sin\chi_{r2}$$
$$v_{r2c} = q_{2c}(\theta_2)\sin\chi_{r2} - R_{b2}(\theta_2)\cos\chi_{r2}$$
$$z_{r2c} = z_{2c}(\theta_2) \quad (12)$$

The expressions (12) is a third function of the present invention.

5.2 Equations of Tooth Profile I

If a coordinate system $C_{r1}(u_{r1c}, v_{r1c}, z_{r1c})$ rotating by the $\theta_1$ to the coordinate system $C_1$ is similarly defined, the point $P(u_{r1c}, v_{r1c}, z_{r1c})$ and the normal $n(\phi_{r1}, \psi_{b1})$ at the point P can be expressed by the following expressions (13), by means of the above expressions (9) and (11).

$$\chi_{r1} = \chi_1(\theta_2) - \theta_1 = \pi/2 - \phi_1(\theta_2) - \theta_1$$
$$\phi_{r1} = \phi_1(\theta_2) + \theta_1$$
$$u_{r1c} = q_{1c}(\theta_2)\cos\chi_{r1} + Rb_1(\theta_2)\sin\chi_{r1}$$
$$v_{r1c} = q_{1c}(\theta_2)\sin\chi_{r1} - Rb_1(\theta_2)\cos\chi_{r1}$$
$$z_{r1c} = Z_{1c}(\theta_2) \quad (13)$$

The coordinate system $C_{r1}$ and the coordinate system $C_1$ coincide with each other when $\theta_1=0$. The aforesaid expressions (12) and (13) generally express a tooth profile the ratio of angular velocity of which varies.

The three-dimensional tooth profile theory described above directly defines the basic specifications (paths of contacts) of a pair of gears in a static space determined by the two rotation axes and the angular velocities of the pair of gears without the medium of a pitch body of revolution (a pitch cylinder or a pitch cone). Consequently, according to the tooth profile theory, it becomes possible to solve the problems of tooth surfaces of all of the pairs of gears from cylindrical gears, the tooth surface of which is an involute helicoid or a curved surface approximate to the involute helicoid, to a hypoid gear, and the problems of the contact of the tooth surfaces using a common set of relatively simple expression through the use of unified concepts defined in the static space (such as a plane of action, a normal plane, a pressure angle, a helical angle and the like).

6. Motion of a Pair of Gears and Bearing Loads

6.1 Equations of Motion of Gears II and I and Bearing Loads

Figure 5:
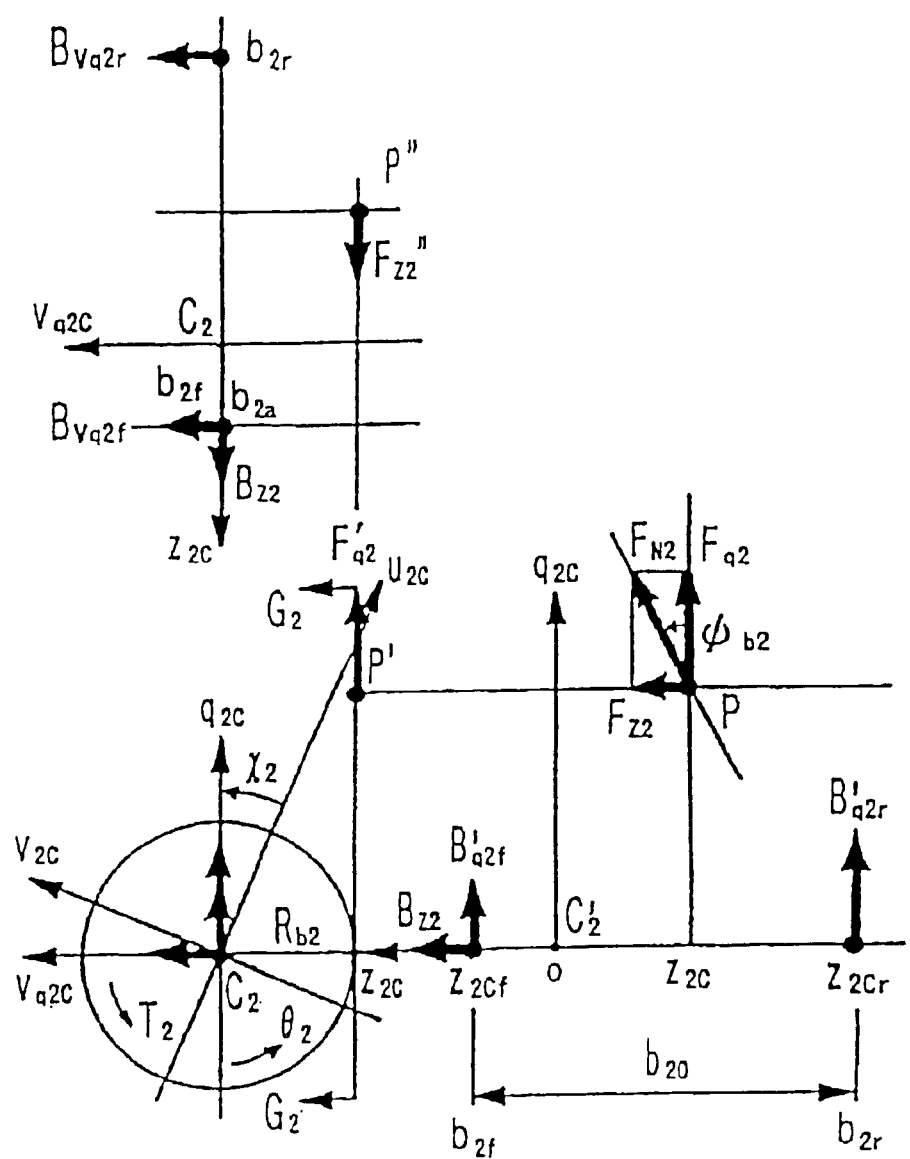
FIG. 5 is a figure showing a concentrated load applied to a gear II and a relationship between the concentrated load and the bearing load.

FIG. 5 shows relationships among the normal force $F_{N2}$ of the concentrated load of the gear II at the point of contact P shown in FIG. 2 and bearing loads $B_{z2}$, $B_{vq2f}$, $B_{vq2r}$, $B_{q2f}$, $B_{q2r}$ by means of the coordinate system $C_{q2}$. Here, it is assumed that the lubrication of the tooth surfaces is sufficient and the frictional force component of the concentrated load is negligible. Furthermore, it is also assumed that the gear II is rigidly supported by bearings $b_{2a}$, $b_{2f}$ and $b_{2r}$ in both of its axis direction and its radius direction and the rigidity of the axis is sufficiently large. In the figure, "'" and "''" indicate the orthogonal projection of a point or a vector, respectively, to an object plane.

Because the gear II rotates around a fixed axle II by receiving the input (output) torque $T_2$ and the normal force $F_{N2}$ of a concentrated load from the gear I, an expression of the equations of motion of the gear II and the bearing load is concluded to the following expressions (15), from the balances of torque and forces related to each axis of the coordinate system $C_{q2}$.

$$J_2(d^2\theta_2/dt^2) = F_{q2}R_{b2}(\theta_2) + T_2$$
$$B_{z2} = -F_{z2} = -F_{q2}\tan\psi_{b2}(\theta_2)$$
$$B_{vq2r}b_{20} = F_{z2}R_{b2}(\theta_2)$$
$$B_{q2f} + B_{q2r} = -F_{q2}$$
$$B_{q2f}b_{20} = -F_{q2}\{z_{2c}(\theta_2) - z_{2cr}\} + F_{q2}q_{2c}(\theta_2)\tan\psi_{b2}(\theta_2)$$
$$B_{vq2f} + B_{vq2r} = 0 \quad (15)$$

where $J_2$: moment of inertia of gear II $\theta_2$: rotation angle of gear II $T_2$: input (output) torque of gear II (constant)

$F_{q2}$, $F_{z2}$: $q_{2c}$ and $z_{2c}$ axis direction components of normal force $F_{2N}$ $B_{z2}$: $z_{2c}$ axis direction load of bearing $b_{2a}$ $B_{q2f}$, $B_{q2r}$: $q_{2c}$ axis direction load of bearings $b_{2f}$, $b_{2r}$ $B_{vq2f}$, $B_{vq2r}$: $v_{q2c}$ axis direction load of bearings $b_{2f}$, $b_{2r}$ $z_{2cf}$, $z_{2cr}$: $z_{2c}$ coordinates of point of action of load of bearings $b_{2f}$, $b_{2r}$ $b_{20}$: distance between bearings $b_{2f}$ and $b_{2r}$ ($z_{2cf} - z_{2cr} > 0$).

It should be noted that the positive directions of load directions are respective axis directions of the coordinate system $C_{q2}$. The situation of the gear I is the same.

6.2 Equations of Motion of a Pair of Gears

By setting of the equations of motion of the gears I and II and the aforesaid the requirement for contact (10) to be simultaneous equations, the equations of motion of a pair of gears are found as the following expressions (16).

$$J_1(d^2\theta_1/dt^2)=F_{q1}R_{b1}(\theta_2)+T_1$$

$$J_2(d^2\theta_2/dt^2)=F_{q2}R_{b2}(\theta_2)+T_2$$

$$-F_{q1}/\cos\psi_{b1}(\theta_2)=F_{q2}/\cos\psi_{b2}(\theta_2)$$

$$R_{b1}(\theta_2)(d\theta_1/d_t)\cos\psi_{b1}(\theta_2)=R_{b2}(\theta_2)(d\theta_2/dt)\cos\psi_{b2}(\theta_2) \quad (16)$$

Because a point of contact and the common normal thereof are given by the aforesaid expressions (7), the aforesaid expressions (16) are simultaneous equations including unknown quantities $\theta_1$, $\theta_2$, $F_{q1}$, $F_{q2}$, and the expressions (16) are basic expressions for describing motions of a pair of gears the tooth profiles of which are given. Incidentally, the expressions (16) can only be applied to an area in which a path of contact is continuous and differentiable. Accordingly, if an area includes a point at which a path of contact is nondifferentiable (such as a point where a number of engaging teeth changes), it is necessary to obtain expressions for describing the motion in the vicinity of the point. It is not generally possible to describe a steady motion of a pair of gears only by the aforesaid expressions (16).

7. Conditions for Making Fluctuations of Bearing Load Zero

Fluctuations of a load generated in the gear II because of the rotation of a pair of gears can be understood as fluctuations of the loads of the bearings $b_{2a}$, $b_{2f}$ and $b_{2r}$ to the stationary coordinate system $C_2$. Accordingly, if each bearing load expressed in the coordinate system $C_{q2}$ is transformed into an axis direction component in the coordinate system $C_2$, the result can be expressed by the following expressions (17).

$$B_{z2c}=B_{z2}\ (\text{the } Z_{2c} \text{ axis direction load of the bearing } b_{2a})$$

$$B_{u2cf}=B_{q2f}\cos\chi_2-B_{vq2f}\sin\chi_2\ (\text{the } u_{2c} \text{ axis direction load of the bearing } b_{2f})$$

$$B_{v2cf}=B_{q2f}\sin\chi_2+B_{vq2f}\cos\chi_2\ (\text{the } v_{2c} \text{ axis direction load of the bearing } b_{2f})$$

$$B_{u2cr}=B_{q2r}\cos\chi_2-B_{vq2r}\sin\chi_2\ (\text{the } u_{2c} \text{ axis direction load of the bearing } b_{2r})$$

$$B_{v2cr}=B_{q2r}\sin\chi_2+B_{vq2r}\cos\chi_2\ (\text{the } v_{2c} \text{ axis direction load of the bearing } b_{2r}) \quad (17)$$

Fluctuation components of the bearing load can be expressed as follows by differentiation of the above expressions (17).

(a) Fluctuation Components of $z_{2c}$ Axis Direction Load of Bearing $b_{2a}$ $$\Delta B_{z2c}=\Delta B_{z2}=-\Delta F_{z2}$$

$$\Delta F_{z2}=\Delta F_{q2}\tan\psi_{2b}+F_{q2}\Delta\psi b_2/\cos^2\psi_{b2}$$

$$\Delta F_{q2}=\{\Delta(J_2(d^2\theta_2/dt^2))-F_{q2}\Delta R_{b2}\}/R_{b2}$$

(b) Fluctuation Components of $u_{2c}$ and $v_{2c}$ Axis Direction Loads of Bearing $b_{2f}$ $$\Delta B_{u2cf}=\Delta B_{q2f}\cos\chi_2-B_{q2f}\sin\chi_2\Delta\chi_2-\Delta B_{vq2f}\sin\chi_2-B_{vq2f}\cos\chi_2\Delta\chi_2$$

$$\Delta B_{v2cf}=\Delta B_{q2f}\sin\chi_2+B_{q2f}\cos\chi_2\Delta\chi_2+\Delta B_{vq2f}\cos\chi_2-B_{vq2f}\sin\chi_2\Delta\chi_2$$

$$\Delta B_{q2f}=-[\Delta F_{q2}(z_{2c}-z_{2cr}-q_{2c}\tan\psi_{b2})+F_{q2}\{\Delta z_{2c}-c\tan\psi_{b2}-q_{2c}\Delta\psi_{b2}/\cos^2\psi_{b2}\}]/b_{20}$$

$$\Delta B_{vq2f}=-(\Delta F_{z2}R_{b2}+F_{z2}\Delta R_{b2})/b_{20}$$

(c) Fluctuation Components of $u_{2c}$ and $v_{2c}$ Axis Direction Loads of Bearing $b_{2r}$ $$\Delta B_{u2cr}=\Delta B_{q2r}\cos\chi_2-B_{q2r}\sin\chi_2\Delta\chi_2-\Delta B_{vq2r}\sin\chi_2-B_{vq2r}\cos\chi_2\Delta\chi_2$$

$$\Delta B_{v2cr}=\Delta B_{q2r}\sin\chi_2+B_{q2r}\cos\chi_2\Delta\chi_2+\Delta B_{vq2r}\cos\chi_2-B_{vq2r}\sin\chi_2\Delta\chi_2$$

$$\Delta B_{q2r}=-\Delta F_{q2}-\Delta B_{q2f}$$

$$\Delta B_{vq2r}=-\Delta B_{vq2f}$$

The fluctuation components of the bearing load of the gear II at an arbitrary rotation angle $\theta_2$ can be expressed as fluctuation components of the following six variables.

$\Delta q_{2c}$ $\Delta R_{b2}$ $\Delta z_{2c}$ $\Delta\chi_2$ $\Delta\psi_{b2}$ $\Delta(d^2\theta_2/dt^2)$ When the gear II rotates under the condition such that input (output) torque is constant, at least the fluctuation components of the bearing load of the gear II should be zero so that the fluctuations of the bearing load of the gear II may be zero independent of rotation position. Consequently the following relationship holds true.

$$\Delta B_{z2c}=\Delta B_{u2cf}=\Delta B_{v2cf}=\Delta B_{u2cr}=\Delta B_{v2cr}=0$$

Consequently, the conditions that the fluctuations of the bearing load of the gear II become zero are arranged to the following five expressions (18).

(1) $\Delta\chi_2=0$ (2) $\Delta\psi_{b2}=0$ (3) $\Delta R_{b2}(\theta_2)=0$ (4) $\Delta z_{2c}(\theta_2)=\Delta q_{2c}(\theta_2)\tan\psi_{b2}(\theta_2)$ (5) $\Delta(d^2\theta_2/dt^2)=0$ (18)

In the above, t designates a time hereupon.

Each item of the aforesaid (1)-(5) is described in order.

(1) Condition of $\Delta\chi_2(\theta_2)=0$

The inclination angle $\chi_2(\theta_2)$ of the plane of action $G_2$ is constant (designated by $\chi_{20}$). That is, the angle $\chi_2(\theta_2)$ becomes as follows.

ti $\chi_2(\theta_2)=\chi_2(0)=\chi_{20}=\pi/2-\phi_{20}$ (2) Condition of $\Delta\psi_{b2}(\theta_2)=0$ The inclination angle $\psi_{b2}(\theta_2)$ on the plane of action $G_2$ of the common normal of a point of contact is constant ($\psi_{b20}$). That is, the following expression is concluded.

$$\psi_{b2}(\theta_2)=\psi_{b2}(0)=\psi_{b20}$$

(3) Condition of $\Delta R_{b2}(\theta_2)=0$

The base cylinder radius $R_{b2}(\theta_2)$ to which the common normal at a point of contact is tangent is constant (the constant value is designated by $R_{b20}$). That is, the following expression is obtained.

$$R_{b2}(\theta_2)=R_{b2}(0)=R_{b20}$$

(4) Condition of $\Delta z_{2c}(\theta_2)=\Delta q_{2c}(\theta_2)\tan\psi_{b2}(\theta_2)$ From $\psi_{b2}(\theta_2)=\psi_{b20}$ and expressions (7), the following expressions are obtained.

$$\Delta z_{2c}=\Delta q_{2c}(\theta_2)\tan\psi_{b20}$$

$$\eta_{b2}(\theta_2)=\psi_{b20}=\eta_{b2}(0)$$

That is, the inclination angle of a tangential line of a path of contact on the plane of action $G_2$ ($q_{2c}$–$z_{2c}$ plane) should coincide with that of the common normal.

If the results of the conditions (1)-(4) are substituted in the above expressions (7) in order to express the expressions (7) in the coordinate system $C_2$, a path of contact and the inclination angle of the common normal of the path of contact are expressed by the following expressions.

$$q_{2c}(\theta_2)=R_{b20}\theta_2\cos^2\psi_{b20}+q_{2c}(0)$$

$$u_{2c}(\theta_2)=q_{2c}(\theta_2)\cos\chi_{20}+R_{b20}\sin\chi_{20}$$

$$v_{2c}(\theta_2)=q_{2c}(\theta_2)\sin\chi_{20}-R_{b20}\cos\chi_{20}$$

$$z_{2c}(\theta_2)=R_{b20}\theta_2\cos\psi_{b20}\sin\psi_{b20}+z_{2c}(0)$$

$$n(\phi_{20}=\pi/2-\chi_{20},\psi_{b20}) \quad (19)$$

The expressions (19) indicate that the path of contact is a straight line passing at a point $P_0\{q_{2c}(0), -R_{b20}, z_{2c}(0)\}$ in the coordinate system $C_{q2}$ and coinciding with the common normal of the inclination angle $n(\phi_{20}=\pi/2-\chi_{20}, \psi_{b20})$ to the coordinate system $C_2$. Furthermore, by specifying five variables of $R_{b20}$, $\psi_{b20}$, $q_{2c}(0)$, $\chi_{20}$ and $z_{2c}(0)$, the expressions (19) can specify a path of contact.

If the expressions (19) are transformed into the coordinate systems $C_1$, $C_{q1}$, the expressions (19) can be expressed as a straight line passing through the point $P_0\{q_{1c}(0), -R_{b10}, z_{1c}(0)\}$ and having an inclination angle $n(\phi_{10}=\pi/2-\chi_{10}, \psi_{b10})$ to the coordinate system $C_1$ by means of the above expressions (9). Consequently, the ratio of angular velocity and the rotation angle of the gear I can be expressed as follows by the use of the expressions (11).

$$i(\theta_2)=(d\theta_1/dt)/(d\theta_2/dt)=R_{b20}\cos\psi_{b20}/(R_{b10}\cos\psi_{b10})=i_0\theta_1=i_0\theta_2 \quad (20)$$

The ratio of angular velocity is constant (designated by $i_0$)

(5) Condition of $\Delta(d^2\theta_2/dt^2)=0$ $(d^2\theta_2/dt^2)$ is constant. That is, it describes motion of uniform acceleration. Because the motion of a pair of gears being an object in the present case is supposed to be a steady motion such that inputs and outputs are constant, the motion is expressed by $(d^2\theta_2/dt^2)=0$, and the expression means a motion of uniform rate. Moreover, because $(d\theta_1/dt)$ also becomes constant by means of the aforesaid expressions (20), $(d^2\theta_1/dt^2)=0$ is also concluded as to the gear I. Consequently, by means of the expressions (16), the following expressions can be obtained.

$$F_{q2}R_{b20}=-T_2$$

$$F_{q1}R_{b10}=-T_1$$

By the use of the aforesaid expressions (20) and a law of action and reaction the following expression is concluded.

$$i_0=F_{q2}R_{b2}/(-F_{q1}R_{b10})=-T_2/T_1$$

That is, the ratio of angular velocity $i_0$ of a pair of gears should be a given torque ratio (being constant owing to the supposition of the input and the output).

As for the fluctuations of a load to be produced in the gear I, a state wherein the fluctuation of a bearing load is zero is realized in accordance with the conditions of the aforesaid expressions (18) quite similarly to the gear II. Consequently, a path of contact and a common normal thereof should satisfy the following conditions in order to make fluctuations of a bearing load generated in a pair of gears zero under which input and output torques are constant.

(a) When a point of contact is arbitrarily given in a static space (in the coordinate system $C_2$), a path of contact should be a straight line coinciding with the common normal of the point of contact and being fixed in the static space.

(b) Furthermore, the ratio of angular velocity $i_0$ at the point of contact should be constant and coincide with a given torque ratio.

Figure 6:
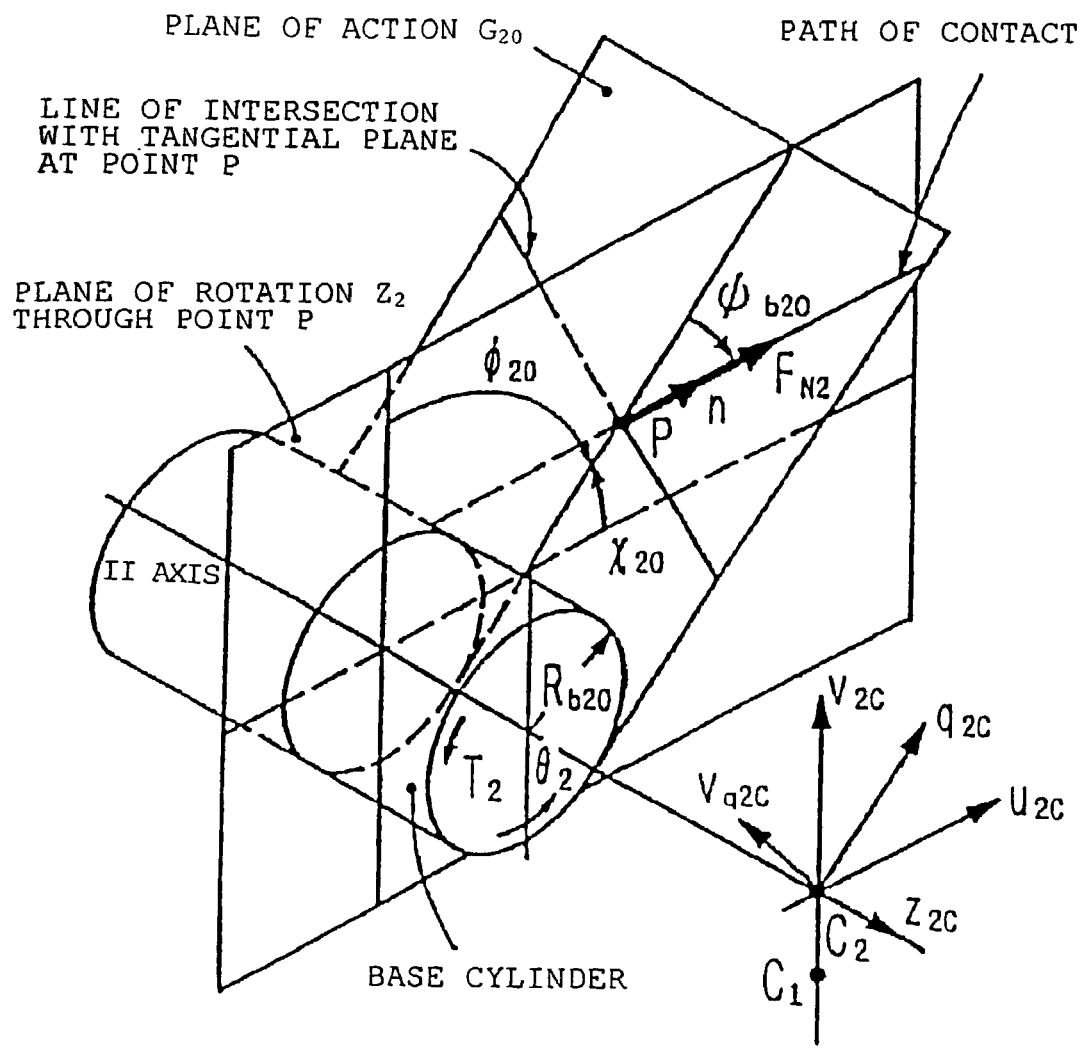
FIG. 6 is a figure showing a path of contact in a case wherein fluctuations of the bearing load are zero.

FIG. 6 shows relationships among a plane of action $G_{20}$ on which fluctuations of a bearing load are zero, a base cylinder (radius $R_{b20}$), a path of contact (common normal n) and the normal force $F_{N2}$ of the concentrated load in the coordinate systems $C_2$ and $C_{q2}$. If the path of contact is the same straight line in all of the surfaces of action (including a zone in which a plurality of contacts are included), the path of contact is continuous and differentiable in all of the zones. Consequently, a steady motion having no fluctuations of a bearing load can be realized.

8. Tooth Profile having no Fluctuations of Bearing Load 8.1 Tooth Profile II

If a coordinate system having the origin $C_2$ and the $z_{2c}$ axis in common with the coordinate system $C_2$ and rotating around the $z_{2c}$ axis by the $\theta_2$ is set to the coordinate system $C_{r2}(u_{r2c}, v_{r2c}, z_{r2c})$, a tooth profile II having no fluctuation of its bearing load can be obtained in accordance with the following expressions (21) by transforming the aforesaid expressions (19) into the coordinate system $C_{r2}$.

$$\chi_{r2}=\chi_{20}-\theta_2=\pi/2-\phi_{20}-\theta_2$$

$$u_{r2c}=q_{2c}(\theta_2)\cos\chi_{r2}+R_{b20}\sin\chi_{r2}$$

$$v_{r2c}=q_{2c}(\theta_2)\sin\chi_{r2}-R_{b20}\cos\chi_{r2}$$

$$z_{r2c}=z_{2c}(\theta_2)$$

$$n(\phi_{20}+\theta_2,\psi_{b20}) \quad (21)$$

Here, the $u_{r2c}$ axis is supposed to coincide with the $r_{2c}$ axis when the rotation angle $\theta_2$ is zero.

8.2 Tooth Profile I

Similarly, a coordinate system rotating around the $Z_{1c}$ axis by the $\theta_1$ is assumed to the coordinate system $C_{r1}$ ($u_{r1c}$, $v_{r1c}$, $z_{r1c}$) to the coordinate system $C_1$. If the aforesaid expressions (19) is transformed into the coordinate systems $C_1$, $C_{q1}$, the transformed expressions express a straight line passing at the point $P_0\{q_{1c}(0), -R_{b10}, z_{1c}(0)\}$ and having the inclination angle $n(\phi_{10}=\pi/2-\chi_{10}, \psi_{b10})$ to the coordinate system $C_1$. Because an arbitrary point on the straight line is given by the aforesaid expressions (9), a tooth profile I having no fluctuations of bearing load can be obtained in accordance with the following expressions (22) by transforming the straight line into the coordinate system $C_{r1}$.

$$\chi_{r1}=\chi_{10}-\theta_1=\pi/2-\phi_{10}-\theta_1$$

$$u_{r1c}=q_{1c}(\theta_2)\cos\chi_{r1}+R_{b10}\sin\chi_{r1}$$

$$v_{r1c}=q_{1c}(\theta_2)\sin\chi_{r1}-R_{b10}\cos\chi_{r1}$$

$$z_{r1c}=Z_{1c}(\theta_2)$$

$$n(\phi_{10}+\theta_1,\psi_{b10}) \quad (22)$$

Here, a $u_{r1c}$ axis is supposed to coincide with a $u_{1c}$ axis when the rotation angle $\theta_1$ is zero.

Now, if $q_{1c}(\theta_2)$ and $z_{1c}(\theta_2)$ are substituted by $q_{1c}(\theta_1)$ and $Z_{1c}(\theta_1)$, respectively, again by the use of $\theta_1 = i_0 \theta_2$ and the $\theta_1$ as a parameter, the following expressions (23) can be obtained.

$q_{1c}(\theta_1) = R_{b10} \theta_1 \cos^2 \psi_{b10} + q_{1c}(0)$ $z_{1c}(\theta_1) = R_{b10} \theta_1 \cos \psi_{b10} \sin \psi_{b10} + z_{1c}(0)$ $\chi_{r1} = \chi_{10} - \theta_1 = \pi/2 - \phi_{10} - \theta_1$ $u_{r1c} = q_{1c}(\theta_1) \cos \chi_{r1} + R_{b10} \sin \chi_{r1}$ $v_{r1c} = q_{1c}(\theta_1) \sin \chi_{r1} - R_{b10} \cos \chi_{r1}$ $z_{r1c} = z_{1c}(\theta_1)$ $n(\phi_{10} + \theta_1, \psi_{b10})$ (23)

Practically the expressions (23) is easier to use than the expressions (22). The expressions (21), (23) show that the tooth profiles I, II are curves corresponding to the paths of contact on an involute helicoid. It is possible to use curved surfaces that include the tooth profiles I, II and do not interfere with each other as tooth surfaces. However, because the curved surfaces other than the involute helicoid or a tooth surface being an amended involute helicoid are difficult to realize the aforesaid path of contact and the common normal, those curved surfaces are not suitable for power transmission gearing.

A specific method for determining values to be substituted for the aforesaid five variables $R_{b20}$, $\psi_{b20}$, $q_{2c}(0)$ $\chi_{20}$, $z_{2c}(0)$ for specifying the expressions (19) is described in detail.

9. A Pair of Gears Being Objects

A pair of gears being objects having no fluctuation of a bearing load is defined as follows as described above.

(1) Positional relationships between two axes (a shaft angle $\Sigma$, an offset E) and angular velocities $\omega_{10}$, $\omega_{20}$ (assumed to be $\omega_{10} \geq \omega_{20}$) are given, and a motion of a constant ratio of angular velocity ($i_0$) is transmitted. Both angular velocities $\omega_{10}$, $\omega_{20}$ are vectors.

(2) A path of contact is given as a directed straight line $g_0$ coinciding with the common normal n at a point of contact and being fixed in a static space, and the planes of action of the pair of gears are designated by $G_{10}$, $G_{20}$. The $g_0$ is a unit vector indicating the direction of the path of contact and coincides with the n.

(3) The coordinate systems $C_1$, $C_{q1}$, $C_2$, $C_{q2}$ are given, and the path of contact $g_0$ is given as follows by the coordinate systems $C_2$, $C_{q2}$, wherein, the $g_0$ can be expressed by the coordinate systems $C_1$, $C_{q1}$ and the rotation angle $\theta_1$ of the gear I by replacing the suffix 2 with 1.

$q_{2c}(\theta_2) = R_{b20} \theta_2 \cos^2 \psi_{b20} + q_{2c}(0)$ $u_{2c}(\theta_2) = q_{2c}(\theta_2) \cos \chi_{20} + R_{b20} \sin \chi_{20}$ $v_{2c}(\theta_2) = q_{2c}(\theta_2) \sin \chi_{20} - R_{b20} \cos \chi_{20}$ $z_{2c}(\theta_2) = R_{b20} \theta_2 \cos \psi_{b20} \sin \psi_{b20} + z_{hd\,2c}(0)$ (25)

where $\theta_2$: a rotation angle of the gear II;

$q_{2c}(0)$, $z_{2c}(0)$: $q_{2c}$ and $z_{2c}$ coordinates of the point of contact when the $\theta_2$ is zero;

$\chi_{20}$: the inclination angle of the plane of action $G_{20}$ of the gear II;

$\psi_{b20}$: the inclination angle of the $g_0$ on the plane of action $G_{20}$; and $R_{b20}$: the radius of a base cylinder being tangent with the plane of action $G_{20}$.

Consequently, it is necessary to select five suitable constants of $q_{2c}(0)$, $Z_{2c}(0)$, $R_{b20}$, $\chi_{20}$, $\psi_{b20}$ in order that the pair of gears being objects transmits the motion of given ratio of angular velocity $i_0$.

Figure 7:
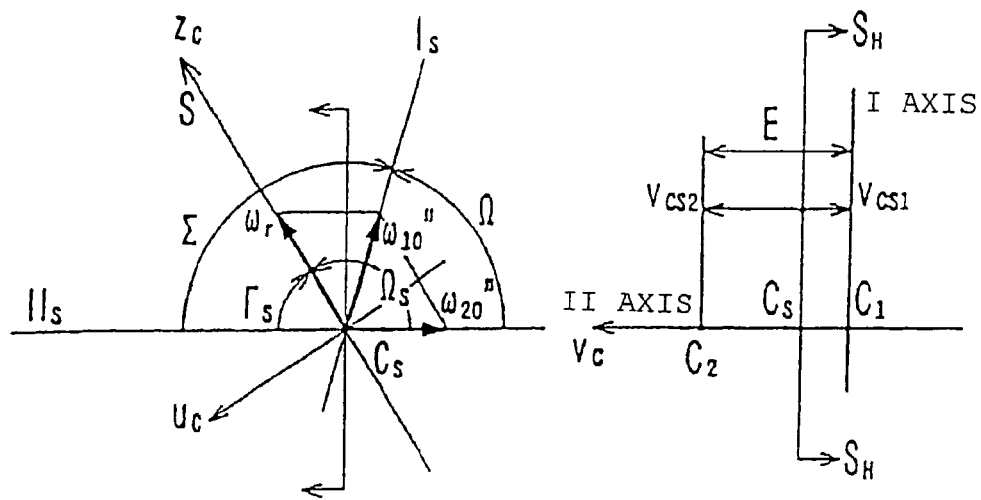
FIG. 7 is a figure showing a relative rotation axis S and a coordinate system $C_S$ severally for explaining a specific method for determining five variable values needed to be specified for obtaining a tooth profile from a path of contact (Hereinafter, referred to as a "variable determining method" simply).

10. Relative Rotation Axis and Coordinate System $C_s$ 10.1 Relative Rotation Axis FIG. 7 shows a relationship between a relative rotation axis and a coordinate system $C_S$. If a positional relationship between two axes I and II and their angular velocities $\omega_{10}$, $\omega_{20}$ are given, it is supposed that the intersection points of the common perpendicular $v_c$ (the positive direction thereof is the direction of $\omega_{20} \times \omega_{10}$) of the two axes with each of the axes I, II are designated by $C_1$, $C_2$, respectively, and the $C_1$ is located under the $C_2$ with respect to the $v_c$. If a relative angular velocity $\omega_r$ (vector) is supposed to be $\omega_r = \omega_{10} - \omega_{20}$ and the axis thereof is assumed to be a relative rotation axis S, and then if a plane including the relative rotation axis S and being perpendicular to the common perpendicular $v_c$ is assumed to be a plane $S_H$ and the intersection point of the plane $S_H$ with the common perpendicular $v_c$ is designated by the $C_s$, the relative rotation axis S is a straight line passing at the $C_s$, and the position of the relative rotation axis S can be determined as follows.

If the orthogonal projections of the two axes I ($\omega_{10}$), II ($\omega_{20}$) to the plane $S_H$ are designated by $I_s$ ($\omega_{10}$"), $II_s$ ($\omega_{20}$"), respectively, and an angle of the $I_s$ to the $II_s$ when the plane $S_H$ is viewed from the positive direction of the common perpendicular $V_c$ to the negative direction thereof is designated by $\Omega$, the $I_s$ is in a zone of $0 \leq \Omega \leq \Pi$ (the positive direction of the angle $\Omega$ is the counterclockwise direction) to the $II_s$ in accordance with the definition of $\omega_{20} \times \omega_{10}$. If an angle of the relative rotation axis S ($\omega_r$) to the $II_s$ on the plane $S_H$ is designated by $\Omega_S$ (the positive direction of the angle $\Omega_S$ is the counterclockwise direction), the components of the $\omega_{10}$" and the $\omega_{20}$" that are orthogonal to the relative rotation axis on the plane $S_H$ should be equal to each other in accordance with the definition of the relative rotation axis ($\omega_r = \omega_{10} - \omega_{20}$). Consequently, the $\Omega_s$ satisfies the following expressions (26):

$\sin \Omega_S / \sin(\Omega_S - \Omega) = \omega_{10} / \omega_{20}$; or $\sin \Gamma_S / \sin(\Sigma - \Gamma_S) = \omega_{10} / \omega_{20}$ (26).

wherein, $\Sigma = \pi - \Omega$ (shaft angle), $\Gamma_s = \pi - \Omega_s$. The positive directions are shown in the figure.

Figure 8:
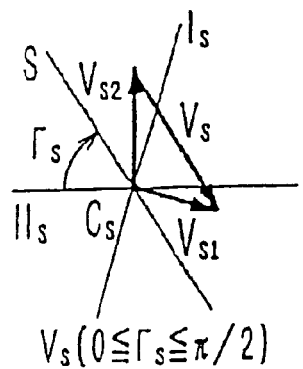
FIG. 8 is a figure showing a relative velocity $V_S$ at a point $C_S$ for explaining the aforesaid variable determining method.
Figure 8:
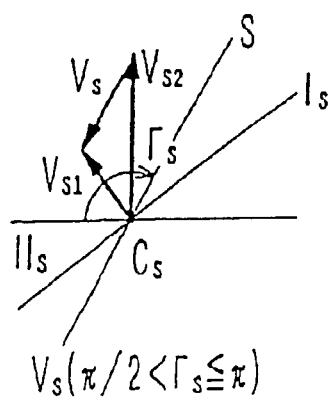

The position of the $C_s$ on the common perpendicular $v_c$ can be obtained as follows. FIG. 8 shows a relative velocity $V_s$ (vector) of the point $C_s$. In accordance with the aforesaid supposition, the $C_1$ is located under the position of the $C_2$ with respect to the common perpendicular $v_c$ and $\omega_{10} \geq \omega_{20}$. Consequently, the $C_S$ is located under the $C_2$. If the peripheral velocities of the gears I, II at the point $C_s$ are designated by $V_{s1}$, $V_{s2}$ (both being vectors), respectively, because the relative velocity $V_s$ ($= V_{s1} - V_{s2}$) exists on the relative rotation axis S, the components of the $V_{s1}$, $V_{s2}$ (existing on the plane $S_H$) orthogonal to the relative rotation axis should always be equal to each other. Consequently, the relative velocity $V_s$ ($= V_{s1} - V_{s2}$) at the point $C_s$ is like the shapes as shown in the same figure on the plane $S_H$ according to the location ($\Gamma_s$) of the relative rotation axis S, and the distance $C_2 C_s$ between the $C_2$ and the $C_s$ can be obtained by the following expression (27). That is, $C_2 C_s = E \tan \Gamma_s / \{ \tan(\Sigma - \Gamma_s) + \tan \Gamma_s \}$ (27).

The expression is effective within a range of $0 \leq \Gamma_s \leq \pi$, and the location of the $C_s$ changes together with the $\Gamma_s$, and the location of the point $C_s$ is located above the $C_1$ in case of $0 \leq \Gamma_s \leq \pi/2$, and the location of the point $C_s$ is located under the $C_1$ in case of $\pi/2 \leq \Gamma_s \leq \pi$.

10.2 Definition of Coordinate System $C_s$

Because the relative rotation axis S can be determined in a static space in accordance with the aforesaid expressions (26), (27), the coordinate system $C_S$ is defined as shown in FIG. 7. The coordinate system $C_S(u_c, v_c, z_c)$ is composed of $C_s$ as its origin, the directed common perpendicular $v_c$ as its $v_c$ axis, the relative rotation axis S as its $z_c$ axis (the positive direction thereof is the direction of $\omega_r$), and its $u_c$ axis taken to be perpendicular to both the axes as a right-handed coordinate system. Because it is supposed that a pair of gears being objects transmits a motion of a constant ratio of angular velocity, the coordinate system $C_s$ becomes a coordinate system fixed in the static space. And the coordinate system $C_s$ is a basic coordinate system in case of treating a pair of gears performing the transmission of the motion of constant ratio of angular velocity together with the previously defined coordinate systems $C_1$, $C_2$ and their derivative coordinate systems.

10.3 Relationship Among Coordinate Systems $C_S$, $C_1$, $C_2$

If the points $C_1$, $C_2$ are expressed to be $C_1(0, v_{cs1}, 0)$, $C_2(0, v_{cs2}, 0)$ by the use of the coordinate system $C_s$, $v_{cs1}$, $v_{cs2}$ are expressed by the following expressions (29).

$$v_{cs2} = C_S C_2 = E \tan \Gamma_s / \{ \tan(\Sigma - \Gamma_s) + \tan \Gamma_s \}$$

$$v_{cs1} = C_S C_1 = V_{cs2} - E = -E \tan(\Sigma - \Gamma_s) / \{ \tan(\Sigma - \Gamma_s) + \tan \Gamma_s \} \quad (29)$$

If it is noted that $C_2$ is always located above $C_s$ with respect to the $v_c$ axis, the relationships among the coordinate system $C_s$ and the coordinate systems $C_1$, $C_2$ can be expressed as the following expressions (30), (31) by means of $v_{cs1}$, $V_{cs2}$, $\Sigma$ and $\Gamma_s$.

$$u_{1c} = u_c \cos(\Sigma - \Gamma_s) + z_c \sin(\Sigma - \Gamma_s)$$

$$v_{1c} = v_c - v_{cs1}$$

$$z_{1c} = -u_c \sin(\Sigma - \Gamma_s) + z_c \cos(\Sigma - \Gamma_s) \quad (30)$$

$$u_{2c} = -u_c \cos \Gamma_s + z_c \sin \Gamma_s$$

$$v_{2c} = v_c - v_{cs2}$$

$$z_{2c} = -u_c \sin \Gamma_s - z_c \cos \Gamma_s \quad (31)$$

Figure 9:
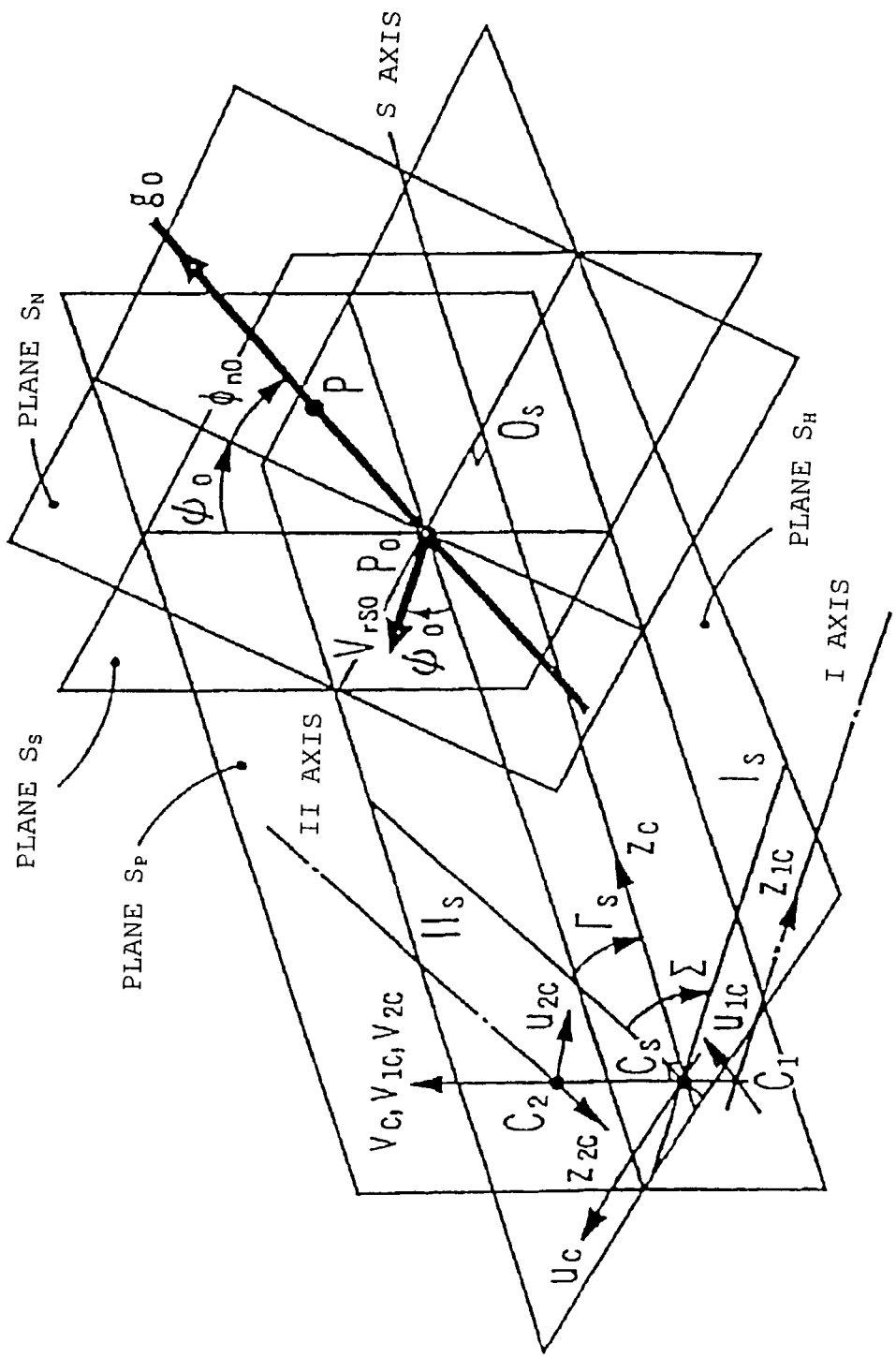
FIG. 9 is a figure showing a design reference point $P_0$, a relative velocity $V_{rs0}$ and a path of contact $g_0$ severally together with planes $S_H$, $S_S$, $S_P$ and $S_n$ for explaining the aforesaid variable determining method.

The relationships among the coordinate system $C_S$ and the coordinate systems $C_1$, $C_2$ is schematically shown in FIG. 9.

11. Definition of Path of Contact $g_0$ by Coordinate System $C_s$

11.1 Relationship Between Relative Velocity and Path of Contact $g_0$

Figure 10:
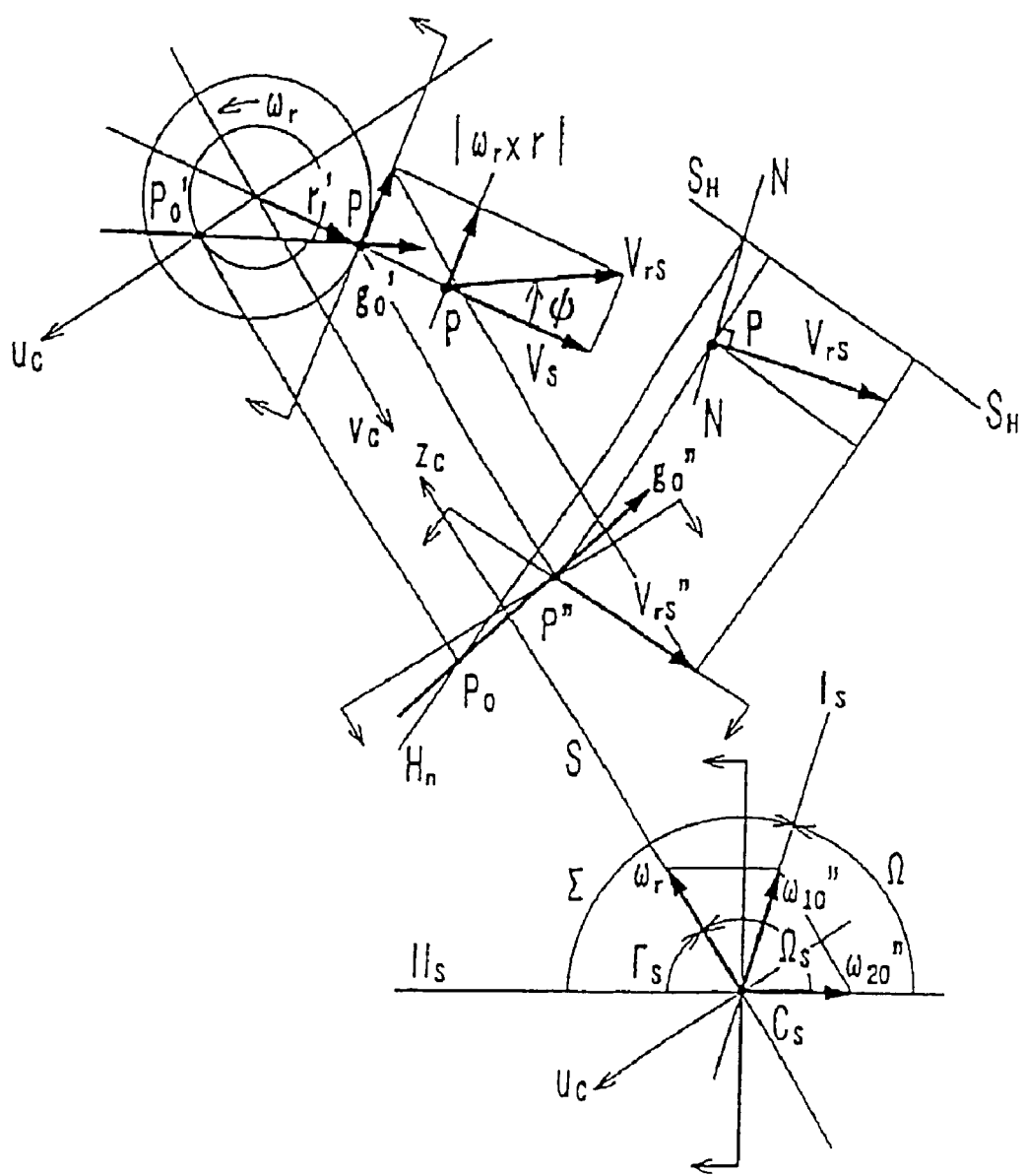
FIG. 10 is a figure showing a relationship between a relative velocity $V_{rs}$ and the path of contact $g_0$ at a point P for explaining the aforesaid variable determining method.

FIG. 10 shows a relationship between the given path of contact $g_0$ and a relative velocity $V_{rs}$ (vector) at an arbitrary point P on the $g_0$. Incidentally, "'" and "''" in the figure indicate an orthogonal projection on the plane being an object of a point or a vector. If the position vector of the P from an arbitrary point on the relative rotation axis S is designated by r when a tooth surface contacts at the arbitrary point P on the path of contact $g_0$, the relative velocity $V_{rs}$ at the point P can be expressed by the following expression (32).

$$V_{rs} = \omega_r \times r + V_s \quad (32)$$

where $$\omega_r = \omega_{10} - \omega_{20}$$

$$\omega_r = \omega_{20} \sin \Sigma / \sin(\Sigma - \Gamma_s) = \omega_{10} \sin \Sigma / \sin \Gamma_s$$

$$V_s = \omega_{10} \times [C_1 C_s] - \omega_{20} \times [C_2 C_s]$$

$$V_s = \omega_{20} E \sin \Gamma_s = \omega_{10} E \sin(\Sigma - \Gamma_s)$$

Here, $[C_1 C_s]$ indicates a vector having the $C_1$ as its starting point and the $C_s$ as its end point, and $[C_2 C_s]$ indicates a vector having the $C_2$ as its starting point and the $C_s$ as its end point.

The relative velocity $V_{rs}$ exists on a tangential plane of the surface of a cylinder having the relative rotation axis S as an axis, and an inclination angle $\psi$ to the $V_s$ on the tangential plane can be expressed by the following expression (33). Cos $\psi = |V_s|/|V_{rs}|$ ... (33)

Because the path of contact $g_0$ is also the common normal of a tooth surface at the point of contact, the $g_0$ is orthogonal to the relative velocity $V_{rs}$ at the point P.

$$V_{rs} \cdot g_0 = 0$$

Consequently, the $g_0$ is a directed straight line on a plane N perpendicular to $V_{rs}$ at the point P. If the line of intersection of the plane N and the plane $S_H$ is designated by $H_n$, the $H_n$ is normally a straight line intersecting with the relative rotation axis S, through and the $g_0$ necessarily passing through the $H_n$ if an infinite intersection point is included. If the intersection point of the $g_0$ with the plane $S_H$ is designated by $P_0$, then $P_0$ is located on the line of intersection $H_n$, and the $g_0$ and $P_0$ become as follows according to the kinds of pairs of gears.

(1) In Case of Cylindrical Gears of Bevel Gears ($\Sigma = 0$, $\pi$ or $E = 0$)

Because $V_s = 0$, the $V_{rs}$ simply means a peripheral velocity around the relative rotation axis S. Consequently, the plane N includes the S axis. Hence, $H_n$ coincides with the S, and the path of contact $g_0$ always passes through the relative rotation axis S. That is, the point $P_0$ is located on the relative rotation axis S. Consequently, as for these pairs of gears, the path of contact $g_0$ is an arbitrary directed straight line passing at the arbitrary point $P_0$ on the relative rotation axis.

(2) In Case of Gear other than Ones Described Above ($\Sigma \neq 0$, $\pi$ or $E \neq 0$)

In the case of a hypoid gear, a crossed helical gear or a worm gear, if the point of contact P is selected at a certain position, the relative velocity $V_{rs}$, the plane N and the straight line $H_n$, all peculiar to the point P, are determined. The path of contact $g_0$ is a straight line passing at the arbitrary point $P_0$ on the $H_n$, and does not pass at the relative rotation axis S normally. Because the point P is arbitrary, $g_0$ is also an arbitrary directed straight line passing at the point $P_0$ on a plane perpendicular to the relative velocity $V_{rs0}$ at the intersection point $P_0$ with the plane $S_H$. That is, the aforesaid expression (32) can be expressed as follows.

$$V_{rs} = V_{rs0} + \omega_r \times [P_0 P] g_0$$

Here, $[P_0 P]$ indicates a vector having the $P_0$ as its starting point and the P as its end point. Consequently, if $V_{rs0} \cdot g_0 = 0$, $V_{rs} \cdot g_0 = 0$, and the arbitrary point P on the $g_0$ is a point of contact.

11.2 Selection of Design Reference Point

Among pairs of gears having two axes with known positional relationship and the angular velocities, pairs of gears with an identical path contacts $g_0$ have an identical tooth profile corresponding to $g_0$, with the only difference between them being which part of the tooth profile is used effectively. Consequently, in a design of a pair of gears, it is important at which position in a static space determined by the two axes the path of contact $g_0$ is disposed. Further, because a design reference point is only a point for defining the path of contact $g_0$ in the static space, it does not cause any essential difference at which position on the path of contact $g_0$ the design reference point is selected. When an arbitrary path of contact $g_0$ is given, the $g_0$ necessarily intersects with a plane $S_H$ with the case where the intersection point is located at an infinite point. Accordingly, even when the intersection point is set as a design reference point, generality is not lost. In the present embodiment, it is designed to give the arbitrary point $P_0$ on the plane $S_H$ (on a relative rotation axis in case of cylindrical gears and a bevel gear) as the design reference point.

Figure 11:
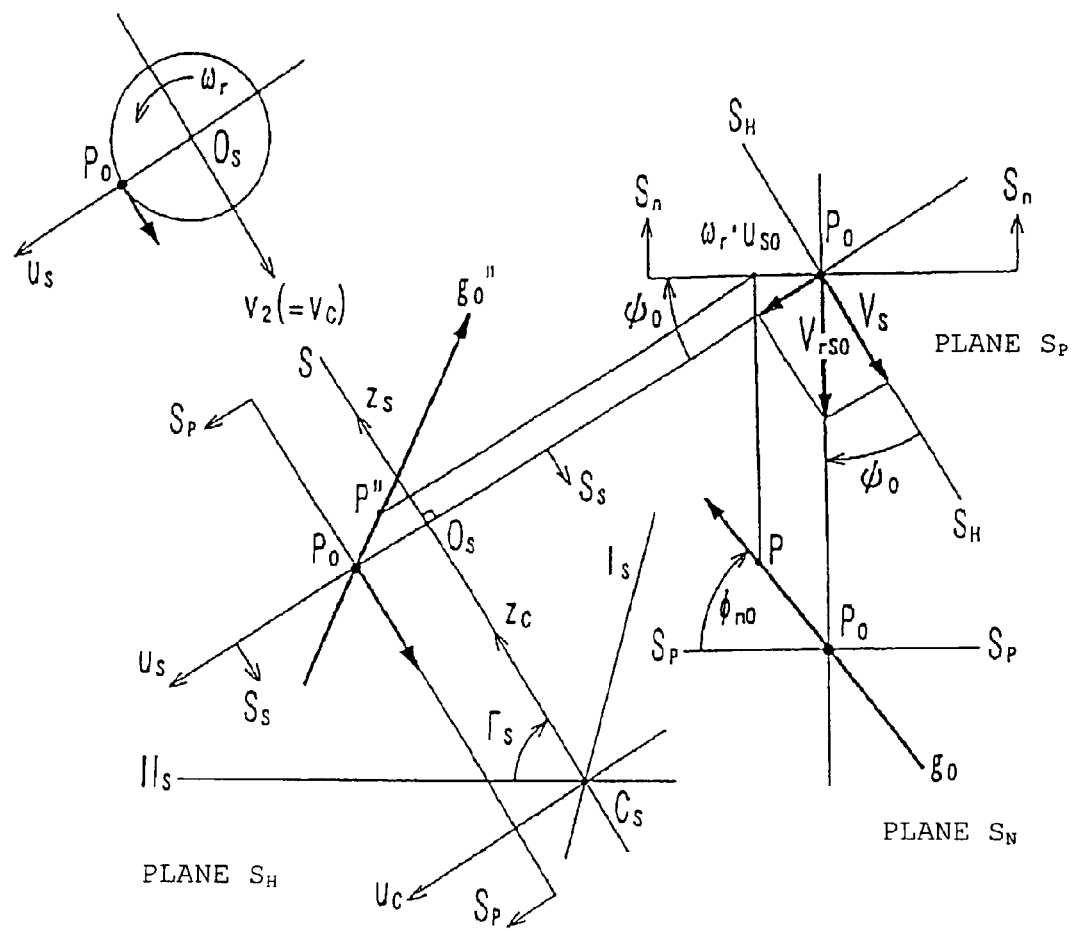
FIG. 11 is a figure showing the relative velocity $V_{rs0}$ and the path of contact $g_0$ at the design reference point $P_0$ severally in the coordinate system $C_s$ for explaining the aforesaid variable determining method.

FIG. 11 shows the design reference point $P_0$ and the path of contact $g_0$ by the use of the coordinate system $C_s$. When the design reference point expressed by means of the coordinate system $C_s$ is designated by $P_0(u_{c0}, v_{c0}, z_{c0})$, each coordinate value can be expressed as follows.

$$u_{c0} = O_s P_0$$

$$v_{c0} = 0$$

$$z_{c0} = C_s O_s$$

For cylindrical gears and a bevel gear, $u_{c0}=0$. Furthermore, the point $O_s$ is the intersection point of a plane $S_s$, passing at the design reference point $P_0$ and being perpendicular to the relative rotation axis S. and the relative rotation axis S.

11.3 Definition of Inclination Angle of Path of Contact $g_0$

The relative velocity $V_{rs0}$ at the point $P_0$ is concluded as follows by the use of the aforesaid expression (32).

$$V_{rs0} = \omega_r \times [u_{c0}] + V_s$$

where, $[u_{c0}]$ indicates a vector having the $O_s$ as its starting point and the $P_0$ as its end point. If a plane ($u_c = u_{c0}$) being parallel to the relative rotation axis S and being perpendicular to the plane $S_H$ at the point $P_0$ is designated by $S_p$, the $V_{rs0}$ is located on the plane $S_p$, and the inclination angle $\psi_0$ of the $V_{rs0}$ from the plane $S_H$ ($V_c = 0$) can be expressed by the following expression (34) by the use of the aforesaid expression (33).

$$\tan \psi_0 = \omega_r u_{c0}/V_s = u_{c0} \sin \Sigma / \{E \sin(\Sigma - \Gamma_s) \sin \Gamma_s\} \quad (34)$$

Incidentally, the $\psi_0$ is supposed to be positive when $u_{c0} \geq 0$, and the direction thereof is shown in FIG. 10.

If a plane passing at the point $P_0$ and being perpendicular to $V_{rs0}$ is designated by $S_n$, the plane $S_n$ is a plane inclining to the plane $S_s$ by the $\omega_0$, and the path of contact $g_0$ is an arbitrary directed straight line passing at the point $P_0$ and located on the plane $S_n$. Consequently, the inclination angle of the $g_0$ in the coordinate system $C_s$ can be defined with the inclination angle $\psi_0$ of the plane $S_n$ from the plane $S_s$ (or the $v_c$ axis) and the inclination angle $\phi_{n0}$ from the plane $S_p$ on the plane $S_n$, and the defined inclination angle is designated by $g_0$ ($\psi_0, \phi_{n0}$). The positive direction of the $\phi_{n0}$ is the direction shown in FIG. 11.

11.4. Definition of $g_0$ by Coordinate System $C_s$

FIG. 9 shows relationships among the coordinate system $C_s$, the planes $S_H$, $S_s$, $S_p$ and $S_n$, $P_0$ and $g_0$ ($\psi_0, \phi_{n0}$). The plane $S_H$ defined here corresponds to a pitch plane in case of cylindrical gears and an axis plane in case of a bevel gear according to the conventional theory. The plane $S_s$ is a transverse plane, and the plane $S_p$ corresponds to the axis plane of the cylindrical gears and the pitch plane of the bevel gear. Furthermore, it can be considered that the plane $S_n$ is a normal plane expanded to a general gear, and that the $\phi_{n0}$ and the $\psi_0$ also a normal pressure angle and a helical angle expanded to a general gear, respectively. By means of these planes, pressure angles and helical angles of ordinary pairs of gears can be expressed uniformly to static spaces as inclination angles to each plane of common normals (the $g_0$'s in this case) of points of contact. The planes $S_n$, $\phi_{n0}$ defined here coincide with those of a bevel gear of the conventional theory, and differ for other gears because the conventional theory takes pitch planes of individual gears as standards, and then the standards change to a static space according to the kinds of gears. By the conventional theory, if a pitch body of revolution (a cylinder or a circular cone) is determined, it is sufficient to generate a mating surface by fixing an arbitrary curved surface to the pitch body of revolution as a tooth surface, and in the conventional theory conditions of the tooth surface (a path of contact and the normal thereof) are not limited except the limitations of manufacturing. Consequently, the conventional theory emphasizes the selection of $P_0$ (for discussions about pitch body of revolution), and there has been little discussion concerning design of go (i.e. a tooth surface realizing the $g_0$) beyond the existence of tooth surface. For making fluctuations of a bearing load zero in the design of a pair of gears, the design of the $g_0$ is more important than the selection of the $P_0$.

As for a pair of gears having the given shaft angle $\Sigma$ thereof, the offset E thereof and the directions of angular velocities, the path of contact $g_0$ can generally be defined in the coordinate system $C_s$ by means of five independent variables of the design reference point $P_0$ ($u_{c0}, v_{c0}, z_{c0}$) and the inclination angle $g_0$ ($\psi_0, \phi_{n0}$). Because the ratio of angular velocity $i_0$ and $v_{c0}=0$ are given as conditions of designing in the present embodiment, there are three independent variables of the path of contact $g_0$. That is, the path of contact $g_0$ is determined in a static space by the selections of the independent variables of two of (the $z_{c0}$), the $\phi_{n0}$ and the $\psi_0$ in case of cylindrical gears because the $z_{c0}$ has no substantial meaning, three of the $z_{c0}$, the $\phi_{n0}$ and the $\psi_0$ in case of a bevel gear, or three of the $z_{c0}$, the $\phi_{n0}$ and the $\psi_0$ (or the $u_{c0}$) in case of a hypoid gear, a worm gear or a crossed helical gear. When the point $P_0$ is given, the $\psi_0$ is determined at the same time and only the $\phi_{n0}$ is a freely selectable variable in case of the hypoid gear and the worm gear. However, in case of the cylindrical gears and the bevel gear, because $P_0$ is selected on a relative rotation axis, both of $\psi_0$ and $\phi_{n0}$ are freely selectable variables.

12. Transformation of Path of Contact $g_0$ to Coordinate Systems $O_2$, $O_1$

12.1 Definition of Coordinate Systems $O_2$, $O_{q2}$, $O_1$, $O_{q1}$

Figure 12:
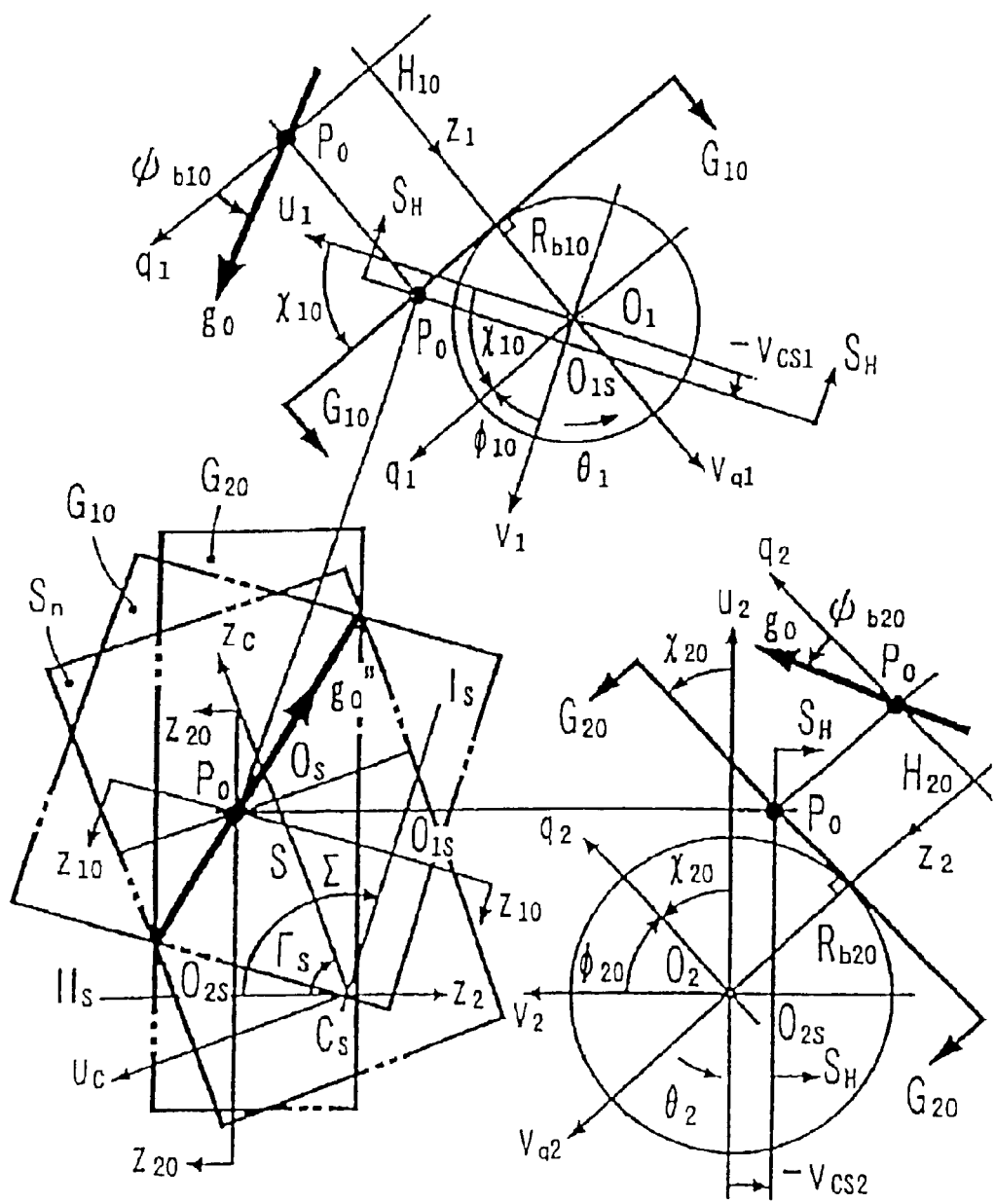
FIG. 12 is a figure showing the design reference point $P_0$ and the path of contact $g_0$ severally in coordinate systems $O_2$, $O_{q2}$, $O_1$ and $O_{q1}$ for explaining the aforesaid variable determining method.

FIG. 12 shows the path of contact $g_0$ in coordinate systems $O_2$, $O_{q2}$, $O_1$, $O_{q1}$. The coordinate systems $O_2(u_2, v_2, z_2)$ $O_{q2}(q_2, v_{q2}, z_2)$ are coordinate systems having an origin at the intersection point $O_2$ of a plane of rotation $Z_{20}$ of the axis of the gear II passing at the design reference point $P_0$ with the axis of the gear II, and the coordinate systems $O_2$ and $O_{q2}$ are the coordinate systems $C_2$, $C_{q2}$ displaced by $C_2O_2$ in the $z_{2c}$ axis direction in parallel. The coordinate systems $O_1(u_1, v_1, z_1)$, $O_{q1}(q_1, v_{q1}, z_1)$ are similarly coordinate systems having an origin being an intersection point $O_1$ of a plane of rotation $Z_{10}$ of the axis of the gear I passing at the point $P_0$ with the axis of the gear I, and the coordinate systems $O_1$ and $O_{q1}$ are the coordinate systems $C_1$ and $C_{q1}$ displaced by $C_1O_1$ in the $Z_{1c}$ axis direction in parallel.

12.2 Transformation Expression of Coordinates of Path of Contact

The relationships among the coordinate systems $C_2$ and $O_2$, $C_{q2}$ and $O_{q2}$, and $O_2$ and $O_{q2}$ are as follows.

(1) Coordinate Systems $C_2$ and $O_2$ $u_2 = u_{2c}$ $v_2 = v_{2c}$ $z_2 = z_{2c} z_{2c0}$ where $z_{2c0} = C_s O_{2s} = -(u_{c0} \sin \Gamma_s + z_{c0} \cos \Gamma_s)$ (2) Coordinate Systems $C_{q2}$ and $O_{q2}$ $q_2 = q_{2c}$ $v_2 = v_{q2c}$ $z_2 = z_{2c} - z_{2c0}$ where $z_{2c0} = C_s O_{2s} = -(u_{c0} \sin \Gamma_s + z_{c0} \cos \Gamma_s)$.

(3) Coordinate Systems $O_2$ and $O_{q2}$ ($Z_2$ are in Common)

$u_2 = q_2 \cos \chi_2 + R_{b2} \sin \chi_2$ $v_2 = q_2 \sin \chi_2 - R_{b2} \cos \chi_2$ $\chi_2 = \pi/2 - \phi_2$ Quite similarly, the relationships among the coordinate systems $C_1$ and $O_1$, $C_{q1}$ and $O_{q1}$, and $O_1$ and $O_{q1}$ are as follows.

(4) Coordinate Systems $C_1$ and $O_1$ $u_1 = u_{1c}$ $v_1 = v_{1c}$ $z_1 = z_{1c} - z_{1c0}$ where $Z_{1c0} = C_s O_{1s} = -u_{c0} \sin(\Sigma - \Gamma_s) + z_{c0} \cos(\Sigma - \Gamma_s)$.

(5) Coordinate Systems $C_{q1}$ and $O_{q1}$ $q_1 = q_{1c}$ $v_{q1} = v_{q1c}$ $z_1 = z_{1c} - z_{1c0}$ where $z_{1c0} = C_s O_{1s} = -u_{c0} \sin(\Sigma - \Gamma_s) + z_{c0} \cos(\Sigma - \Gamma_s)$ (6) Coordinate Systems $O_1$ and $O_{q1}$ ($z_1$ is in Common)

$u_1 = q_1 \cos \chi_1 + R_{b1} \sin \chi_1$ $v_1 = q_1 \sin \chi_1 - R_{b1} \cos \chi_1$ $\chi_1 = \pi/2 - \phi_1$, (7) Relationships Between Coordinate Systems $O_1$ and $O_2$ $u_1 = -u_2 \cos \Sigma - (z_2 + z_{2c0}) \sin \Sigma$ $v_1 = v_2 + E$ $z_1 = u_2 \sin \Sigma - (z_2 + z_{2c0}) \cos \Sigma - z_{1c0}$

12.3 Transformation Expression of Inclination Angle of Path of Contact

If a plane including $g_0$ and parallel to the gear axis II is set as the plane of action $G_{20}$, the inclination angle of the $g_0$ on the coordinate system $O_2$ can be expressed as $g_0(\phi_{20}, \psi_{b20})$ by means of the inclination angle $\phi_{20}$ (the complementary angle of the $\chi_{20}$) from the $v_2$ axis of the plane of action $G_{20}$ and the inclination angle $\psi_{b20}$ from the $q_2$ axis on the plane of action $G_{20}$. Quite similarly, the plane of action $G_{10}$ is defined, and the inclination angle of the $g_0$ can be expressed as $g_0(\phi_{10}, \psi_{b10})$ by means of the coordinate system $O_1$.

Figure 13:
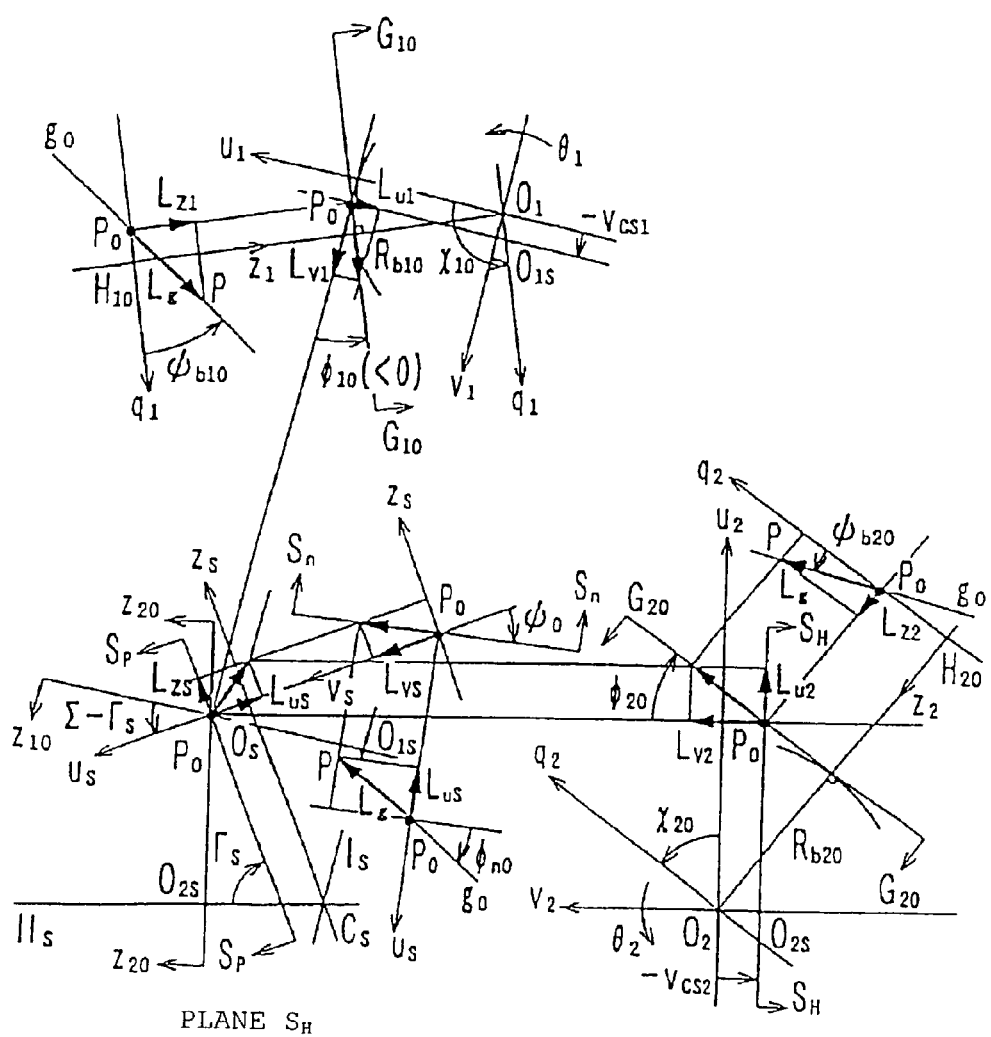
FIG. 13 is a figure showing a relationship among paths of contact $g_0(\psi_0, \phi_{n0})$, $g_0(\phi_{10}, \psi_{b10})$ and $g_0(\phi_{20}, \psi_{b20})$ for explaining the aforesaid variable determining method.

FIG. 13 shows relationships among $g_0$ ($\psi_0$, $\phi_{n0}$), $g_0(\phi_{10}, \psi_{b10})$ and $g_0(\phi_{20}, \psi_{b20})$. If it is assumed that a point of contact has moved from $P_0$ to $P$ on the path of contact $g_0$ due to the rotation of the pair of gears and the displacement $P_0 P = L_g$ (positive when $\theta_2 > 0$), each axis direction component of the coordinate system $C_s$ can be expressed as follows.

$L_{uc} = -L_g \sin \phi_{n0}$ ($L_{uc}$: the $u_c$ direction component of the $L_g$)

$L_{vc} = L_g \cos \phi_{n0} \cos \psi_0$ ($L_{vc}$: the $v_c$ direction component of the $L_g$)

$L_{zc} = L_g \cos \phi_{n0} \sin \psi_0$ ($L_{zc}$: the $z_c$ direction component of the $L_g$)

Each axis direction component of the coordinate system $O_2$ can be expressed as follows by means of expressions (31) using each axis direction component of the coordinate system $C_s$.

$L_{u2} = -L_{uc\,6} \cos \Gamma_s + L_{zc} \sin \Gamma_s$ ($L_{u2}$: the $u_2$ direction component of the $L_g$)

$L_{v2} = L_{vc}$ ($L_{v2}$: the $v_2$ direction component of the $L_g$)

$L_{z2} = -L_{uc} \sin \Gamma_s - L_{zc} \cos \Gamma_s$ ($L_{z2}$: the $z_2$ direction component of the $L_g$)

Consequently, the $g_0(\phi_{20}, \psi_{b20})$ is concluded as follows.

$\tan \phi_{20} = L_{u2}/L_{v2} = \tan \phi_{n0} \cos \Gamma_s / \cos \psi_0 + \tan \psi_0 \sin \Gamma_s$ \hfill (35)

$\sin \psi_{b20} = L_{z2}/L_g = \sin \phi_{n0} \sin \Gamma_s - \cos \phi_{n0} \sin \psi_0 \cos \Gamma_s$ \hfill (36)

Quite similarly, the $g_0(\phi_{10}, \psi_{b10})$ is concluded as follows.

$\tan \phi_{10} = L_{u1}/L_{v1 = -\tan\,\phi_{n0}} \cos(\Sigma - r\Gamma_s)/\cos \psi_0 + \tan \psi_0 \sin(\Sigma - \Gamma_s)$ \hfill (37)

$\sin \psi_{b10} = L_{z1}/L_g = \sin \phi_{n0} \sin(\Sigma - \Gamma_s) + \cos \phi_{n0} \sin \psi_0 \cos(\Sigma - \Gamma_s)$ \hfill (38)

From the expressions (35), (36), (37), and (38), relationships among the $g_0(\psi_0, \phi_{n0})$, the $g_0(\phi_{10}, \psi_{b10})$ and the $g_0(\phi_{20}, \psi_{b20})$ are determined. Because the above expressions are relatively difficult to use for variables other than $\phi_{n0}$ and $\psi_0$, relational expressions in the case where $g_0(\phi_{10}, \psi_{b10})$ and $g_0(\phi_{20}, \psi_{b20})$ are given are obtained here.

(1) Relational Expressions for Obtaining $g_0(\psi_0, \phi_{n0})$ and $g_0(\phi_{10}, \psi_{b10})$ from $g_0(\phi_{20}, \psi_{b20})$ $\sin \phi_{n0} = \cos \psi_{b20} \sin \phi_{20} \cos \Gamma_s + \sin \psi_{b20} \sin \Gamma_s$ \hfill (39)

$\tan \psi_0 = \tan \phi_{20} \sin \Gamma_s - \tan \psi_{b20} \cos \Gamma_s / \cos \phi_{20}$ \hfill (40)

$\tan \phi_{10} = \tan \phi_{20} \sin(\Sigma - \pi/2) - \tan \psi_{b20} \cos(\Sigma - \pi/2)/\cos \phi_{20}$ \hfill (41)

$\sin \psi_{b10} = \cos \psi_{b20} \sin \phi_{20} \cos(\Sigma - \pi/2) + \sin \psi_{b20} \sin(\Sigma - \pi/2)$ \hfill (42)

(2) Relational Expressions for Obtaining $g_0$ ($\psi_0$, $\phi_{n0}$) and $g_0$ ($\phi_{20}$, $\psi_{b20}$) from $g_0(\phi_{10}, \psi_{b10})$ $$\sin\phi_{n0}=-\cos\psi_{b10}\sin\phi_{10}\cos(\Sigma-\Gamma_s)+\sin\psi_{b10}\sin(\Sigma-\Gamma_s) \quad (43)$$

$$\tan\psi_0=\tan\phi_{10}\sin(\Sigma-\Gamma_s)+\tan\psi_{b10}\cos(\Sigma-\Gamma_s)/\cos\phi_{10} \quad (44)$$

$$\tan\phi_{20}=\tan\phi_{10}\sin(\Sigma-\pi/2)+\tan\psi_{b10}\cos(\Sigma-\pi/2)/\cos\phi_{10} \quad (45)$$

$$\sin\psi_{b20}=-\cos\psi_{b10}\sin\phi_{10}\cos(\Sigma-\pi/2)+\sin\psi_{b10}\sin(\Sigma-\pi/2) \quad (46)$$

12.4 Path of Contact $g_0$ Expressed by Coordinate System $O_2$

Figure 14:
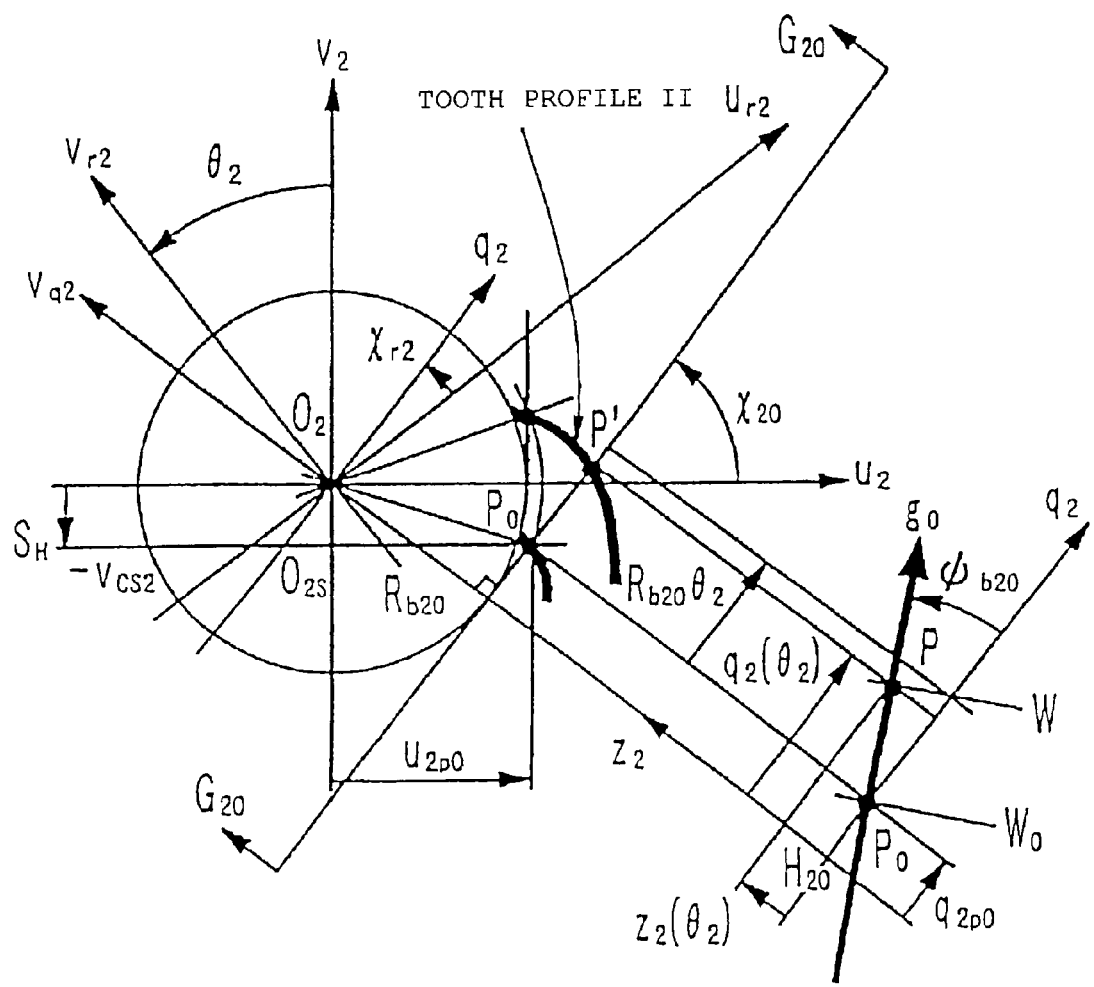
FIG. 14 is a figure showing the path of contact $g_0$ and a tooth profile II severally in the coordinate systems $O_2$ and $O_{r2}$ for explaining the aforesaid variable determining method.

Next, the equation of a path of contact by the coordinate system $O_2$ is described. FIG. 14 shows the path of contact $g_0$ and the corresponding tooth profile II. It is supposed that the path of contact $g_0$ contacts at the design reference point $P_0$ when $\theta_2=0$, and that the tangential plane at that time is designated by $W_0$ (expressed by a line of intersection with the plane of action in the same figure). It is also supposed that the point of contact has moved to the P and the tangential plane has moved to the W after the gear II has rotated by the $\theta_2$.

(1) Design Reference Point $P_0$

A design reference point is given at $P_0(u_{c0}, 0, z_{c0})$ by the coordinate system $C_s$. Here, it is assumed that $z_{c0}\geq 0$ and $u_{c0}=0$ especially in case of cylindrical gears and a bevel gear. Consequently, if the design reference point expressed by the coordinate system $O_2$ is designated by $P_0(u_{2p0}, -v_{cs2}, 0)$, $u_{2P0}$ can be expressed as follows by means of the expressions (31).

$$u_{2p0}=O_{2s}P_0=-u_{c0}\cos\Gamma_s+z_{c0}\sin\Gamma_s \quad (47)$$

Because the $g_0$ ($\phi_{20}$, $\psi_{b20}$) is given by the aforesaid expressions (35) and (36), if the $P_0(u_{2p0}, -v_{cs2}, 0)$ is expressed by the $P_0(q_{2p0}, -R_{b20}, 0)$ by transforming the $P_0$ ($u_{2p0}, -v_{cs2}, 0$) into the coordinate system $O_{q2}$, the $q_{2p0}$ and the $R_{b20}$ are as follows.

$$q_{2p0}=u_{2p0}\cos\chi_{20}-v_{cs2}\sin\chi_{20}$$

$$R_{b20}=u_{2p0}\sin\chi_{20}+v_{cs2}\cos\chi_{20}$$

$$\chi_{20}=\pi/2-\phi_{20} \quad (48)$$

(2) Equations of Path of Contact $g_0$

If the expressions (25) is transformed into the coordinate systems $O_2$ and $O_{q2}$ and the expressions (48) are substituted for the transformed expressions (25), the equations of the path of contact $g_0$ are concluded as follows by the coordinate system $O_2$ as the coordinates of the point of contact P at the rotation angle $\theta_2$. When $\theta_2=0$, the path of contact $g_0$ contacts at the design reference point $P_0$.

$$q_2(\theta_2)=R_{b20}\theta_2\cos^2\psi_{b20}+q_{2p0}$$

$$u_2(\theta_2)=q_2(\theta_2)\cos\chi_{20}+R_{b20}\sin\chi_{20}$$

$$v_2(\theta_2)=q_2(\theta_2)\sin\chi_{20}-R_{b20}\cos\chi_{20}$$

$$z_2(\theta_2)=R_{b20}\theta_2\cos\psi_{b20}\sin\psi_{b20} \quad (49)$$

12.5 Path of Contact $g_0$ Expressed by Coordinate System $O_1$

Figure 15:
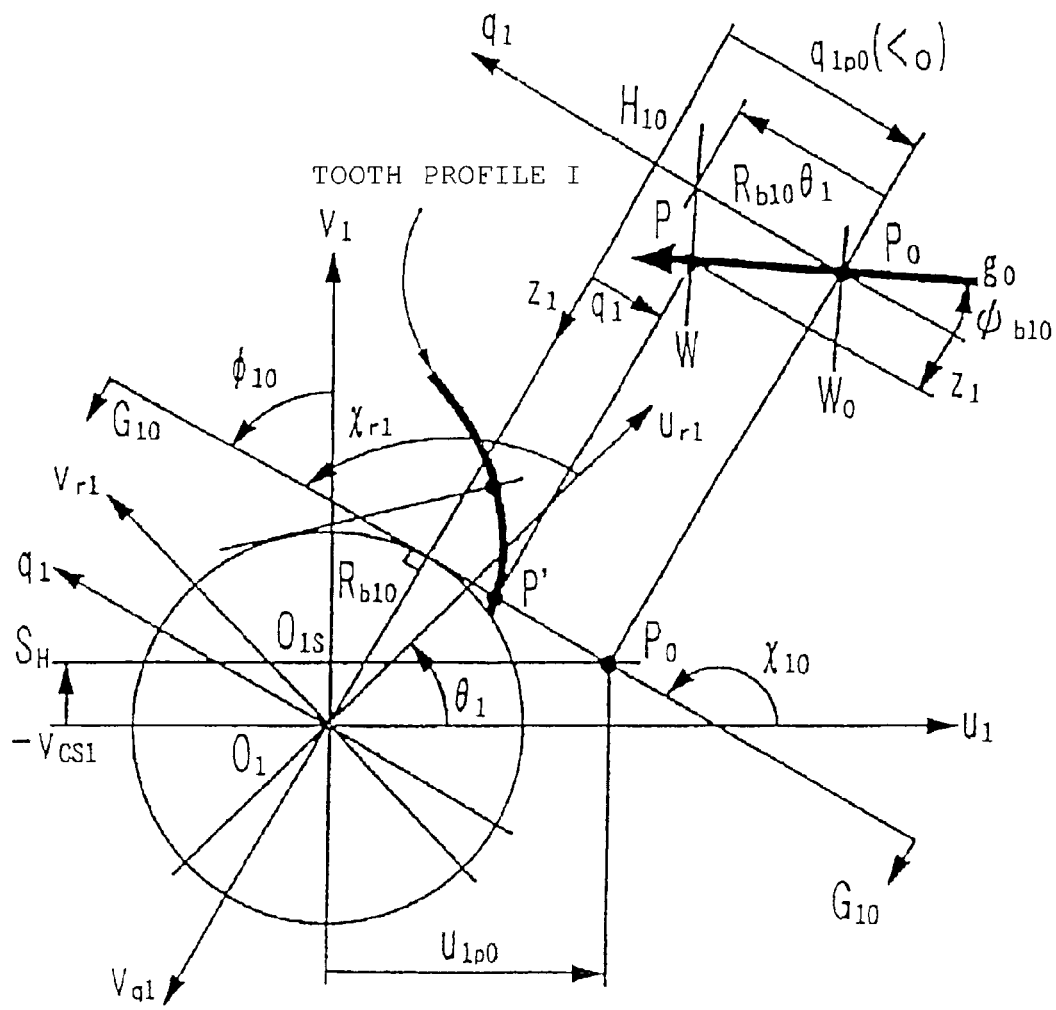
FIG. 15 is a figure showing the path of contact $g_0$ and a tooth profile I severally in the coordinate systems $O_1$ and $O_{r1}$ for explaining the aforesaid variable determining method.

FIG. 15 shows the path of contact $g_0$ and the corresponding tooth profile I. Because $g_0$ ($\phi_{10}, \psi_{b10}$) is given by the aforesaid expressions (37) and (38), if the design reference point $P_0(u_{c0}, 0, z_{c0})$ is transformed into the coordinate systems $O_1$ and $O_{q1}$ to be expressed by $P_0(u_{1po}, -v_{cs1}, 0)$ and $p_0(q_{1po}, -R_{b10}, 0)$ quite similarly to the case of coordinate system $O_2$, $u_{1p0}$, $q_{1p0}$ and $R_{b10}$ are concluded as follows by means of the aforesaid expressions (30).

$$u_{1p0}=O_{1s}P_0=u_{c0}\cos(\Sigma-\Gamma_s)+z_{c0}\sin(\Sigma-\Gamma_s)$$

$$q_{1p0}=u_{1p0}\cos\chi_{10}-v_{cs1}\sin\chi_{10}$$

$$R_{b10}=u_{1p}\sin\chi_{10}+v_{cs1}\cos\chi_{10}$$

$$\chi_{10}=\pi/2-\phi_{10}$$

Consequently, the equations of the path of contact $g_0$ are concluded as follows by expressing the aforesaid expressions (25) using the coordinate systems $O_1$ and $O_{q1}$ and $\theta_1$.

$$\theta_1=i_0\theta_2 \ (\theta_1=0 \text{ when } \theta_2=0)$$

$$q_1(\theta_1)=R_{b10}\theta_1\cos^2\psi_{b10}+q_{1p0}$$

$$u_1(\theta_1)=q_1(\theta_1)\cos\chi_{10}+R_{b10}\sin\chi_{10}$$

$$v_1(\theta_1)=q_1(\theta_1)\sin\chi_{10}-R_{b10}\cos\chi_{10}$$

$$z_1(\theta_1)=R_{b10}\theta_1\cos\psi_{b10}\sin\psi_{b10} \quad (49\text{-}1)$$

Because the path of contact $g_0$ is given as a straight line fixed in static space and the ratio of angular velocity is constant, the equations of the path of contact can be expressed in the same form independently from the positional relationship of the two axes.

13. Equations of Tooth Profile

13.1 Equations of Tooth Profile II

FIG. 14 shows a tooth profile II using a coordinate system $O_{r2}$ ($u_{r2}$, $V_{r2}$, $z_{r2}$) rotating at the $\theta_2$ together with the gear II. The coordinate system $O_{r2}$ has an origin $O_2$ and a $z_2$ axis in common with the coordinate system $O_2$, and coincide at the time of $\theta_2=0$. Because the path of contact $g_0$ is given by the expressions (49), the equations of the tooth profile II expressed by the rotary coordinate system $O_{r2}$ are concluded as follows.

$$\chi_{r2}=\chi_{20}-\theta_2=\pi/2-\phi_{20}-\theta_2$$

$$u_{r2}=q_2(\theta_2)\cos\chi_{r2}+R_{b20}\sin\chi_{r2}$$

$$v_{r2}=q_2(\theta_2)\sin\chi_{r2}-R_{b20}\cos\chi_{r2}$$

$$z_{r2}=R_{b20}\theta_2\cos\psi_{b20}\sin\psi_{b20} \quad (50)$$

13.2 Equations of Tooth Profile I

FIG. 15 shows a tooth profile I in a coordinate system $O_{r1}$ ($u_{r1}$, $v_{r1}$, $z_{r1}$) rotating at $\theta_1$ together with the gear I and the coordinate system $O_1$. The origin $O_1$ and the $z_1$ axis of coordinate system $O_{r1}$ are in common with those of the coordinate system $O_1$, with which it corresponds at the time of $\theta_1=0$. Because the path of contact $g_0$ is given by the expressions (49-1), equations of the tooth profile I expressed by the rotary coordinate system $O_{r1}$ are concluded as follows.

$$\chi_{r1}=\chi_{10}-\theta_1=\pi/2-\phi_{10}-\theta_1$$

$$u_{r1}=q_1(\theta_1)\cos\chi_{r1}-R_{b10}\sin\chi_{r1}$$

$$v_{r1}=q_1(\theta_1)\sin\chi_{r1}-R_{b10}\cos\chi_{r1}$$

$$z_{r1}=R_{b10}\theta_1\cos\psi_{b10}\sin\psi_{b10} \quad (53)$$

Next, a specific method for determining a tooth surface from a determined tooth profile is described in detail on the basis of the figures.

14. Definition of a Pair of Gears as Objects

It is supposed that an involute pair of gears being objects of the invention is defined as follows. If the tooth profiles corresponding to the path of contact $g_0$ are severally supposed to be the tooth profiles I, II, an involute helicoid including the tooth profile II is given as the tooth surface II, and a curved surface generated by the tooth surface II at the constant ratio of angular velocity $i_0$ is supposed to be the tooth surface I (consequently including the tooth profile I). If the tooth surfaces of the involute pair of gears defined in such a way are made to contact with each other along the tooth profiles I, II, fluctuations of a bearing load become zero. Consequently the involute pair of gears becomes the most advantageous pair of gears as a pair of gears for power transmission in view of the fluctuations of a load. Then, hereinafter, the relational expression of the involute pair of gears, i.e. equations of the involute helicoid, the surface of action thereof and the conjugate tooth surface I thereof, are described.

15. Equations of Involute Helicoid (Tooth Surface II)

15.1 Equations of Plane of Action $G_{20}$

Figure 16:
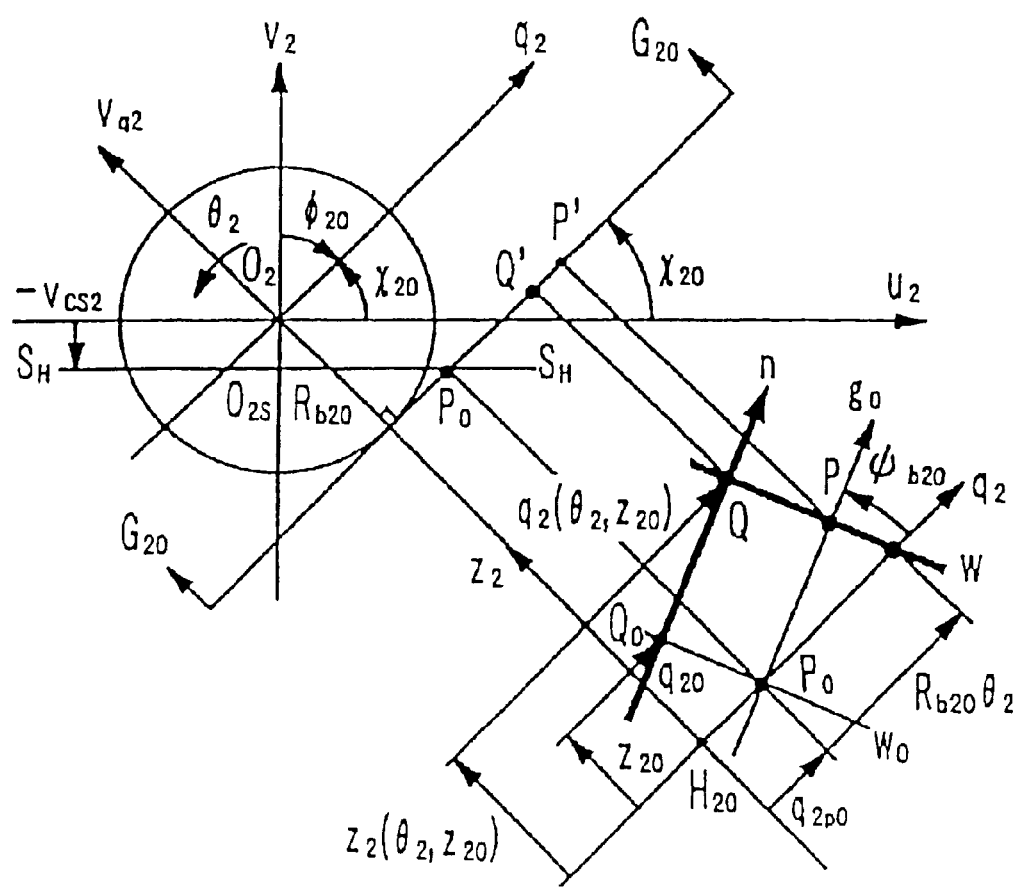
FIG. 16 is a figure showing a plane of action $G_{20}$ for explaining a specific method for determining a tooth surface from a tooth profile (Hereinafter, referred to simply as a "tooth surface determining method").

FIG. 16 shows the plane of action $G_{20}$ (the inclination angle thereof: $\chi_{20}=\pi/2-\phi_{20}$) including the design reference point $P_0$ and the path of contact $g_0$, both being given by the aforesaid expressions (25) using the coordinate systems $O_2$, $O_{q2}$. The line of intersection of the tangential plane $W_0$ and the $G_{20}$ at the point $P_0$ is shown as a straight line $w_0$. It is assumed that the point of contact $P_0$ has moved to the P and the $w_0$ has moved to the w when the gear II has rotated by $\theta_2$.

Because the tooth surface normal n of an arbitrary point on the w is located on the plane of action $G_{20}$ and the inclination angle $\psi_{b20}$ of the tooth surface normal n from the $q_2$ axis is constant in accordance with the definition of the involute helicoid, the w is a straight line passing at the point P on the $g_0$ and perpendicular to $g_0$. Consequently, the involute helicoid can be defined to be a trajectory surface drawn by the line of intersection w, moving on the $G_{20}$ in the $q_2$ axis direction by $R_{b20}\theta_2$ in parallel together with the rotation of the gear II (rotation angle is $\theta_2$), in a rotating space (the coordinate system $O_{r2}$) fixed to the gear II. Then, if an arbitrary point on the straight line w is designated by Q and the point Q is expressed by the coordinate system $O_{r2}$, the involute helicoid to be obtained can be expressed as a set of Q values.

If a directed straight line passing at the arbitrary point Q on the w and located on the plane of action $G_{20}$ perpendicular to w is designated by n (the positive direction thereof is the same as that of $g_0$) and the intersection point of n and $w_0$ is designated by $Q_0$, the point $Q_0$ ($q_{20}$, $-R_{b20}$, $z_{20}$) expressed by the coordinate system $O_{q2}$ can be determined as follows.

$$q_{20}=q_{2p0}-z_{20}\tan\psi_{b20}$$

Consequently, if the point Q is expressed by the coordinate system $O_{q2}$, the $Q(q_2, -R_{b20}, z_2)$ is expressed as follows.

$$q_2(\theta_2, z_{20})=R_{b20}\theta_2\cos^2\psi_{b20}+q_{20}=R_{b20}\theta_2\cos^2\psi_{b20}+q_{2p0}-z_{20}\tan\psi_{b20}$$

$$z_2(\theta_2, z_{20})=R_{b20}\theta_2\cos\psi_{b20}\sin\psi_{b20}+z_{20}$$

Moreover, if the point Q is expressed by the coordinate system $O_2$, the $Q(u_2, n_2, z_2)$ is found as follows.

$$q_2(\theta_2, z_{20})=R_{b20}\theta_2\cos^2\psi_{b20}+q_{2p0}-z_{20}\tan\psi_{b20}$$

$$u_2(\theta_2, z_{20})=q_2(\theta_2, z_{20})\cos\chi_{20}+R_{b20}\sin\chi_{20}$$

$$v_2(\theta_2, z_{20})=q_2(\theta_2, z_{20})\sin\chi_{20}-R_{b20}\cos\chi_{20}$$

$$z_2(\theta_2, z_{20})=R_{b20}\theta_2\cos\psi_{b20}\sin\psi_{b20}+z_{20} \quad (54)$$

The expressions (54) is the equation of the plane of action $G_{20}$ that is expressed by the coordinate system $O_2$ by the use of the $\theta_2$ and the $z_{20}$ as parameters. If the $\theta_2$ is fixed, the line of intersection w of the tangential plane W and the plane of action $G_{20}$ is expressed, and if the $z_{20}$ is fixed, the directed straight line n on the plane of action is expressed. Because the path of contact $g_0$ is also a directed straight line n passing at the point $P_0$ the aforesaid expression (49) can be obtained by the setting of $z_{20}=0$.

15.2 Equations of Involute Helicoid

If the straight line w in FIG. 16 is transformed into a coordinate system rotating together with the gear II, the locus of the straight line w draws an involute helicoid (the base cylinder radius thereof: $R_{b20}$, the helical angle thereof: $\psi_{b20}$). Accordingly, it is supposed that the locus of the straight line w is given as the tooth surface II. At this point, the directed straight line n at the point Q is the tooth surface normal n.

Figure 17:
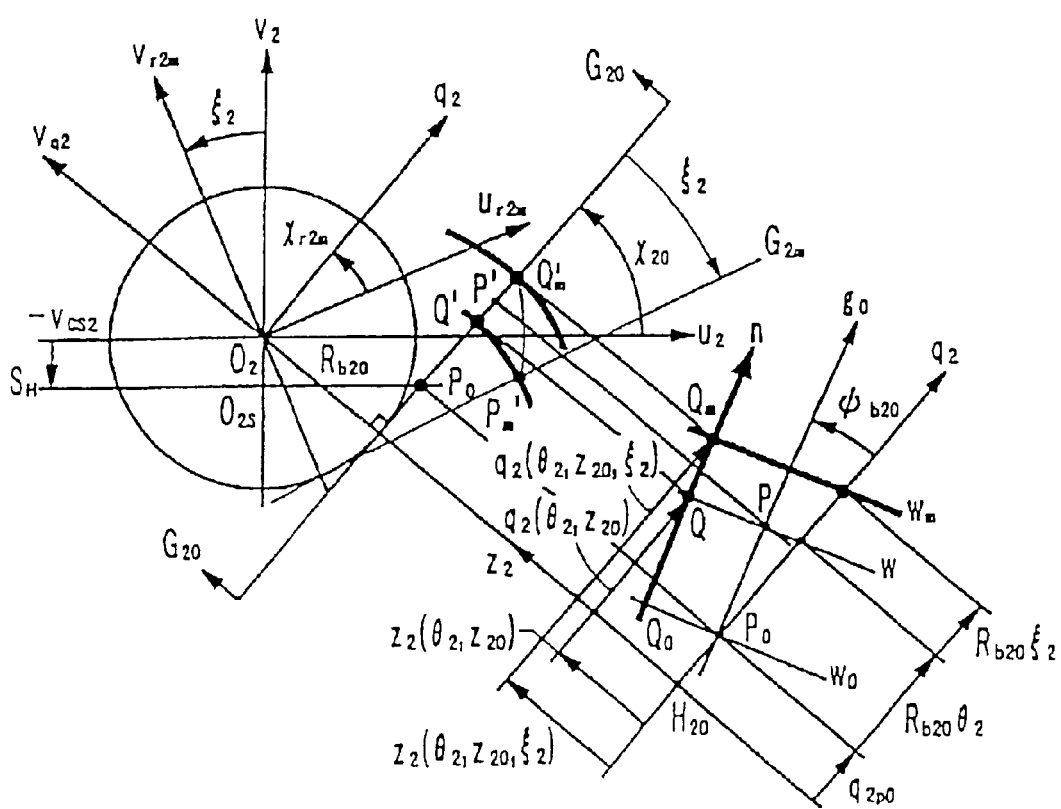
FIG. 17 is a figure showing an involute helicoid at a rotation angle $\theta_2$ for explaining the aforesaid tooth surface determining method.

FIG. 17 shows an arbitrary point $P_m$ on an involute helicoid (the tooth surface II) passing at the straight line w at the rotation angle $\theta_2$ in the coordinate system $O_2$. If it is supposed that the w is at $w_m$ when the tooth surface II has further rotated from the w by $\xi_2$, the intersection point $Q_m$ of the $w_m$ and the n can be expressed as follows.

$$q_{2m}(\theta_2, z_{20}, \xi_2)=q_2(\theta_2, z_{20})+R_{b20}\xi_2\cos^2\psi_{b20}$$

$$z_{2m}(\theta_2, z_{20}, \xi_2)=z_2(\theta_2, z_{20})+R_{b20}\xi_2\cos\psi_{b20}\sin\psi_{b20}$$

If a rotary coordinate system $O_{r2m}$ is a coordinate system that coincides with the coordinate system $O_2$ when the rotation angle $\theta_2$ and rotates by the $\xi_2$ around the $z_2$ axis, $Q_m(u_{r2m}, v_{r2m}, z_{r2m})$ can be expressed by the coordinate system $O_{r2m}$ as follows.

$$\chi_{r2m}=\chi_{20}-\xi_2=\pi/2-\phi_{20}-\xi_2$$

$$u_{r2m}(\theta_2, z_{20}, \xi_2)=q_{2m}(\theta_2, z_{20}, \xi_2)\cos\chi_{r2m}+R_{b20}\sin\chi_{r2m}$$

$$v_{r2m}(\theta_2, z_{20}, \xi_2)=q_{2m}(\theta_2, z_{20}, \xi_2)\sin\chi_{r2m}-R_{b20}\cos\chi_{r2m}$$

$$z_{r2m}(\theta_2, z_{20}, \xi_0)=z_2(\theta_2, z_{20})+R_{b20}\xi_2\cos\psi_{b20}\sin\psi_{b20}$$

If the coordinate system $O_{r2m}$ is rotated by the $\xi_2$ in the reverse direction of the $\theta_2$ to be superposed on the coordinate system $O_2$, the $Q_m$ moves to the $P_m$. Because the point $Q_m$ on the coordinate system $O_{r2m}$ is the point $P_m$ on the coordinate system $O_2$ and both of points have the same coordinate values, the $P_m(u_{2m}, v_{2m}, z_{2m})$ becomes as follows if the point $P_m$ is expressed by the coordinate system $O_2$.

$$\chi_{2m}=\chi_{20}-\xi_2=\pi/2-\phi_{20}-\xi_2$$

$$q_{2m}(\theta_2, z_{20}, \xi_2)=q_2(\theta_2, z_{20})+R_{b20}\xi_2\cos^2\psi_{b20}$$

$$u_{2m}(\theta_2, z_{20}, \xi_2)=q_{2m}(\theta_2, z_{20}, \xi_2)\cos\chi_{2m}+R_{b20}\sin\chi_{2m}$$

$$v_{2m}(\theta_2, z_{20}, \xi_2)=q_{2m}(\theta_2, z_{20}, \xi_2)\sin\chi_{2m}-R_{b20}\cos\chi_{2m}$$

$$z_{2m}(\theta_2, z_{20}, \xi_2)=z_2(\theta_2, z_{20})+R_{b20}\xi_2\cos\psi_{b20}\sin\psi_{b20} \quad (55)$$

The expressions (55) are equations of the involute helicoid (the tooth surface II) passing at the point P on the path of contact $g_0$ at the arbitrary rotation angle $\theta_2$ and using the $z_{20}$ and the $\xi_2$ as parameters by the coordinate system $O_2$. Supposing $\theta_2=0$, the expressions (55) define the tooth surface II passing at the design reference point $P_0$. Moreover, supposing $z_{20}=0$, the expressions (55) become the expressions (50), i.e. the tooth profile II passing at the point $P_0$. Or, the expressions (55) can be considered as the equations of the point $P_m$ on a plane $G_{2m}$, being the point $Q_m$ on the plane of action $G_{20}$ rotated by the $\xi_2$ into the reverse direction of the $\theta_2$, by the coordinate system $O_2$. When the involute helicoid passing at the point P is examined on the coordinate system $O_2$, the latter interpretation simplifies analysis.

16. Line of Contact and Surface of Action

When the tooth surface II is given by the expressions (55), the line of contact passing at the point P is a combination of the $z_{20}$ and the $\xi_2$, both satisfying the requirement for contact when the $\theta_2$ is fixed. Consequently, the line of contact can be obtained as follows by the use of the $\xi_2$ as a parameter.

16.1 Common Normal $n_m(P_{m0}P_m)$ of Point of Contact

Figure 18:
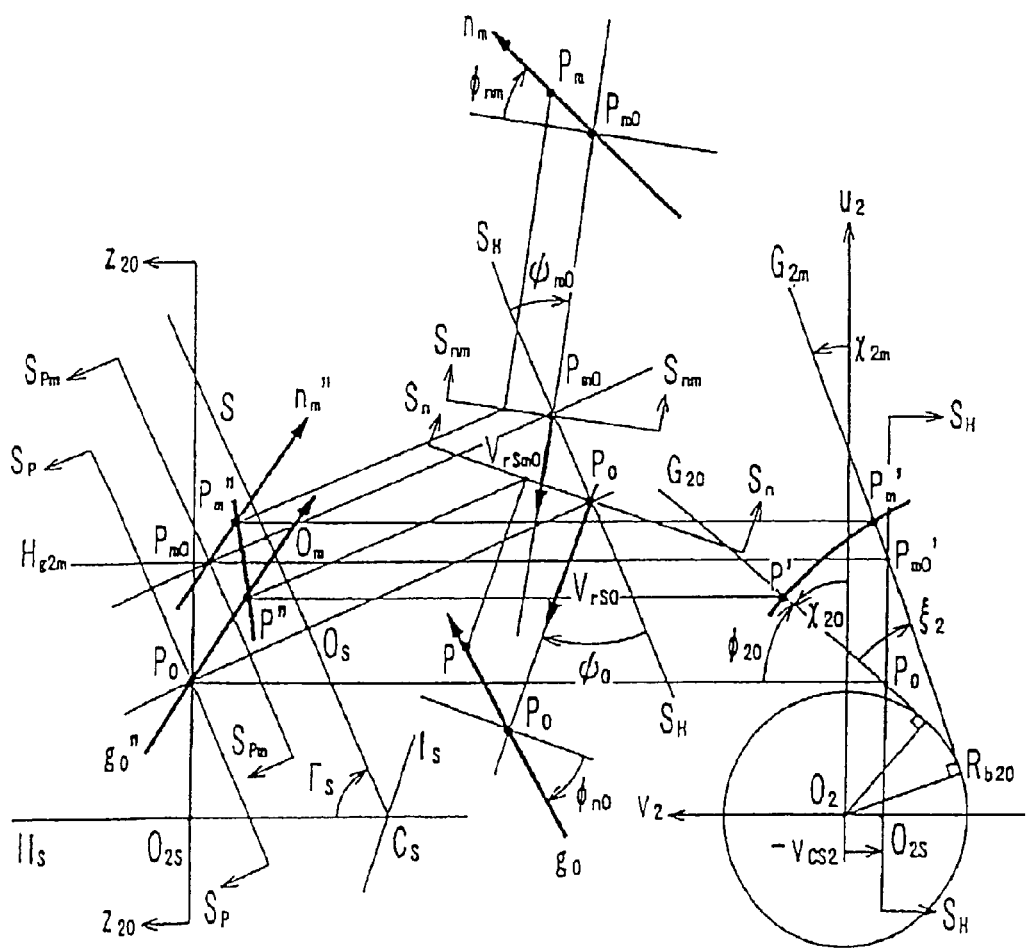
FIG. 18 is a figure showing a common normal $n_m(P_{m0} P_m)$ and a line of contact $PP_m$ for explaining the aforesaid tooth surface determining method.

FIG. 18 shows a line of contact $PP_m$ and a common normal $n_m(P_{m0}P_m)$ at the point of contact $P_m$. It is assumed that the gear II has rotated by the $\theta_2$ and the point of contact is positioned at the point P on the path of contact $g_0$. The point of contact $P_m$ other than the P is set on the tooth surface II, and the relative velocity of the point of contact $P_m$ is designated by $V_{rsm}$, and the common normal of the point of contact $P_m$ is designated by $n_m (|n_m|=1)$. If the intersection point of the $n_m$ with the plane $S_H$ is designated by $P_{m0}$ and the relative velocity of the point $P_{m0}$ is designated by $V_{rsm0}$, because the $P_m$ is a point of contact, the following relational expressions hold true.

$$n_m \cdot V_{rsm} = n_m \cdot (V_{rsm0} + \omega_r \times [P_{m0}P_m] \cdot n_m) = n_m \cdot V_{rsm0} = 0$$

where $[P_{m0}P_m]$ indicates vector having the $P_{m0}$ as its starting point and the $P_m$ as its end point.

Because the relative velocity $V_{rsm0}$ is located on the plane $S_{pm}$ passing at the $P_{m0}$ and being parallel to the plane $S_p$, an inclination angle on the plane $S_{pm}$ to the plane $S_H$ is designated by $\psi_{m0}$. If a plane passing at the point $P_{m0}$ and being perpendicular to the $V_{rsm0}$ is designated by $S_{nm}$, the plane $S_{nm}$ includes the $n_m(P_{m0}P_m)$. Consequently, the plane $S_{nm}$ is a normal plane (the helical angle thereof: $\psi_{m0}$) at the point $P_m$. On the other hand, because the point of contact $P_m$ and the common normal $n_m$ thereof are located on the plane $G_{2m}$ inclining by the $\xi_2$ from the plane of action $G_{20}$ passing at the $P_0$, the inclination angle of the $n_m$ expressed by the coordinate system $O_2$ is given by $n_m(\phi_{20}+\xi_2, \psi_{b20})$. Because the common normal $n_m$ is located on the line of intersection of the plane $S_{nm}$ and the $G_{2m}$, the helical angle $\psi_{m0}$ of the plane $S_{nm}$ can be expressed as follows by the use of the transformation expression (40) of the inclination angle between the coordinate system $C_s$ and the coordinate system $O_2$.

$$\tan \psi_{m0} = \tan(\phi_{20}+\xi_2) \sin \Gamma_s - \tan \psi_{b20} \cos \Gamma_s / \cos(\phi_{20}+\xi_2)$$

When the position of the point $P_{m0}$ is designated by $P_{m0}$ $(u_{cm0}, 0, z_{cm0})$ using the coordinate system $C_s$, the following expressions (56) can be obtained from the relational expression (34) of the $\psi_{m0}$ and the $u_{cm0}$.

$$u_{cm0} = O_m P_{m0} = E \tan \psi_{m0} \sin(\Sigma-\Gamma_s) \sin \Gamma_s / \sin \Sigma$$

$$z_{cm0} = C_s O_m \tag{56}$$

If the point $P_{m0}$ is transformed from the coordinate system $C_s$ to the coordinate system $O_2$ and is expressed by $P_{m0}$ $(u_{2m0}, -v_{cs2}, z_{2m0})$, the point $P_{m0}$ can be expressed as follows, $$u_{2m0} = -u_{cm0} \cos \Gamma_s + z_{cm0} \sin \Gamma_s$$

$$v_{cs2} = E \tan \Gamma_s / \{\tan(\Sigma-\Gamma_s) + \tan \Gamma_s\}$$

$$z_{2m0} = -u_{cm0} \sin \Gamma_s - z_{cm0} \cos \Gamma_s - z_{2cs}$$

$$z_{2c0} = -u_{c0} \sin \Gamma_s - z_{c0} \cos \Gamma_s \tag{57}$$

where the $u_{c0}$ and the $z_{c0}$ are the $u_c$ and the $z_c$ coordinate values of a design reference point $P_0$.

If the $z_{cm0}$ is eliminated from the expressions (57), the following expression can be obtained.

$$u_{2m0} \cos \Gamma_s + (z_{2m0}+z_{2cs}) \sin \Gamma_s = -u_{cm0} \tag{58}$$

The expression (58) indicates the locus $P_0P_{m0}$ of the common normal $n_m$ of the point of contact on the plane $S_H$. Because $P_{m0}$ is an intersection point of the locus $P_0P_{m0}$ (the aforesaid expression (58)) and the line of intersection $H_{g2m}$ of the plane of action $G_{2m}$ and the plane $S_H$, $P_{m0}$ can be expressed as follows by the coordinate system $O_2$ by the use of $\xi_2$ as a parameter.

$$u_{2m0} = R_{b20}/\cos(\phi_{20}+\xi_2) - v_{cs2} \tan(\phi_{20}+\xi_2)$$

$$v_{cs2} = E \tan \Gamma_s / \{\tan(\Sigma-\Gamma_s) + \tan \Gamma_s\}$$

$$z_{2m0} = -z_{2c0} - (u_{2m0} \cos \Gamma_s + u_{cm0})/\sin \Gamma_s \tag{59}$$

If the point $P_{m0}$ is expressed by $P_{m0}$ $(q_{2m0}, -R_{b20}, z_{2m0})$ by the use of the coordinate system $O_{q2}$, $q_{2m0}$ can be expressed as follows.

$$q_{2m0} = u_{2m0} \cos \chi_{2m} - vcs2 \sin \chi_{2m}$$

$$\chi_{2m} = \pi/2 - \phi_{20} - \xi_2 = \chi_{20} - \xi_2$$

With these expressions, the common normal $n_m$ can be expressed on the plane of action $G_{2m}$ by the use of $\xi_2$ as a parameter as a directed straight line passing at the point $P_{m0}$ and having an inclination angle of $n_m(\phi_{20}+\xi_2, \psi_{b20})$.

16.2 Equations of Line of Contact and Surface of Action

Figure 19:
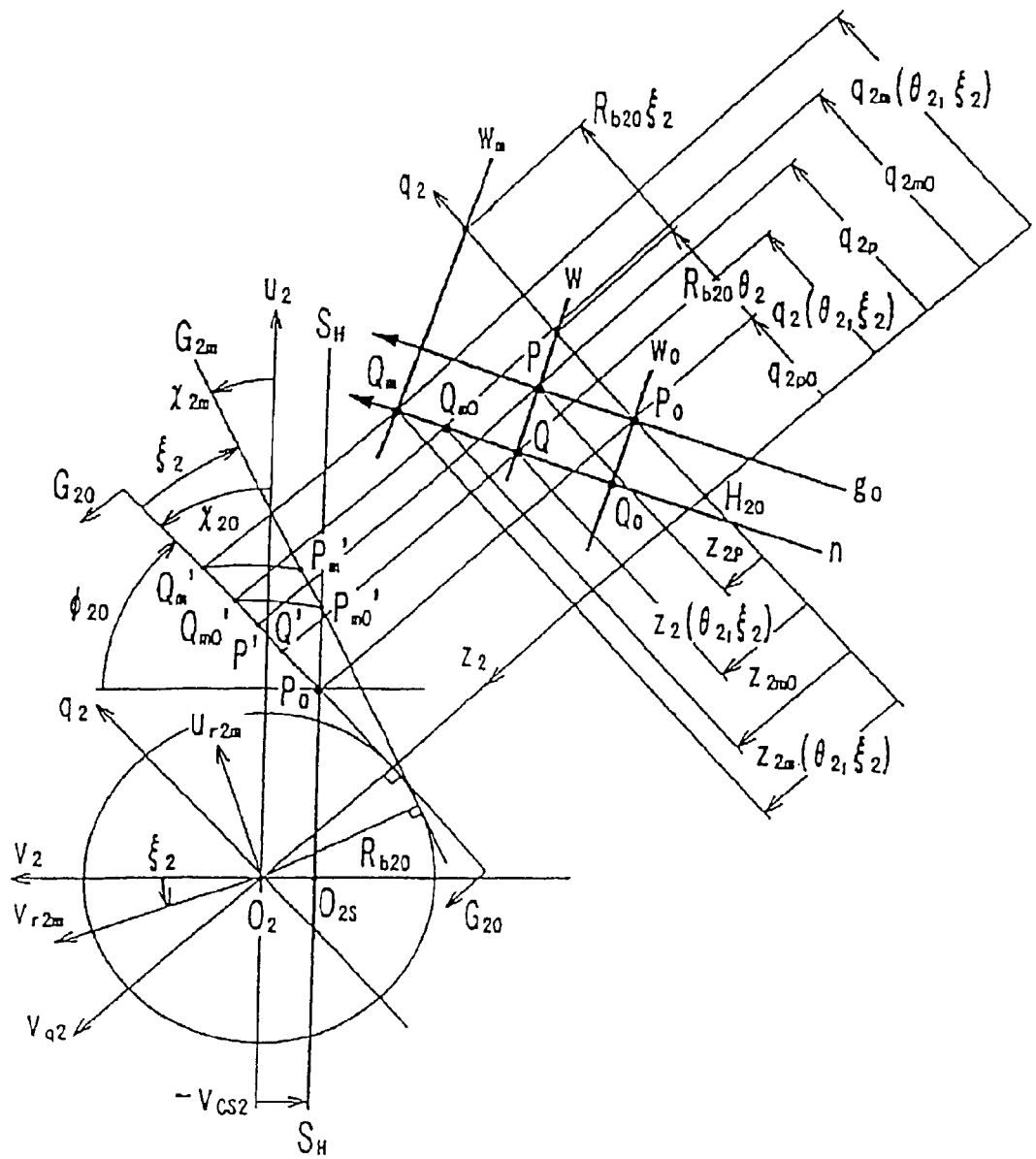
FIG. 19 is a figure showing a relationship among points $Q_{m0}$ ($P_{m0}$), $Q_m$ ($P_m$), Q and P on the plane of action $G_{20}$ for explaining the aforesaid tooth surface determining method.

FIG. 19 shows relationships among points $Q_{mo}(P_{m0})$, $Q_m(P_m)$, Q and the point P on the plane of action $G_{20}$. If the $P_{m0}$ and the $P_m$ are expressed by a rotary coordinate system $O_{r2m}$, the plane of action $G_{2m}$ rotates by the phase difference $\xi_2$ to be superposed on the plane of action $G_{20}$. The $n_m$ moves to the n, and the $P_{m0}$ moves to the $Q_{mo}$, and the $P_m$ moves to the $Q_m$. If the line of intersection of the tooth surface II and the plane of action $G_{20}$ is designated by w and the intersection point of w and n is designated by Q, the following relationship is concluded between the known points $Q_{mo}(q_{2m0}, -R_{b20}, z_{2m0})$ and $P(q_{2p}, -R_{b20}, z_{2p})$ and an unknown point $Q\{q_2(\theta_2, \xi_2), -R_{b20}, z_2(\theta_2, \xi_2)\}$ by means of the coordinate system $O_{q2}$.

$$z_{2m0} = -\{q_2(\theta_2, \xi_2) - q_{2m0}\} \tan \psi_{b20} + \{q_{2p} - q_2(\theta_2, \xi_2)\} / \tan \psi_{b20} + z_{2p}$$

Consequently, the point Q can be expressed as follows by means of the coordinate system $O_{q2}$, $$q_2(\theta_2, \xi_2) = (q_{2m0} \tan \psi_{b20} + q_{2p}/\tan \psi_{b20} + z_{2p} - z_{2m0})/(\tan \psi_{b20} + 1/\tan \psi_{b20})$$

$$z_2(\theta_2, \xi_2) = z_{2p} + \{q_{2p} - q_2(\theta_2, \xi_2)\}/\tan \psi_{b20} \tag{60}$$

where $q_{2p} = q_{2p0} + R_{b20}\theta_2 \cos^2 \psi_{b20}$ $z_{2p} = R_{b20}\theta_2 \cos \psi_{b20} \sin \psi_{b20}$.

The point $Q_m$ can be expressed as follows by means of the coordinate system $O_{q2}$ by the use of the $\xi_2$ as a parameter.

$$q_{2m}(\theta_2, \xi_2) = q_2(\theta_2, \xi_2) + R_{b20}\xi_2 \cos^2 \psi_{b20}$$

$$z_{2m}(\theta_2, \xi_2) = z_2(\theta_2, \xi_2) + R_{b20}\xi_2 \cos \psi_{b20} \sin \psi_{b20}$$

Consequently, if the point of contact $P_m$ is expressed as $P_m(u_{2m}, v_{2m}, z_{2m})$ by the coordinate system $O_2$, each coordinate value is concluded as follows by means of the expressions (55) by the use of the $\xi_2$ as a parameter.

$$\chi_{2m} = \chi_{20} - \xi_2 = \pi/2 - \phi_{20} - \xi_2$$

$$q_{2m}(\theta_2, \xi_2) = q_{2m}(\theta_2, \xi_2) + R_{b20}\xi_2 \cos^2 \psi_{b20}$$

$$u_{2m}(\theta_2, \xi_2) = q_{2m}(\theta_2, \xi_2)\cos\chi_{2m} + R_{b20}\sin\chi_{2m}$$

$$v_{2m}(\theta_2, \xi_2) = q_{2m}(\theta_2, \xi_2)\sin\chi_{2m} - R_{b20}\cos\chi_{2m}$$

$$z_{2m}(\theta_2, \xi_2) = z_2(\theta_2, \xi_2) + R_{b20}\xi_2\cos\psi_{b20}\sin\psi_{b20} \quad (61)$$

The expressions (61) are the equations of the line of contact $(PP_m)$ at the arbitrary rotation angle $\theta_2$ in the coordinate system $O_2$ using $\xi_2$ as a parameter. The parameter $z_{20}$ of the aforesaid expressions (55) is a function of $\xi_2$ from the requirement for contact. Consequently, by changing $\theta_2$, the surface of action can be expressed as a set of lines of contact. Furthermore, when the aforesaid expressions (61) are the equations of the common normal $n_m$ $(P_{m0}P_m)$ using $\theta_2$ at the arbitrary $\xi_2$ as a parameter, the expressions (61) can express the surface of action as a set of the common normals $n_m$ by changing $\xi_2$. If an involute helicoid is used as the tooth surface II, the surface of action is a distorted curved surface drawn by the directed straight line $(P_{m0}P_m)$ of the helical angle $\psi_{b20}$ on the plane of action by changing the inclination angle $\phi_{20}+\xi_2$ of the directed straight line with the displacement of the gear II in the axis direction-

17. Equations of Tooth Surface I Generated by Tooth Surface II

Figure 20:
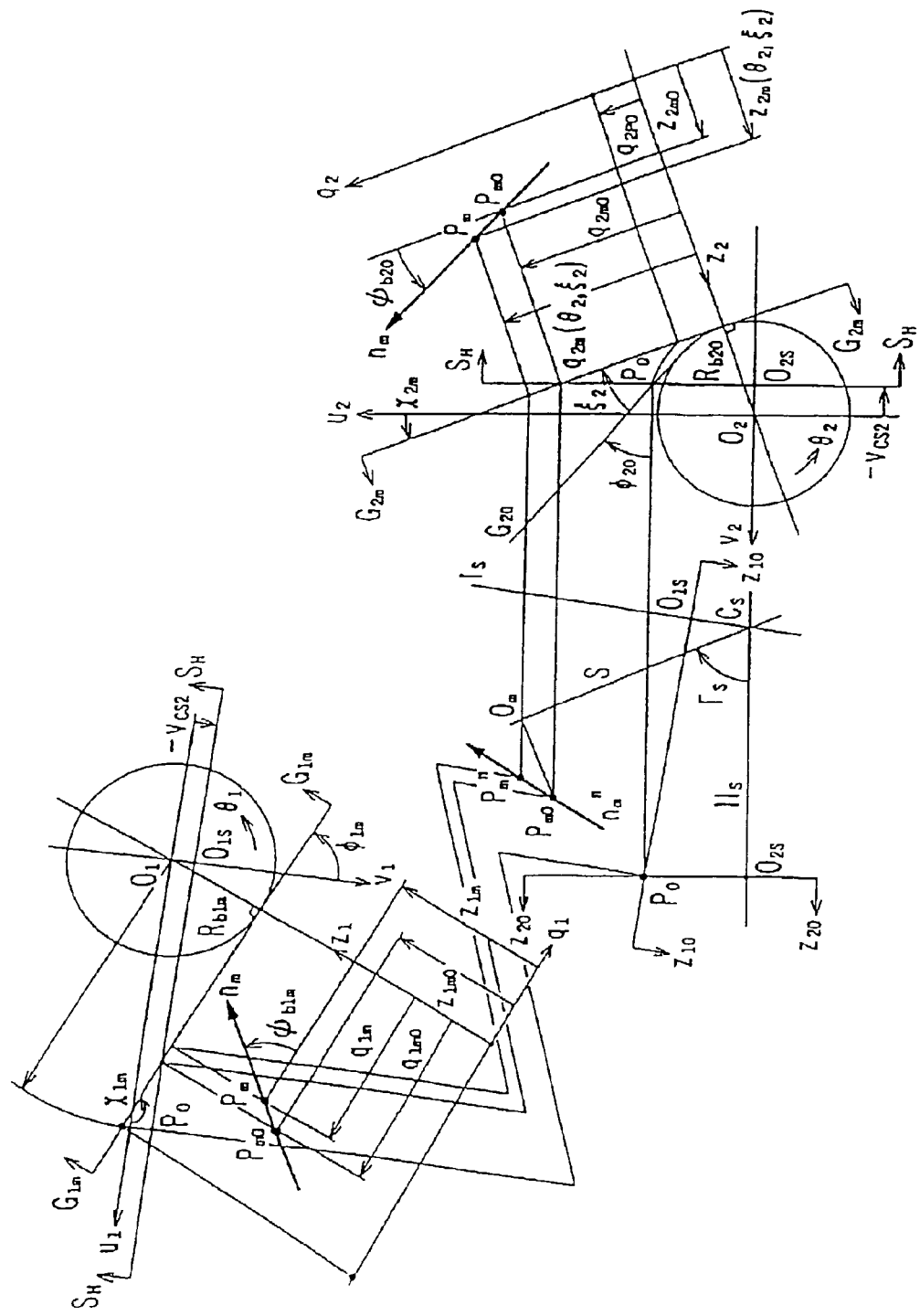
FIG. 20 is a figure showing a point $P_m$ and the common normal $n_m$ severally in the coordinate systems $O_1$ and $O_{q1}$ for explaining the aforesaid tooth surface determining method.

FIG. 20 shows the point of contact $P_m$ and the common normal $n_m(P_{m0}P_m)$ in the coordinate systems $O_1$ and $O_{q1}$. When the point of contact $P_m$ given by the aforesaid expressions (61) is expressed by the coordinate systems $O_1$, $O_{q1}$ to be transformed into the coordinate system $O_{r1}$, the transformed point of contact $P_m$ expresses the tooth surface I. Because the point $P_m$ is given as $P_m(u_{2m}, v_{2m}, z_{2m})$ by the aforesaid expressions (61), if the point $P_m$ is expressed as $P_m(u_{1m}, v_{1m}, z_{1m})$ on the coordinate system $O_1$, each coordinate value can be expressed as follows by coordinate transformation expressions of the coordinate systems $O_2$ and $O_1$.

$$u_{1m} = -u_{2m}\cos\Sigma - (z_{2m}+z_{2c0})\sin\Sigma$$

$$v_{1m} = v_{2m} + E$$

$$z_{1m} = u_{2m}\sin\Sigma - (z_{2m}+z_{2c0})\cos\Sigma - z_{1c0}$$

$$z_{10} = -u_{c0}\sin(\Sigma-\Gamma_s) + z_{c0}\cos(\Sigma-\Gamma_s)$$

Because the inclination angle of the common normal $n_m$ is given as $n_m(\phi_{20}+\xi_2, \psi_{b20})$, the $n_m(\phi_{1m}, \psi_{b1m})$ can be obtained as follows by means of the aforesaid expressions (41) and (42), which are transformation expressions of the inclination angles between the coordinate systems $O_2$ and $O_1$.

$$\tan\phi_{1m} = \tan(\phi_{20}+\xi_2)\sin(\Sigma-\pi/2) - \tan\psi_{b20}\cos(\tau-\pi/2)/\cos(\phi_{20}+\xi_2)$$

$$\sin\psi_{b1m} = \cos\psi_{b20}\sin(\phi_{20}+\xi_2)\cos(\Sigma-\pi/2) + \sin\psi_{b20}\sin(\Sigma-\pi/2)$$

If a plane of action including the common normal $n_m$ is designated by $G_{1m}$ and the point $P_m$ is expressed as $P_m(q_{1m}, -R_{b1m}, z_{1m})$ in the coordinate system $O_{q1}$, the $P_m$ can be expressed as follows by means of the expression (52), being the transformation expression between the coordinate systems $O_1$ and $O_{q1}$.

$$q_{1m} = u_{1m}\cos\chi_{1m} + v_{1m}\sin\chi_{1m}$$

$$R_{b1m} = u_{1m}\sin\chi_{1m} - v_{1m}\cos\chi_{1m}$$

$$\chi_{1m} = \pi/2 - \phi_{1m}$$

If the point $P_m$ is transformed into the coordinate system $O_{r1}$, a conjugate tooth surface I can be expressed as follows.

$$\theta_1 = i_0\theta_2 \ (\theta_1 = 0 \text{ when } \theta_2 = 0)$$

$$\chi_{r1m} = \pi/2 - \phi_{1m} - \theta_1$$

$$u_{r1m} = q_{1m}\cos\phi_{r1m} + R_{b1m}\sin\chi_{r1m}$$

$$v_{r1m} = q_{1m}\sin\chi_{r1m} - R_{b1m}\cos\chi_{r1m}$$

$$z_{r1m} = z_{1m} \quad (62)$$

18. Group of Pairs of Gears Having Same Involute Helicoid for One Member (Involute Gear Group)

Assuming that the axis of the gear II, the same involute helicoids (the base cylinder radius thereof; $R_{b20}$, the helical angle thereof: $\psi_{b20}$) as the tooth surface II and the point $P_0$ (at the radius $R_{20}$) on the tooth surface II are given, the point $P_0$ and the normal $n_0$ thereof can be expressed as follows by means of the coordinate system $O_2$.

$$P_0(u_{2p0}, v_{2p0}, 0)$$

$$n_0(\varphi_{20}, \psi_{b20})$$

$$\varphi_{20} + \varepsilon_{20} = \cos^{-1}(R_{b20}/R_{20})$$

$$\varepsilon_{20} = \tan^{-1}(v_{2p0}/u_{2p0})$$

$$R_{20} = \sqrt{(u_{2p0}^2 + v_{2p0}^2)}$$

Because $P_0$ is selected on the plane $S_H$ and $v_{2p0} = -v_{cs2}$ in the present embodiment, E can be obtained by giving the shaft angle $\Sigma$ and the ratio of angular velocity $i_0$ (or a shaft angle $\Gamma_s$ of a relative rotation axis), and the relative rotation axis S and the mating gear axis I, i.e. a pair of gears, are determined.

Figure 21:
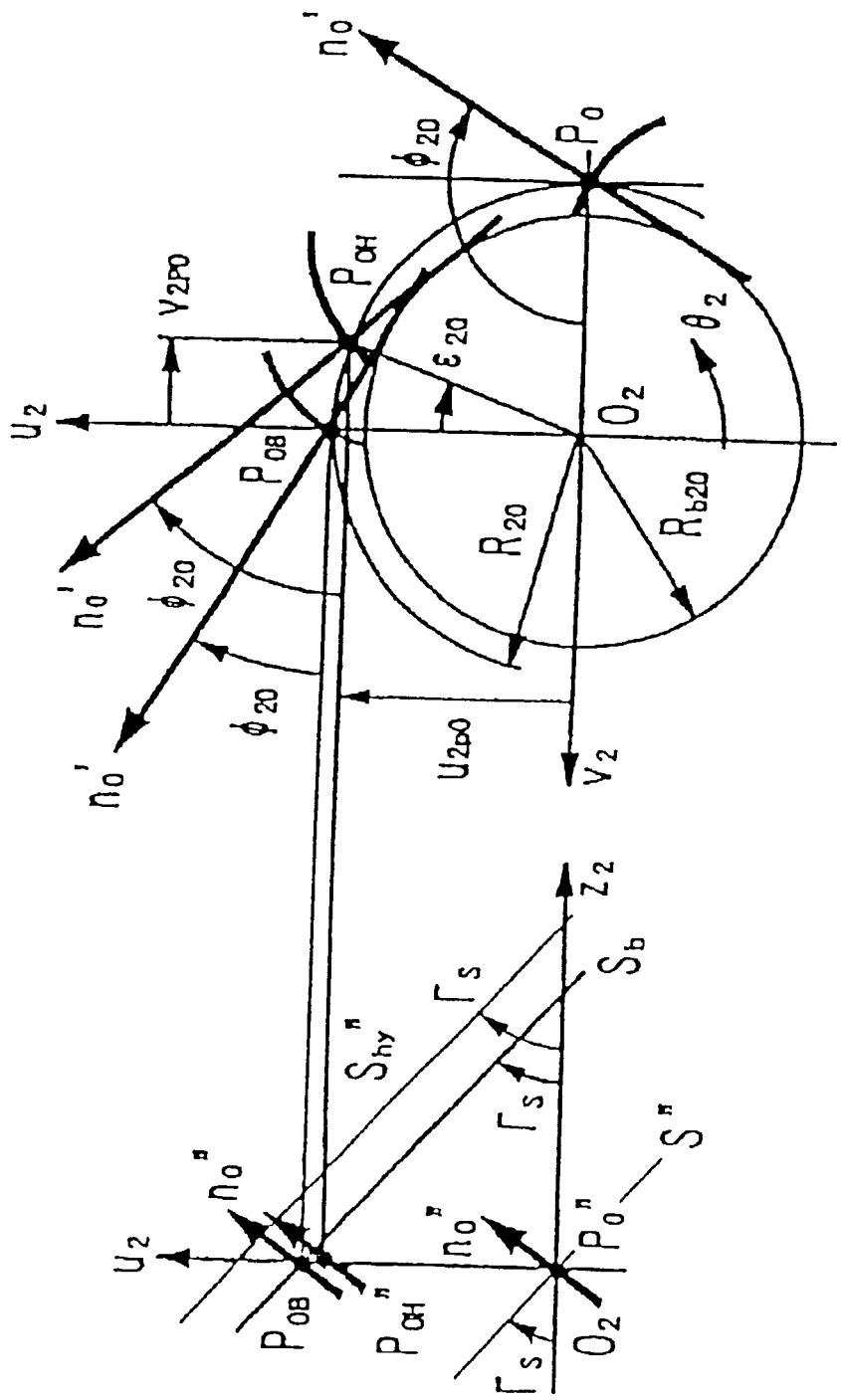
FIG. 21 is a figure showing a group of pairs of gears which has the same involute helicoids for one member for explaining the aforesaid tooth surface determining method.

FIG. 21 a conceptual drawing of an involute gear group in the case where the gear II is rotated and the point $P_0$ and the normal $n_0$ thereof are selected to be fixed at an appropriate position of the coordinate system $O_2$ to be a design reference point and a path of contact. Furthermore, in the figure, "S" designates a relative rotation axis of a helical gear and a worm gear (or a crossed helical gear), and "$S_b$" designates a relative rotation axis of a bevel gear, and "Shy" designates a relative rotation axis of a hypoid gear. The involute gear group changes as follows in accordance with the locations of the point $P_0$.

(1) The involute gear group changes according to the values of the $\Sigma$ when the $P_0$ is located on the $v_2$ axis.
  (a) When $\Sigma=0$ or $\pi$, the involute gear group becomes an external helical gear or an internal helical gear. In the case, $\Gamma_s=0$ or $\pi$ is concluded, and the conjugate mating surface I also becomes an involute helicoid.
  (b) When $\Sigma \neq 0$, the involute gear group becomes a worm gear or a crossed helical gear. A worm gear having an involute helicoid for either a worm or a worm wheel has been put to practical use. Especially, a pair of gears employing an involute helicoid including the tooth profile I in its mating surface I is used as an involute crossed helical gear.

(2) When the $P_0$ is located on the $u_2$ axis ($P_{OB}$), the involute gear group becomes a bevel gear. A bevel gear forming an involute helicoid including the tooth profile I on its mating surface also is put to practical use as a conical gear.

(3) When the $P_0$ is located at a position other than the positions noted above ($P_{OH}$), the involute gear group becomes a hypoid gear and a profile shifted worm gear or a profile shifted crossed helical gear. If the $P_{OH}$ is selected in a zone in which $|\epsilon E_{20}|$ is relatively small (shown in the figure), the involute gear group is meant as a hypoid gear verging on a bevel gear. And if the $|\epsilon_{20}|$ is selected in the vicinity of $\pi/2$ (nearby the $P_0$), the involute gear group is meant as a profile shifted worm gear or a profile shifted crossed helical gear.

B. Design of Hypoid Gear having Involute Helicoid as Pinion Tooth Surface

As has been described above, Japanese Patent Laid-Open Publication No. Hei 9-53702 proposes a method for describing a design method of gears uniformly from a gear having parallel two axes such as a spur gear, a helical gear or the like, which is the most popular gear type, to a hyperboloidal gear having two axes not intersecting with each other and not being parallel to each other such as a hypoid gear. However, in the hyperboloidal gear especially, there are often cases where sufficient surface of action cannot be obtained with some combinations of selected variables.

Hereinafter, a selection method of variables for forming effective surfaces of action of a hyperboloidal gear is described.

1. Design Method of Conventional Hyperboloidal Gear

Now, some of methods that have conventionally been used for the design of a hyperboloidal gear are simply described.

(1) Involute Face Gear

An involute face gear is a pair of gears having a pinion being an involute spur gear and a large gear forming a pinion tooth surface and a conjugate tooth surface thereof on a side face of a disk (a plane perpendicular to the axis of the disk). The involute face gear is conventionally well known, and can be designed and manufactured relatively easily to be used as a gear for light loads. Some of the involute face gears use a helical gear in place of the spur gear. However, the use of the helical gear makes the design and the manufacturing of the involute face gear difficult. Consequently, the involute face gear using the helical gear is less popular than that using the spur gear.

(2) Spiroid Gear

A reference pinion cone (or a reference pinion cylinder) is given. A tooth curve being tangent to a relative velocity on a curve (pitch contact locus) being tangent to the body of revolution of a mating gear being tangent to the reference pinion cone is set to be a pinion surface line. A pressure angle within a range from 10° to 30° on a plane including an axis as an empirical value for obtaining a gear effective tooth surface to form a pinion tooth surface, thereby realizing a mating gear. However, the pinion tooth surface is formed as a screw helicoid, unlike the involute hypoid gear of the present invention. If an involute tooth surface is employed in a pinion in the design method, there are cases where an effective tooth surface of a gear cannot be obtained to a gear having a small gear ratio, i.e. having a large-pinion diameter.

(3) Gleason Type Hypoid Gear

A Gleason type hypoid gear uses a conical surface, and both of its pinion and its gear form their teeth in a conical surface state. In the specification determining method of the expression, the helical angle $\psi_{0p}$ (being different from the helical angle $\psi_0$ according to the present invention strictly) of its pinion is fixed at about 50°. A gear ratio, an offset, a gear width, all empirically effective nearby the fixed helical angle $\psi_{0p}$, are given as standards. Thereby, specifications are generated such that an almost constant asymmetric pressure angle (e.g. 14°-24°, or 10°-28°) may be effective. That is a method, so to speak, for determining a gear shape geometrically analogous to a reference gear shape. Accordingly, when designing a hypoid gear not conforming to the standard recommended by the Gleason method (for example, a face gear having a high offset and a small helical angle), because there are no empirical values, it is first necessary to establish a new standard.

2. Hypoid Gear being Object

When a static space is given by means of the shaft angle $\Sigma$ and the offset E and a field of a relative velocity is given by means of the gear ratio $i_0$ according to the method disclosed in the noted Japanese Laid-Open Patent Publication, involute helicoidal tooth surfaces D and C can be determined when the design reference point $P_0$ ($R_{20}$, $\psi_0$) and two tooth surface normals $g_{0D}(\psi_0, \phi_{n0D}; C_s)$ and $g_{0C}(\psi_0, \phi_{n0C}; C_s)$ passing at the point $P_0$ are given. Hereupon, the tooth surfaces D and C are a drive side tooth surface and a coast side tooth surface of a pair of gears, and the $g_{0D}$ and the $g_{0C}$ are normals of respective tooth surfaces, i.e. paths of contact. Although the shaft angle $\Sigma$, the offset E, the gear ratio $i_0$, the radius $R_{20}$ or $R_{10}$ of a design reference point are given in the aforesaid design method of a face gear, relationships among a contact state of a tooth surface and three variables of $\psi_0$, $\phi_{n0D}$ and $\phi_{n0C}$ are not made to be clear. Consequently, the selection cannot be executed, and there are cases wherein an effective tooth surface cannot be obtained. If a case of shaft angle $\Sigma=90°$ is exemplified, in at least one of the cases where the offset E is large ($E/R_{20}>0.25$), where the gear ratio is small ($i_0=2.5$-5), and where the helical angle $\psi_0$ is within a range of $\psi_0=35°$-70°, the top of the large end of the face width became sharpened and the undercut at the small end was formed improperly and no efficient tooth surfaces D and C can be formed.

In the present embodiment, as will be described in the following, a surface of action of a pair of gears a tooth surface of one of which is an involute helicoid is obtained. Using the obtained surface of action, a selection method of three variables of $\psi_0$, $\phi_{n0D}$ and $\phi_{n0C}$ the effective tooth surfaces of which exist in a surface of action given by a pinion and a gear, and the specifications of teeth having no sharpened top or undercut by means of an equivalent rack, which will be described later, are determined.

Figure 22:
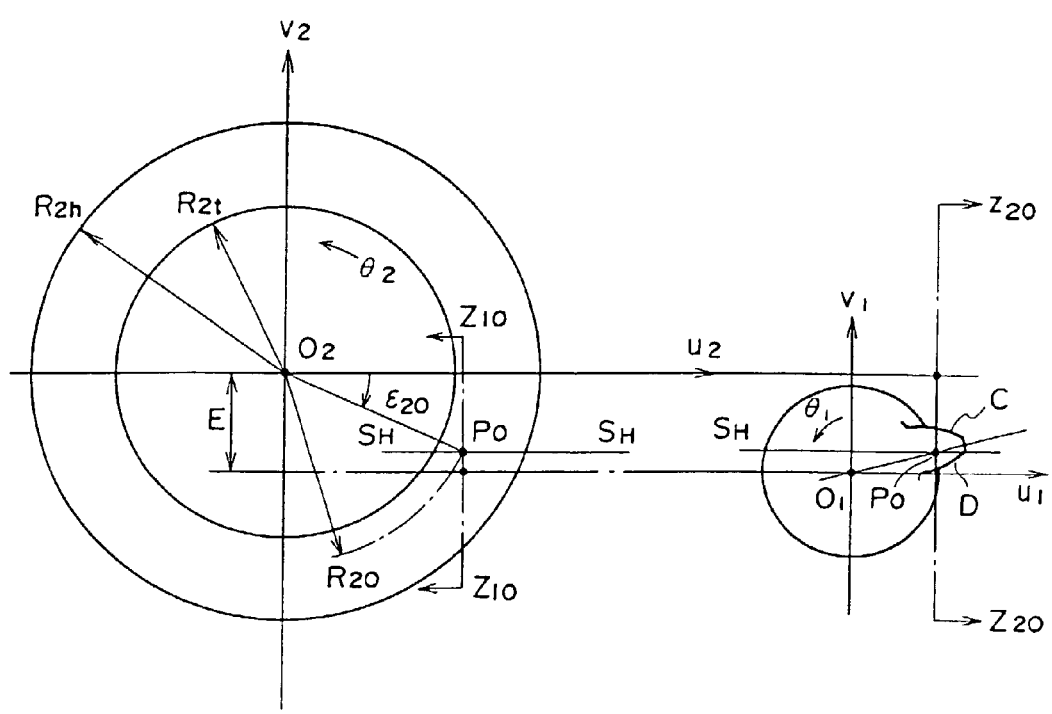
FIG. 22 is a figure showing the specifications of a hypoid gear.

FIG. 22 and the following show size specifications of a hypoid gear.

| | |
|---|---|
| shaft angle $\Sigma$ | 90° |
| gear ratio $i_0$ | 4.1 |
| instantaneous axis angle $\Gamma_s$ | 76.29° |
| offset $\Sigma$ | 35 mm under the center |
| positions of axes I and II to instantaneous axis | |
| $v_{cs1}$ | −1.965 mm |
| $v_{cs2}$ | 33.035 mm |
| large end radius of gear $R_{2h}$ | 95 mm |
| small end radius of gear $R_{2t}$ | 67 mm |

The coordinate systems $C_s$, $C_1$ and $C_2$ are determined based on the aforesaid specifications. The gear I is supposed to be a pinion, and the gear II is supposed to be a gear. In the following is described the process of determining an involute helicoid surface of a pinion for obtaining the effective gear tooth surfaces D and C in a zone enclosed by a given large end radius and a given small end radius of a gear on a disk in the case where the pinion is formed to be a cylinder shape and the involute helicoid is given to the pinion.

3. Equivalent Rack

In this paragraph is noted a rack (equivalent rack) moving on a plane formed by two paths of contact when the paths of contact $g_{0D}$ and $g_{0C}$ of the tooth surfaces D and C on the drive side and the coast side are given as the two directed straight lines intersecting at the design reference point. By use of the rack, teeth effective as the teeth of a gear can be formed in the vicinity of the design reference point. The descriptions concerning the equivalent rack in this paragraph can be applied not only to the hypoid gear but also to gears in the other expressions.

3.1 Path of Contact $g_0$, $\phi_{n0D}$, $\phi_{n0C}$

It is supposed that a path of contact to be an object is given as follows in accordance with the aforesaid Japanese Laid-Open Patent Publication.

(1) Two axes I, II, their shaft angle $\Sigma$, an offset E ($\geqq 0$) and a ratio of angular velocity (gear ratio) $i_0$ ($\geqq 1$, constant) are given, and coordinate systems $C_1$, $C_2$ are defined by the use of the two axes and the common perpendicular, and a coordinate system $C_s$ is defined by the use of a relative rotation axis S and the common perpendicular. Thereby, it is possible to transform coordinate values and inclination angles of directed straight lines between the coordinate systems with each other.

(2) A path of contact $g_0$ having no fluctuations of a bearing load is given on the coordinate system $C_s$ by a design reference point $P_0(u_{C0}, v_{C0}, z_{C0}; C_S)$ and the inclination angle $g_0(\psi_0, \phi_{n0}; C_s)$ thereof, and coordinate systems $C_{q1}$, $C_{q2}$ are defined by the use of planes of action $G_{10}$, $G_{20}$ including the $g_0$.

(3) If the intersection points of planes of rotation of the two axes I and II passing the design reference point $P_0$ with each gear axis are designated by $O_1$, $O_2$, the coordinate systems $C_1$, $C_{q1}$, $C_2$, $C_{q2}$ are moved in each gear axis direction in parallel until their origins become $O_1$, $O_2$, and thereby coordinate systems $O_1$, $O_{q1}$, $O_2$, $O_{q2}$ are defined. Consequently, arbitrary points $P(q_2, -R_{b2}, z_2; O_{q2})$ and $P(u_2, v_2, z_2; O_2)$ on the $g_0$ by the coordinate systems $O_{q2}$, $O_2$ can be expressed as follows by means of the expressions (49), $$q_2(\theta_2) = R_{b20}\theta_2 \cos^2\psi_{b20} + q_{2p0}$$

$$R_{b2}(\theta_2) = R_{b20}$$

$$z_2(\theta_2) = R_{b20}\theta_2 \cos\psi_{b20} \sin\psi_{b20}$$

$$\chi_2(\theta_2) = \chi_{20} = \pi/2 - \phi_{20}$$

$$u_2(\theta_2) = q_2(\theta_2)\cos\chi_{20} + R_{b20}\sin\chi_{20}$$

$$v_2(\theta_2) = q_2(\theta_2)\sin\chi_{20} - R_{b20}\cos\chi_{20} \quad (63)$$

where $\theta_2$: rotation angle of gear II $P(q_2, -R_{b2}, z_2; O_{q2})$: the expression of the point P in the coordinate system $C_{q2}$ $g_0(\phi_{20}, \psi_{b20}; O_2)$: the expression of the inclination angle of $g_0$ in the coordinate system $O_2$.

(4) If the point P and the inclination angles of the $g_0$ are transformed into the coordinate systems $O_1$ and $O_{q1}$, they can be expressed as follows.

$$P\{q_1(\theta_1), -R_{b10}(\theta_1), z_1(\theta_1); O_{q1}\}$$

$$g_0(\phi_{10}, \psi_{b10}; O_1) \quad (64)$$

Incidentally, $\theta_1 = i_0 \theta_2$.

(5) When it can be assumed that the paths of contact on the drive side and the coast side intersect with each other at the point $P_0$ and further are given as two directed straight lines that do not generate any undercut and interference in the vicinity of the point $P_0$, as described above, the expressions of the paths of contact on the drive side and the coast side by the coordinate system $C_s$ can be respectively designated by $g_{0D}(\psi_0, \phi_{n0D}; C_s)$ on the drive side and $g_{0C}(\psi_0, \phi_{n0C}; C_s)$ on the coast side.

3.2 Definition of Limiting Path $g_t$ (Case Where Plane $S_n$ Does not Include Common Perpendicular)

Figure 23:
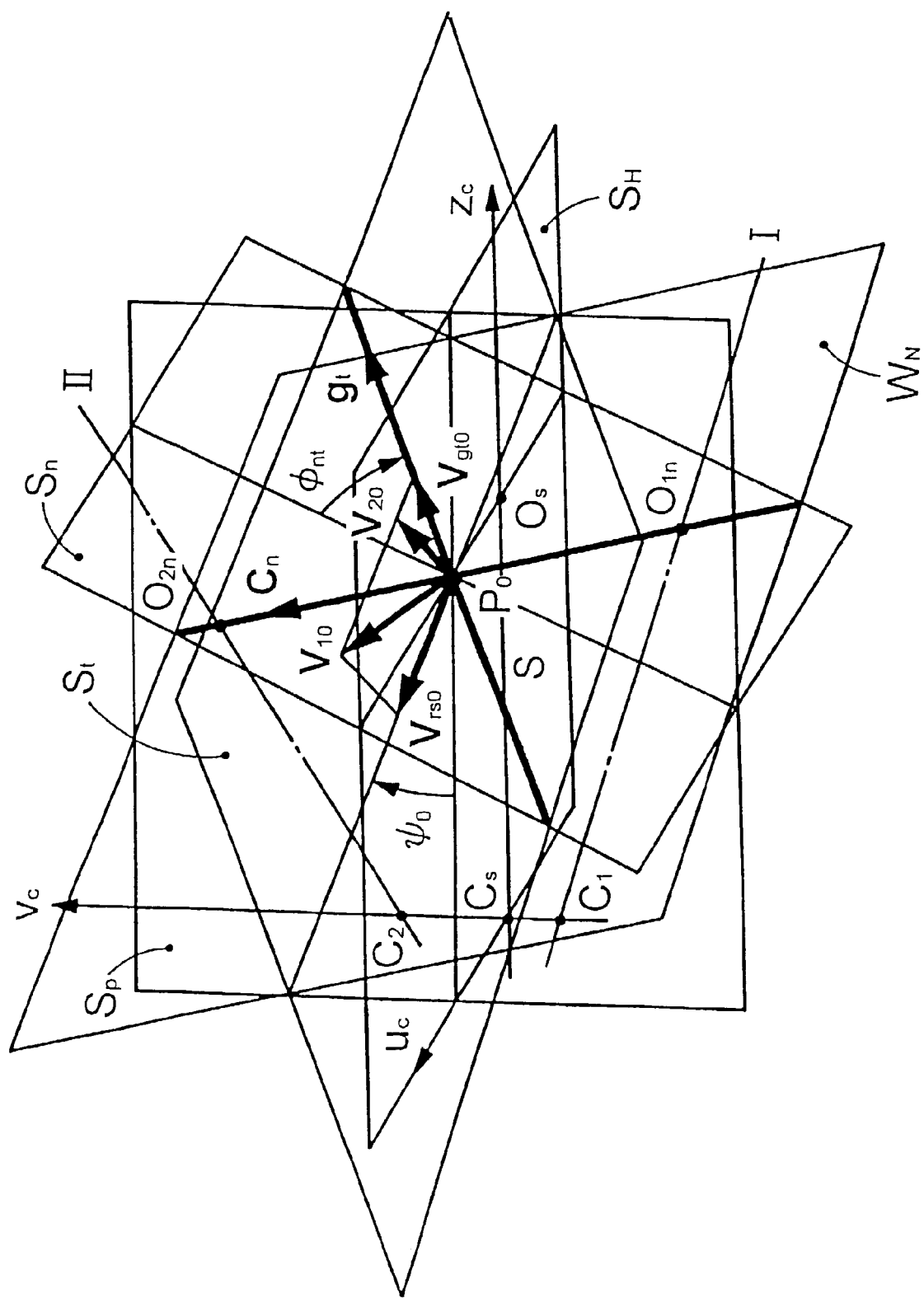
FIG. 23 is a figure showing relationships among planes $S_H$, $S_P$, $S_n$, $S_t$ and $W_N$ in a bevel gear and a hypoid gear.

FIG. 23 conceptually shows relationships among planes $S_H$, $S_p$ and $S_n$ of a hypoid gear and a plane $S_t$ formed by velocities $V_{10}$, $V_{20}$ at the point $P_0$. Hereupon, the plane $S_H$ is a $V_c=0$ plane in the coordinate system $C_s$, and the plane $S_p$ is a $u_c=u_{c0}$ plane, and the plane $S_n$ is a plane perpendicular to the relative velocity $V_{rs0}$ at the $P_0$.

Because the design reference point $P_0$ is located on the plane $S_H$, the relative velocity $V_{rs0}$ is located on the plane $S_p$. On the other hand, because the plane $S_t$ also includes $V_{rs0}$, the plane $S_t$ and the plane $S_p$ intersect with each other with the relative velocity $V_{rs0}$ as a line of intersection. Furthermore, the plane $S_t$ and the plane $S_n$ cross with each other at right angles, and have a normal velocity $V_{gt0}$ on the plane $S_t$ as the line of intersection $g_t$ (positive in the direction of the $V_{gt0}$). That is, the plane $S_t$ is a plane formed by the rotation of the plane $S_p$ around $V_{rs0}$ as an axis on the plane $S_n$ by $\phi_{nt}$, and corresponds to the conventional pitch plane.

If the intersection points of the plane $S_n$ with the gear axes I, II are designated by $O_{1n}$, $O_{2n}$, peripheral velocities $V_{10}$, $V_{20}$ of the point $P_0$ are expressed as follows.

$$V_{10} = \omega_{10} \times [O_{1n}P_0]$$

$$V_{20} = \omega_{20} \times [O_{2n}P_0] \quad (65)$$

Here, [AB] indicates a vector having a point A as its starting point and a point B as its end point. Because $O_{1n}P_0$ is located on the plane $S_n$, the $O_{1n}P_0$ is perpendicular to the relative velocity $V_{rs0}$, and is perpendicular to the $V_{10}$ owing to the aforesaid expression. Consequently, the $O_{1n}P_0$ is perpendicular to the plane $S_t$ at the point $P_0$. Quite similarly, because $O_{2n}P_0$ is perpendicular to the $V_{rs0}$ and the $V_{20}$, the $O_{2n}P_0$ is perpendicular to plane $S_t$ at the point $P_0$. In other words, the points $O_{1n}$, $P_0$ and $O_{2n}$ are located on a straight line. Accordingly, the straight line is set to be a design criterion perpendicular $C_n$ (positive in the direction from the $O_{1n}$ to the $O_{2n}$). The $C_n$ is the line of centres of a pair of gears passing at the point $P_0$. The relationship does not depend on the position of the point $P_0$.

Because an arbitrary plane including the relative velocity $V_{rs0}$ can be the tangential plane of a tooth surface passing at the point $P_0$, a tooth surface having a tangential plane $W_N$ (perpendicular to the plane $S_t$) including the design criterion perpendicular $C_n$ has the $g_t$ as its path of contact (contact normal). Because, in an ordinary gear, the tangential plane of a tooth surface passing the point $P_0$ is appropriately inclined to the plane $W_N$ formed by the $V_{rs0}$ and the $C_n$, the path of contact $g_0$ (contact normal) thereof is inclined on the plane $S_n$ on the basis of the $g_t$. Accordingly, if $g_t$ is a limiting path $g_t$, the inclination angle $g_t(\psi_0, \phi_{nt}; C_s)$ of the limiting path $g_t$ can be obtained as follows.

Figure 24:
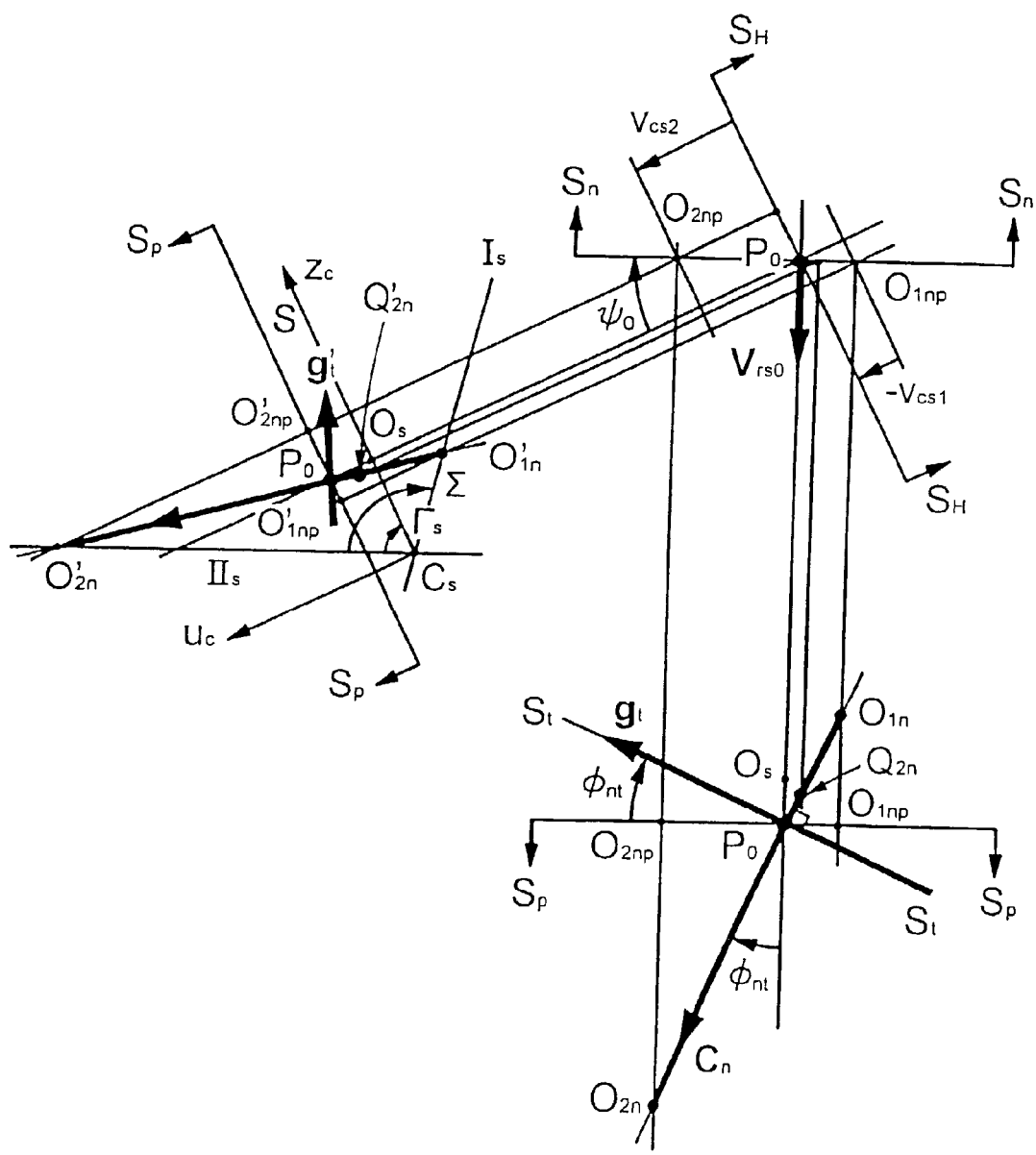
FIG. 24 is a figure showing a design reference perpendicular $C_n$ and a limiting path $g_t$ of a hypoid gear.

FIG. 24 draws the design criterion perpendicular $C_n$ on the plane $S_n$ and the limiting path $g_t$ perpendicular to the $C_n$. If the feet of perpendicular lines drawn from the points $O_{1n}$, $O_{2n}$ to the plane $S_p$ (perpendicular to the plane $S_n$) are designated by $O_{1np}$, $O_{2np}$, the $\phi_{nt}$ can be obtained as follows.

$$\tan\varphi_{n1} = P_0 O_{2np} / O_{2np} O_{2n} = O_{1np} P_0 / O_{1n} O_{1np} \quad (66)$$

$$= v_{cs2} / [\cos\varphi_0 \{(z_{c0} + v_{cs2}\tan\psi_0)\tan\Gamma_s - u_{s0}\}]$$

$$= -v_{cs1} / [\cos\varphi_0 \{(z_{c0} + v_{cs1}\tan\psi_0)\tan(\Sigma - \Gamma_s) + u_{s0}\}]$$

Here, each directed line segment has its positive direction being the positive direction of the each axis of the coordinate system $C_s$.

In a hypoid gear, $v_{cs2}$, $v_{cs1}$, $u_{c0}$, $z_{c0}$ can be expressed as follows by means of the coordinate systems $O_1$, $O_2$.

$$v_{cs2} = E \tan\Gamma_s / \{\tan\Gamma_s + \tan(\Sigma - \Gamma_s)\}$$

$$u_{c0} = E \sin(\Sigma - \Gamma_s) \sin\Gamma_s \tan\psi_0 / \sin\Sigma$$

$$z_{c0} = (u_{2p0} + u_{c0}\cos\Gamma_s)/\sin\Gamma_s$$

$$u_{2p0} = -v_{cs2}/\tan\epsilon_{20} \quad (\epsilon_{20} \neq 0)$$

$$v_{cs1} = -E \tan(\Sigma - \Gamma_s) / \{\tan\Gamma_s + \tan(\Sigma - \Gamma_s)\}$$

$$z_{c0} = \{u_{1p0} - u_{c0}\cos(\Sigma - \Gamma_s)\}/\sin(\Sigma - \Gamma_s)$$

$$u_{1p0} = -v_{cs1}/\tan_0 (\epsilon_{10} \neq 0)$$

If the $u_{c0}$, the $z_{c0}$, the $v_{cs1}$ and the $v_{cs2}$ are eliminated from the expressions (66) by the use of the above expressions and the eliminated expressions (66) is arranged, the changed expressions (66) become as follows.

$$\tan\varphi_{nt} = \cos\Gamma_s / (\cos\psi_0 / \tan\epsilon_{20} \sin\Gamma_s \sin\psi_0)$$

$$= \cos(\Sigma - \Gamma_s) / \{\cos\psi_0 / \tan\epsilon_{10} - \sin(\Sigma - \Gamma_s)\sin\psi_0\}$$

The limiting path $g_t$ inclines by $\phi_{nt}$ to the plane $S_p$ on the plane $S_n$. The $\phi_{nt}$ has its positive direction in the clockwise direction when it is viewed to the positive direction of the $z_C$ axis.

3.3 Definition of Equivalent Rack

Figure 25:
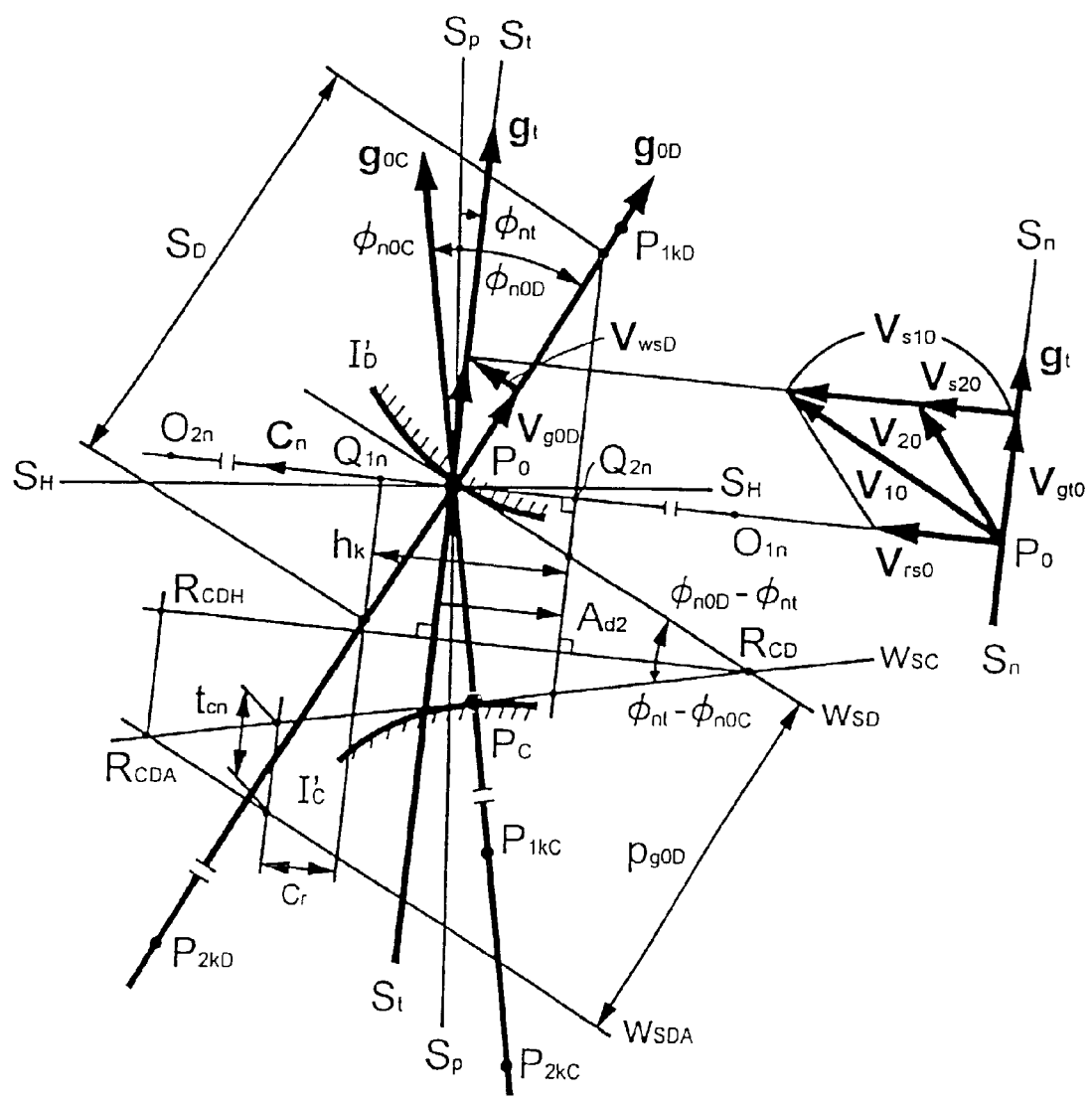
FIG. 25 is a figure showing the plane $S_n$ and an equivalent rack.

FIG. 25 shows an equivalent rack on the plane $S_n$ shown from the positive direction of the relative velocity $V_{rs0}$. The following are shown: the peripheral velocities $V_{10}$, $V_{20}$ at the point P0, the relative velocity $V_{rs0}$ ($=V_{s10} - V_{s20}$), the normal velocity $V_{gr0}$ (in the direction of the limiting path $g_t$), the path of contact $g_{0D}$, $g_{0C}$ on the plane $S_n$, and the tangential planes $W_D$, $W_C$ (shown as lines of intersection $W_{sD}$, $W_{sC}$ with the plane $S_n$ in FIG. 25) of the tooth surfaces D, C having the $g_{0D}$, $g_{0C}$.

The peripheral velocities $V_{10}$, $V_{20}$ can be expressed as follows on the plane $S_t$.

$$V_{10} = V_{gr0} + V_{s10}$$

$$V_{20} = V_{gr0} + V_{s20}$$

Because the tangential plane $W_D$ has the relative velocity $V_{rs0}$ in common together with the plane $S_t$, the peripheral velocities $V_{10}$, $V_{20}$ can be expressed as follows, $$V_{10} = (V_{g0D} + V_{WsD}) + V_{s10}$$

$$V_{20} = (V_{g0D} + V_{WsD}) + V_{s20}$$

where $V_{g0D}$: the normal velocity (in the $g_{0D}$ direction) of tangential plane $W_D$ $V_{WsD}$: the velocity in the $W_{sD}$ direction on the tangential plane $W_D$.

Consequently, the following relationships are always effective at the point $P_0$.

$$V_{gr0} = V_{g0D} + V_{WsD}$$

The tangential plane $W_C$ can also be expressed as follows quite similarly, $$V_{gr0} = V_{g0C} + V_{WsC}$$

where $V_{g0C}$: the normal velocity (in the $g_{0C}$ direction) of the tangential plane $W_C$ $V_{WsC}$: the velocity of the $W_{sC}$ direction of the tangential plane $W_C$.

Consequently, the normal velocities $V_{g0D}$, $V_{g0C}$ can be obtained as follows as the $g_{0D}$, $g_{0C}$ direction components of the $V_{gr0}$.

$$V_{g0D} = V_{gr0} \cos(\phi_{nOD} - \phi_{nt})$$

$$V_{g0C} = V_{gr0} \cos(\phi_{nt} - \phi_{nOC}) \quad (67)$$

On the other hand, the $V_{gr0}$, the $V_{g0D}$ and the $V_{g0C}$ can be expressed as follows, $$V_{gr0} = R_{b2gt}(d\theta_2/dt)\cos\psi_{b2gt}$$

$$V_{g0D} = R_{b20D}(d\theta_2/dt)\cos\psi_{b20D}$$

$$V_{g0C} = R_{b20C}(d\theta_2/dt)\cos\psi_{b20C}$$

where $R_{b2gt}$, $R_{b20D}$, $R_{b20C}$: the radii of the base cylinder of the gear II (large gear) of the $g_t$, the $g_{0D}$ and the $g_{0C}$ $\psi_{b2gt}$, $\psi_{b20D}$, $\psi_{b20C}$: the inclination angles of the $g_t$, the $g_{0D}$ and the $g_{0C}$ on the plane of action of the gear II (large gear).

Because the $g_t$, the $g_{0D}$ and the $g_{0C}$ are straight lines fixed in static space, the normal velocities $V_{gr0}$, $V_{g0D}$, $V_{g0C}$ are always constant. Consequently, the normal velocities $V_{g0D}$, $V_{g0C}$ of the arbitrary points $P_D$, $P_C$ on the $g_{0D}$ and the $g_{0C}$ can always be expressed by the expressions (67).

This fact means that the points of contact on the $g_{0D}$, $g_{0C}$ owing to the rotation of a gear are expressed by the points of contact of a rack having the $g_t$ as its reference line and the same paths of contact $g_{0D}$, $g_{0C}$ (having the $W_{sD}$ and the $W_{sC}$ as its tooth profiles) and moving at $V_{gr0}$ in the direction of the $g_t$. If the rack is defined as an equivalent rack, the equivalent rack is a generalized rack of an involute spur gear. The problems of contact of all gears (from cylindrical gears to a hypoid gear) having paths of contact given to satisfy the conditions of having no fluctuations of a bearing load can be treated as the problem of the contact of the equivalent rack.

3.4 Specifications of Equivalent Rack (1) Inclination Angles (Pressure Angles) of $W_{sD}$, $W_{sC}$ to $C_n$ The $W_{sD}$ and the $W_{sC}$ are inclined by $(\phi_{nOD} - \phi_{nt})$ and $(\phi_{nt} - \phi_{nOC})$ to the $C_n$ (perpendicular to the $g_t$), respectively. $\phi_{nOD} = \phi_{nOC} = \phi_{nt}$ indicates that the pressure angle of an equivalent rack is zero.

(2) Pitch $p_{gt}$

The limiting path $g_t$ indicates the reference line of an equivalent rack, the reference pitch $p_{gt}$ and the normal pitches $p_{n0D}$, $p_{n0C}$ can be expressed as follows.

$p_{gt} = 2\pi R_{b2gt} \cos \psi_{b2gt}/N_2$ (in the direction of the $g_t$)

$p_{g0D} = p_{gt} \cos(\phi_{n0D} - \phi_{nt})$ $= 2\pi R_{b20D} \cos \psi_{b20D}/N_2$ (in the direction of the $g_{0D}$)

$p_{g0C} = p_{gt} \cos(\phi_{nt} - \phi_{n0C})$ $= 2\pi R_{b20C} \cos \psi_{b20C}/N_2$ (in the direction of the $g_{0C}$)  (68)

Incidentally, $N_2$ is the number of teeth of the gear II.

(3) Working Depth $h_k$

In FIG. 25, if a position distant from the $W_{sD}$ by a pitch (1 $P_{g0D}$) is designated by $w_{sD4}$ and the intersection point of the $W_{sC}$ with the $W_{sD}$ and the $W_{sD4}$ are designated by $R_{CD}$ and $R_{CD4}$, a critical tooth depth $h_{cr}$ ($R_{CD}R_{CDH}$), at which the top land of the equivalent rack is zero, can be expressed as follows with attention to the fact that the $R_{CD}R_{CDH}$ crosses with the $g_t$ at right angles.

$H_{cr} = R_{CD}R_{CDH} = p_{g0D} \cos(\phi_{nt} - \phi_{n0C})/\sin(\phi_{n0D} - \phi_{nt})$ If the cutter top land on the equivalent rack is designated by $t_{cn}$ and the clearance is designated by $C_r$, the working depth $h_k$ (in the direction of the $C_n$) of the equivalent rack can be expressed as follows.

$h_k = h_{cr} - 2t_{cn}/\{\tan(\phi_{n0D} - \phi_{nt}) + \tan(\phi_{nt} - \phi_{n0C})\} - 2C_r$  (69)

(4) Phase Angle of $W_{sC}$ to Design Reference Point $P_0$ ($W_{sD}$)

In FIG. 25, $Q_{1n}$, $Q_{2n}$ are set in the vicinity of the point $P_0$ on the $C_n$ such that $h_k = Q_{1n}Q_{2n}$, and addendums $A_{d2}$, $A_{d1}$ are defined as follows.

$P_0 Q_{2n} = A_{d2}$ (the addendum of the gear II)
$P_0 Q_{1n} = A_{d1} = h_k - A_{d2}$ (the addendum of the gear I)

It should be noted that it is here assumed that the point $Q_{2n}$ is selected in order that both of the paths of contact $g_{0D}$, $g_{0C}$ may be included in an effective zone and the $A_{d2} \geq 0$ when the $Q_{2n}$ is located on the $O_{1n}$ side to the point $P_0$.

If the intersection point of the $g_{0C}$ with the $W_{sC}$ is designated by $P_C$, $P_0 P_C$ can be obtained as follows.

$P_0 P_C = -\{A_{d2} + (h_{cr} - h_k)/2\} \sin(\phi_{n0D} - \phi_{n0C})/\cos(\phi_{n0D} - \phi_{nt})$ Incidentally, the positive direction of the $P_0 P_C$ is the direction of $g_{0C}$.

Because the rotation angle $\theta_2$ of the point $P_0$ is zero, the phase angle $\theta_{2wsC}$ of the point $P_C$ becomes as follows, $\theta_{2wsC} = (P_0 P_C / P_{g0C})(2\theta_{2p})$  (70)

where the $2\theta_{2p}$ is the angular pitch of the gear II. The $W_{sC}$ is located at a position delayed by $\theta_{2wsC}$ to the $W_{sD}$. Thereby, the position of the $W_{sC}$ to the point $P_0$ ($W_{sD}$) has been determined.

Because the phase angle of the $W_{sC}$ to the $W_{sD}$ is determined by the generalization of the concept of a tooth thickness in the conventional gear design (how to determine the tooth thickness of a rack on the $g_t$), the phase angle is determined by giving a working depth and an addendum in the present embodiment.

4. Action Limit Point

A tooth profile corresponding to an arbitrarily given path of contact exists mathematically. However, only one tooth profile can actually exist on one radius arc around a gear axis at one time. Consequently, a tooth profile continuing over both the sides of a contact point of a cylinder having the gear axis as its axis with a path of contact does not exist actually. Therefore, the contact point is the action limit point of the path of contact. Furthermore, this fact indicates that the action limit point is the foot of a perpendicular line drawn from the gear axis to the path of contact, i.e. the orthogonal projection of the gear axis.

If an intersection point of a path of contact with a cylinder (radius: $R_2$) having the gear axis as its axis is designated by P, the radius $R_2$ can be expressed as follows.

$R_2^2 = q_2^2 + R_{b2}^2$

If the point of contact P is a action limit point, the path of contact and the cylinder are tangent at the point P. Consequently, the following expression holds true.

$R_2(dR_2/d\theta_2) = q_2(dq_2/d\theta_2) + R_{b2}(dR_{2b}/d\theta_2) = 0$

If the $(dq_2/d\theta_2)$ is eliminated by means of the expression (7), the result becomes as follows.

$q_2(1 - d\chi_2/d\theta_2)/(\tan \psi_{b2} \tan \eta_{b2} + 1) + dR_{b2}/d\theta_2 = 0$ Hereupon, because the $g_{0D}$ and the $g_{0C}$ are supposed to be a straight line coinciding with a normal, $d\chi_2/d\theta_2 = 0$, $dR_{2b}/d\theta_2 = 0$. The expression can then be simplified to $q_2 = 0$.

If the expression is solved for $\theta_2$, an action limit point $P_{2k}$ concerning the gear II can be obtained. An action limit point $P_{1k}$ concerning the gear I can similarly be obtained by solving the equation $q_1 = 0$ after simplifying the following expression.

$q_1(1 - d\chi_1/d\theta_1)/(\tan \psi_{b1} \tan \eta_{b1} + 1) + dR_{b1}/d\theta_1 = 0$ 5. Selection of Design Reference Point $P_0$ and Inclination Angle $\psi_0$ of Plane $S_n$ in Hypoid Gear For a pair of gears having parallel gear axes, the shape of a surface of action is relatively simple, and there is no case where it becomes impossible to form any tooth surface according to the setting way of a design reference point $P_0$ as long as the design reference point $P_0$ is located within an ordinary range. Furthermore, even if no tooth surface can be formed by a given design reference point $P_0$, amendment of the design reference point $P_0$ remains relatively easy.

Because the surface of action of a hypoid gear is very complicated, as will be described later, it is difficult to determine how to alter the surface of action to form an effective tooth surface. Hereinafter, a method for designing a hypoid gear effectively, i.e. the selection method of specifications, is described.

Figure 26:
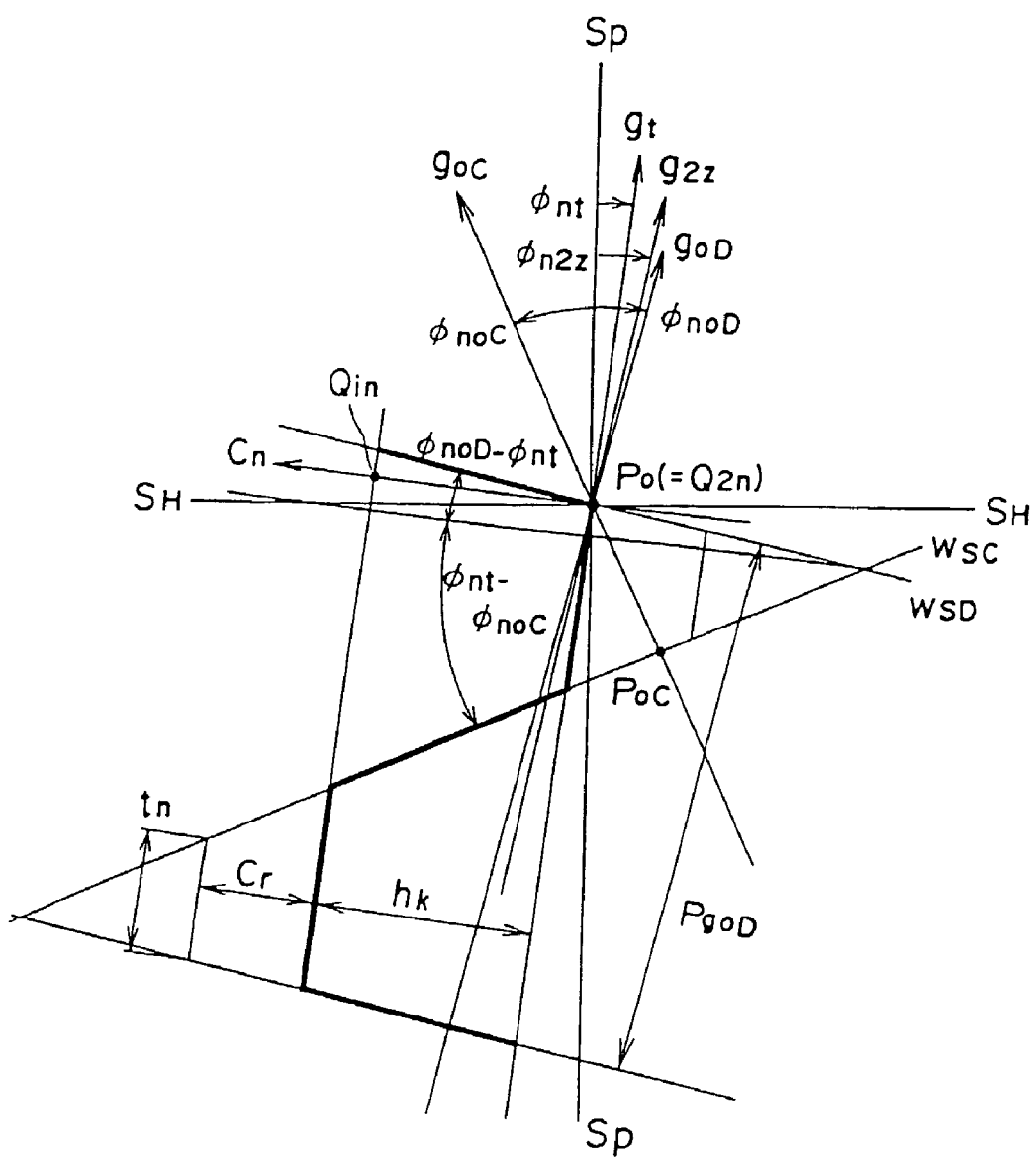
FIG. 26 is a figure showing relationships among paths of contact $g_{0D}$, $g_{0C}$, limiting paths $g_{2z}$, $g_t$ and an equivalent rack.

FIG. 26 shows relationships among limiting paths $g_{2z}$, $g_t$, paths of contact $g_{0D}$, $g_{0C}$ and their equivalent rack on the plane $S_n$. Hereupon, the limiting path $g_{2z}$ is a line of intersection of the plane $S_n$ with a right side plane $Z_{20}$ immediately below the gear axis, and the limiting path $g_t$ is a line of intersection of the plane $S_n$ with a plane $S_t$ formed by the line velocities of the point $P_0$. The selection of the design reference point $P_0$ is the selection of a position in a static space where the shape of the equivalent rack is given. In the present embodiment, it is supposed that a pinion has a cylindrical shape and the shape of the teeth of the pinion is constant (only the phase angles thereof change) in the direction of the axis thereof. The shape of teeth of a gear changes from the small end thereof to the large end thereof. Then, the design reference point $P_0$ is selected at the center of the face width of the gear. That is, the radius $R_{20}$ of the design reference point $P_0$ to the gear axis becomes as follows.

$R_{20} = (R_{2h} + R_{2t})/2$  (71)

For forming an effective tooth surface with a given small end and a given large end of a large gear, there is a case where it is necessary to amend the shape of an equivalent rack or the position of the design reference point $P_0$. Consequently, the expression (71) can be considered to give a first rank approximation of the $R_{20}$.

Each $\psi_0$ being inclinations of the plane $S_n$ perpendicular to the relative velocity at the design reference point $P_0$ is selected as follows. Because the line of intersection of the plane $S_n$ with the plane of rotation $Z_{20}$ of the gear axis passing the point $P_0$ is the limiting path $g_{2z}$, the inclination angles $g_{2z}(\psi_0, \phi_{n2z}; C_s)$ and $g_{2z}(\phi_{2z}, 0; C_2)$ of the limiting path $g_{2z}$ can be obtained from the following expressions.

$$\tan \phi_{n2z} = \sin \psi_0 / \tan \Gamma_s$$

$$\tan \phi_{2z} = \tan 104_0 / \sin \Gamma_s \quad (72)$$

Because the face and root surface of a large gear are formed as planes of rotation of gear in the present embodiment, the tangential planes of tooth surface of a large gear should be inclined mutually in the reverse directions to the plane of rotation of the large gear to each other in order that a tooth of the large gear may have an ordinary shape of a trapezoid. Consequently arbitrary paths of contact $g_{oD}$ and $g_{oC}$ should be located in the vicinity of the limiting path $g_{2z}$ and should be inclined in the mutually reverse directions to the $g_{2z}$. Because the active limit radii (base circle radii) $R_{b20D}$, $R_{b20C}$ of the paths of contact $g_{oD}$, $g_{oC}$ on the gear side are near to the base cylinder radius $R_{b2z}$ of the limiting path $g_{2z}$, the tooth surface of the gear should approximately satisfy the following relationships in order that the tooth surface may be effective at a radius equal to the small end radius $R_{2t}$ of the gear or more.

$$R_{2t} \geq R_{b2z} = R_{20} \cos(\phi_{2z} + \epsilon_{20})$$

$$\sin \epsilon_{20} = -v_{cs2}/R_{20} \quad (73)$$

Incidentally, $\epsilon_{20} = 0$ in case of a bevel gear.

From the expressions (72), (73), the $\psi_0$ can be obtained. Because, if $i_0$ is large, $\phi_{2z} \approx \psi_0$ from the expressions (72) and the expressions (73) maybe replaced with the following expression.

$$R_{2t} \geq R_{20} \cos(\phi_{2z} + \epsilon_{20}) \quad (74)$$

From the $R_{20}$ and the $\psi_0$, the design reference point $P_0$ and the limiting paths $g_{2z}$, $g_t$ are determined on the plane $S_H$ by the coordinate system $C_s$ as follows.

$$P_0(u_{c0}, 0, z_{c0}; C_s)$$

$$g_{2z}(\psi_0, \varphi_{n2z}; C_s)$$

$$g_t(\psi_0, \varphi_{nt}; C_s)$$

$$u_{c0} = E \sin\Gamma_s \cos\Gamma_s \tan\psi_0$$

$$z_{c0} = \left\{ \sqrt{(R_{20}^2 - v_{cs2}^2)} + u_{c0}\cos\Gamma_s \right\} / \sin\Gamma_s$$

$$\tan\varphi_{n1} = \cos\Gamma_s / (-\cos\psi_0/\tan\epsilon_{20} + \sin\Gamma_s \sin\psi_0)$$

The $R_{20}$ and the $\psi_0$ determined as described above should be regarded as first rank approximates, and there are cases where the $R_{20}$ and the $\psi_0$ are adjusted according to the state of the tooth surface obtained as a result of the method described above. Furthermore, if needed values of an offset and a face width of a large gear are too large, there are cases wherein suitable $R_{20}$ and $\psi_0$ giving a satisfactory tooth surface do not exist.

If the coordinate systems $O_1$, $O_{q1}$, $O_2$, $O_{q2}$ are fixed, the design reference point $P_0$ and the inclination angles of the limiting paths $g_{2z}$, $g_t$ can be expressed in each coordinate system.

6. Paths of Contact $g_{oD}$, $g_{oC}$ 6.1 Domain of $\phi_{nOD}$, $\phi_{nOC}$ on Plane $S_n$ It is preferable that the tangential planes $W_{sD}$ and $W_{sC}$ of a tooth surface of a gear are inclined to the plane of rotation of gear $Z_{20}$ in the mutual reverse directions in order that the teeth of the gear may have a necessary strength. Consequently, the paths of contact $g_{oD}$, $g_{oC}$ should be selected to be inclined to the limiting path $g_{2z}$ in the mutual reverse directions. That is, the inclinations of the paths of contact $g_{oD}$, $g_{oC}$ are selected to satisfy the following expression.

$$\phi_{nOC} \leq \phi_{n2z} \leq \phi_{nOD} \quad (75)$$

Moreover, if it is supposed that the paths of contact $g_{oD}$, $g_{oC}$ form an equivalent rack having a vertex angle of 38° on the plane $S_n$, the following expression is concluded.

$$\phi_{nOD} - \phi_{nOC} = 38° \quad (76)$$

The combinations of the $\phi_{nOD}$ and the $\phi_{nOC}$ can be expressed by the following three ways or nearby cases from the expressions (75) and (76).

A. $\phi_{nOC} = \phi_{n2z}, \phi_{nOD} = \phi_{n2z} + 38°$

B. $\phi_{n2z} = \phi_{nOD}, \phi_{nOC} = \phi_{n2z} - 38°$

Figure 27:
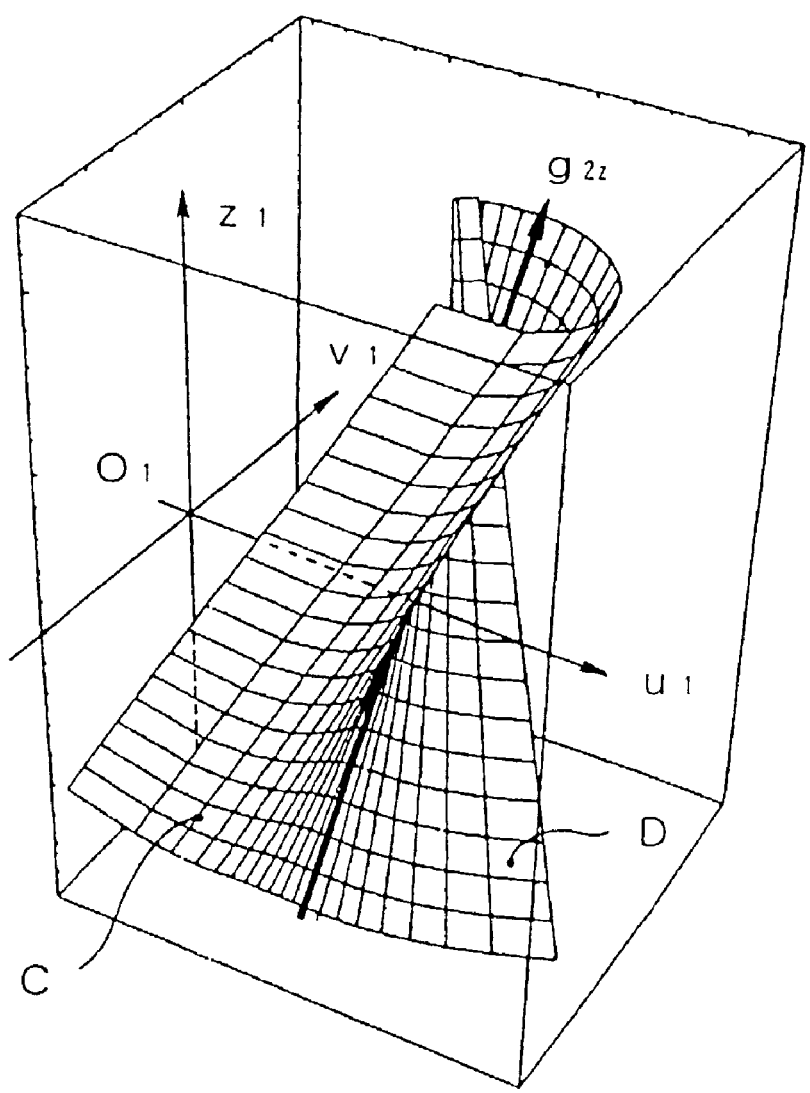
FIG. 27 is an oblique perspective figure showing a surface of action.

C. $\phi_{nOC} = \phi_{n2z} - 19°, \phi_{nOD} = \phi_{n2z} + 19° \quad (77)$ 6.2 Surface of Action and Action Limit Curve of Involute Helicoid FIGS. 27-30 show surfaces of action in a case where a pinion is given an involute helicoid (the base cylinder radius thereof: $R_{b12z}$, the plane of action helical angle thereof: $\psi_{b12z}$) the tooth surface normal of which is the limiting path $g_{2z}$. FIG. 27 is a sketch map for making the whole shape of a curved surface to be easy to understand. The expression of a surface of action is quite similar to that in the case where an involute helicoid is given to a large gear, the expression can be obtained by replacing the suffix 2 in the expressions (61) with 1.

Figure 28:
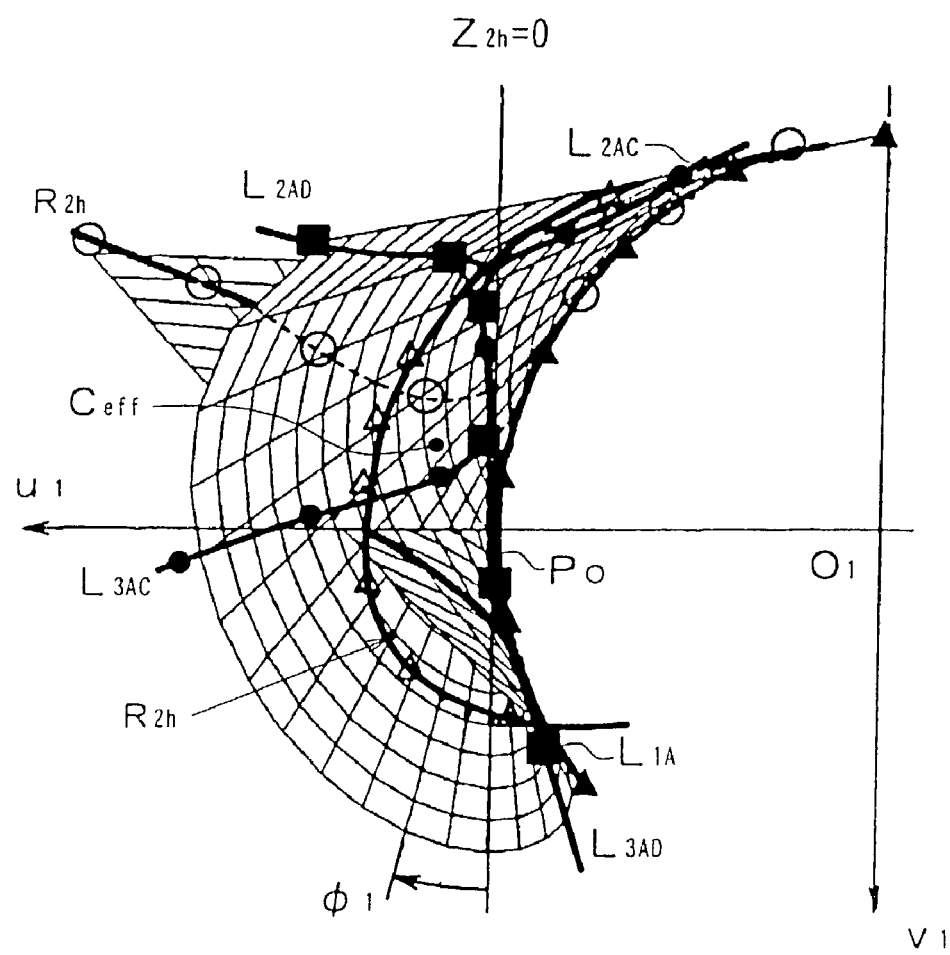
FIG. 28 is a figure showing examples of an effective surface of action and an action limit curve of a hypoid gear, which is viewed to a negative direction along a $z_1$ axis in FIG. 27.
Figure 29:
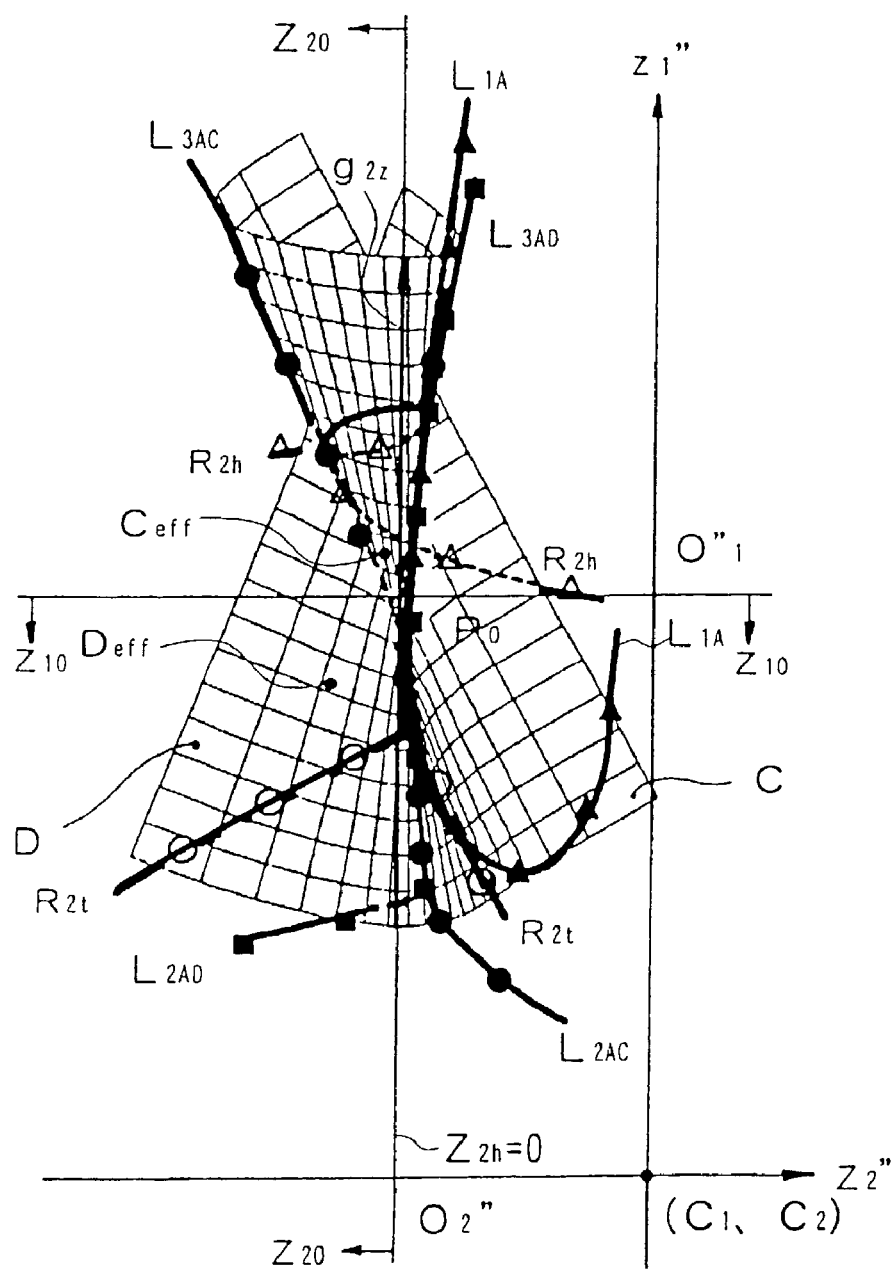
FIG. 29 is a figure showing the examples of the effective surface of action and the action limit curve of the hypoid gear, which is viewed to a negative direction along a $v_1$ axis in FIG. 27.
Figure 30:
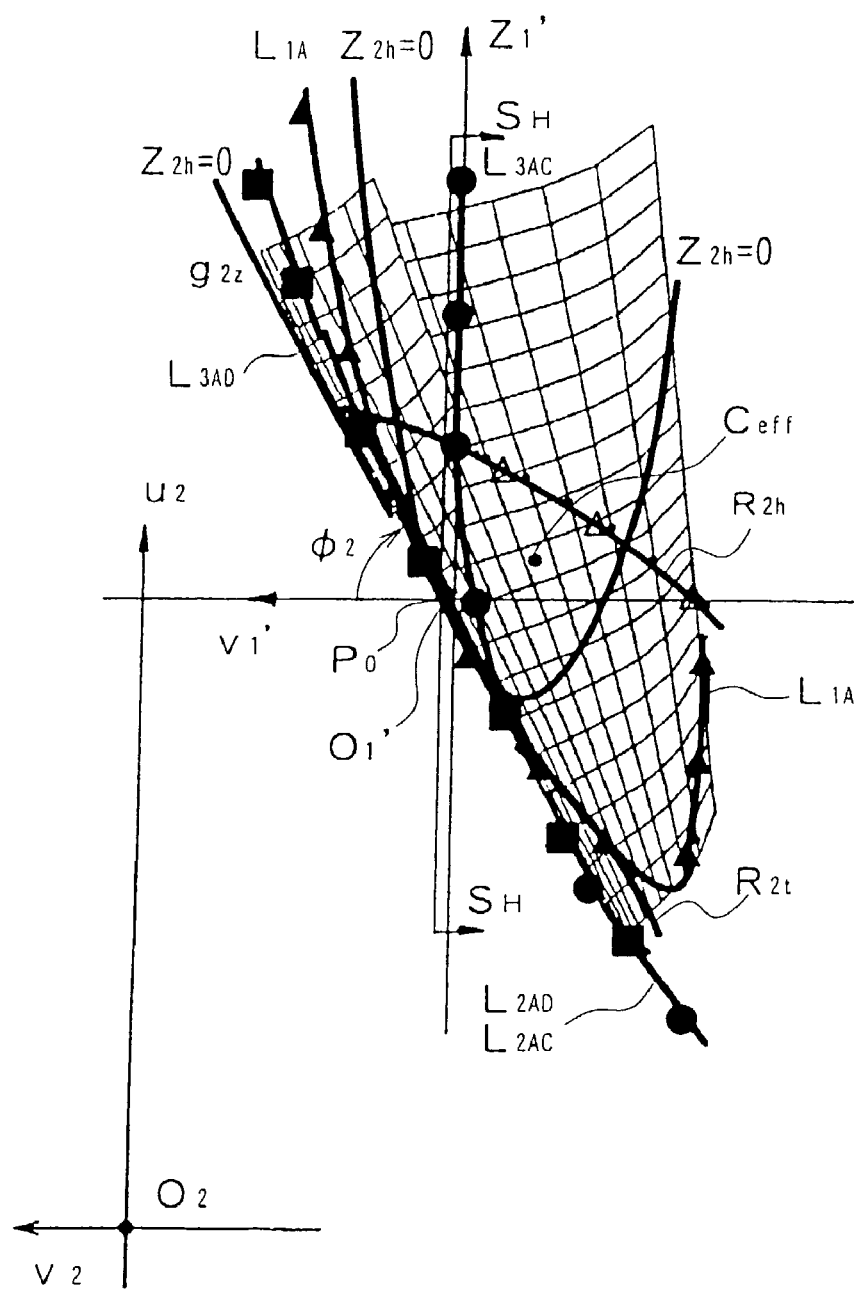
FIG. 30 is a figure showing the examples of the effective surface of action and the action limit curve of the hypoid gear, which is viewed to a negative direction along a $u_1$ axis in FIG. 27.

A surface of action is expressed by paths of contact and lines of contact almost perpendicular to the paths of contact, and is composed of a curved surface (surface of action C) drawn by the movement of the path of contact from the $g_{2z}$ ($\phi_{12z} = 0$) toward the $z_1$ (>0) direction while rotating in the $\phi_1$ (>0) direction, and a curved surface (surface of action D) drawn by the movement of the path of contact toward the $z_1$ (>0) direction while rotating in the $\phi_1$ (<0) direction. Only a tooth surface normal that satisfies the requirement for contact among the tooth surface normals of the involute helicoid becomes a contact normal. A tooth surface normal can be a contact normal at two positions of the both sides of the contact point to the base cylinder. Consequently, the curved surfaces shown in FIGS. 28-30 are drawn.

Loci of action limit curve (action limit point) of a pinion and a large gear of paths of contact are designated by $L_{1A}$ (on a pinion base cylinder), $L_{2AD}$ and $L_{2AC}$. Furthermore, orthogonal projections (action limit point on the gear axis side) to the surfaces of action of the large gear axis are designated by $L_{3AD}$ and $L_{3AC}$ which are the loci of the contact point of a cylinder having the large gear axis as its axis with an intersection line of the surface of action with a plane of rotation $Z_2$. Because the surface of action is determined by the involute helicoid given to the pinion side in the present embodiment, the orthogonal projection to the surface of action of the pinion axis (the action limit curve on the pinion side) is the $L_{1A}$. In cylindrical gears, the surface of action becomes a plane, such that consequently the orthogonal projection of the surface of action of a pinion axis and a large gear axis become a simple straight line. However, because the surfaces of action of hypoid gears are complicated curved surfaces as shown in the figures, the orthogonal projections of a pinion axis and a large gear axis do not become a straight line. And there are a plurality of the orthogonal projections for each the axes. Moreover, there is also a case where the orthogonal projections generate ramifications. A zone enclosed by a action limit curve nearest to the design reference point $P_0$ is a substantially usable tooth surface.

Moreover, the face surface of the gear is designated by $Z_{2h}$ (=0) (the plane of rotation of the gear including $g_{2z}$). The large end of the large gear and the line of intersection of the small end cylinder with the surface of action are designated by $R_{2h}$, $R_{2t}$, respectively.

Because a surface of action including the limiting path $g_{2z}$ and enclosed by the $L_{3AD}$ and the $L_{3AC}$ is limited to a narrow zone near to the $P_0$, there is no tooth surface that can substantially be used. Accordingly, an effective surface of action enclosed by the action limit curve, the face surface of the large gear, and large end and small end cylinders are as described in the following.

EFFECTIVE SURFACE OF ACTION $C_{eff}$: a zone (convexo-concave contact) enclosed by the action limit curve $L_{3AC}$ on the surface of action C and the boundary lines of the gear $Z_{2h}$ (=0) and $R_{2h}$.

EFFECTIVE SURFACE OF ACTION $D_{eff}$: a zone (convexo-convex contact) enclosed by boundary lines of the gear $z_{2h}$ (=0), $R_{2h}$, $R_{2t}$ on the surface of action D.

6.3 Selection of Paths of Contact $g_{0D}$, $g_{0C}$ (1) In Case of Expression (77)A The case of the expression (77)A is one wherein the path of contact $g_{0C}$ is taken as the $g_{2z}$, and, in the case the effective surface of action $C_{eff}$ is given by FIGS. 28-30. Because the boundary of the effective surface of action $C_{eff}$ on the small end side of the large gear is determined by the action limit curve $L_{3AC}$, there is no tooth surface of the large gear on the small end side of the large gear from the $L_{3AC}$. Consequently, it is necessary to set the zones ($R_{2t}$-$R_{2h}$) of the gear to the larger end side in accordance with the effective surface of action $C_{eff}$ again for realizing the tooth surface C as it is.

(2) In Case of Expression (77)B

The case of the expression (77)B is one wherein the path of contact $g_{0D}$ is taken as the $g_{2z}$, and, in the case the effective surface of action $D_{eff}$ is also given by FIGS. 28-30. Because the lines of intersection $z_{2h}$ (=0), $R_{2t}$, $R_{2h}$ of the boundary surface of the large gear with the surface of action are located in the inner from the action limit curves $L_{1A}$, $L_{3AD}$, $L_{2AD}$, the combination of the expression (77)B can realize an effective tooth surface D in the inner of the zone ($R_{2t}$-$R_{2h}$) of the given large gear.

Figure 31:
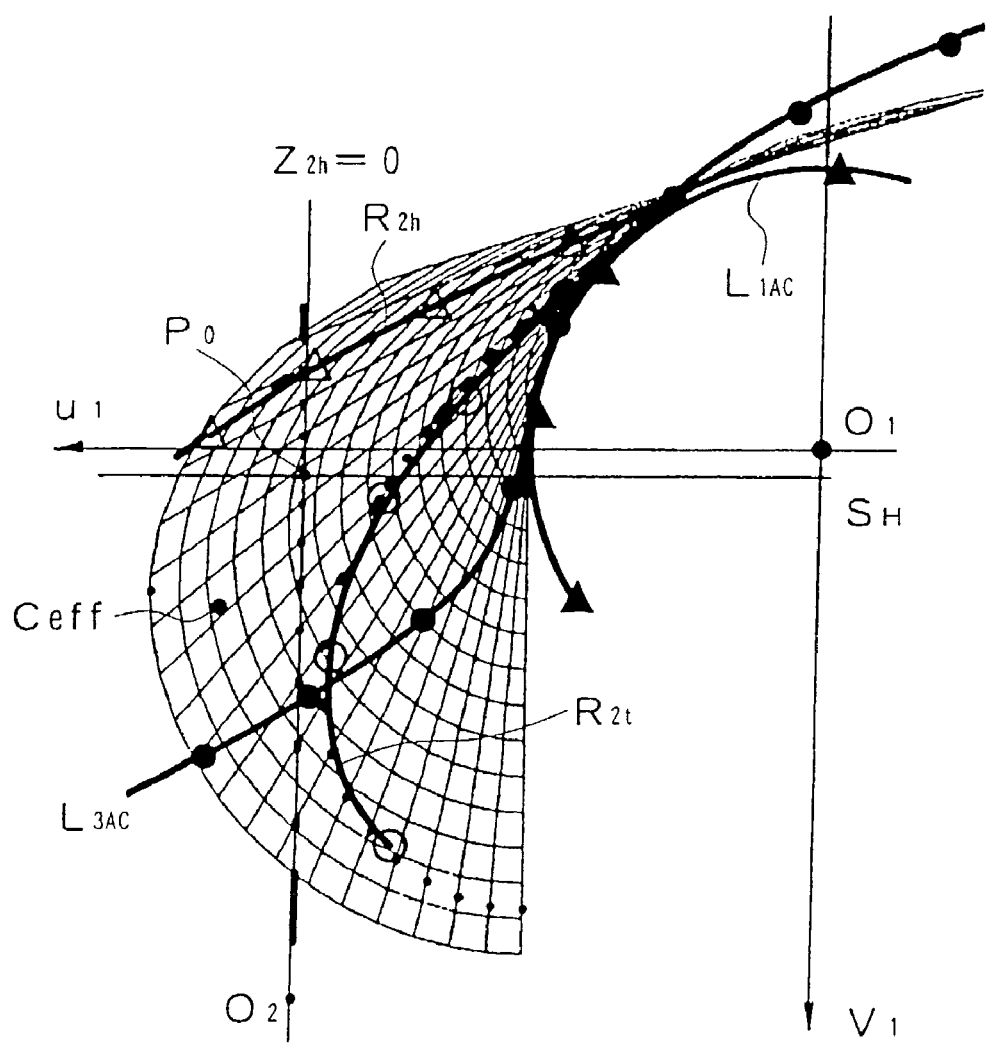
FIG. 31 is a figure showing the examples of the effective surface of action and the action limit curve of the hypoid gear, which corresponds to FIG. 28 and shows a surface of action in a case where the base cylinder is further reduced.
Figure 32:
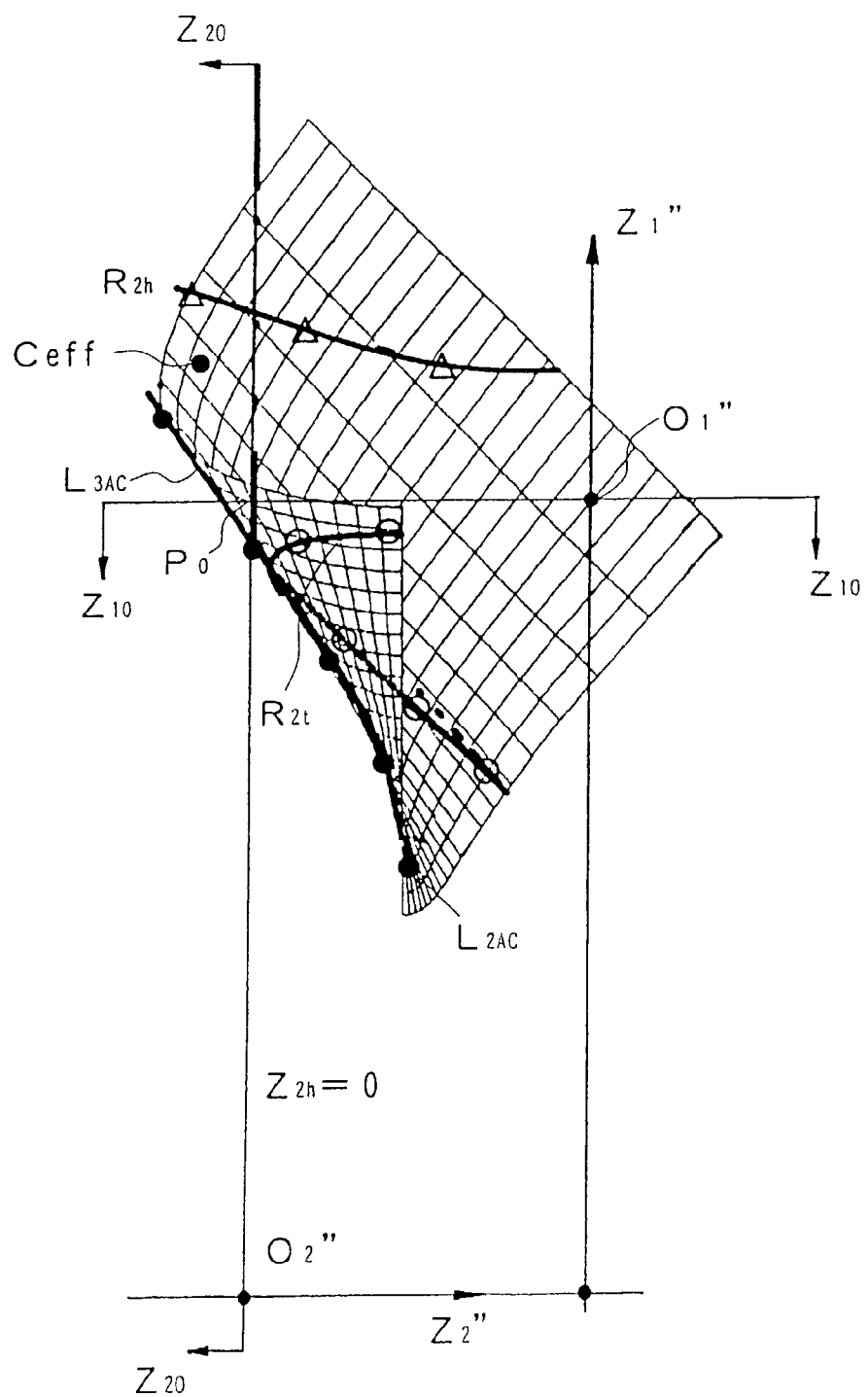
FIG. 32 is a figure showing the examples of the effective surface of action and the action limit curve of the hypoid gear, which corresponds to FIG. 29 and shows a surface of action in a case where the base cylinder is further reduced.
Figure 33:
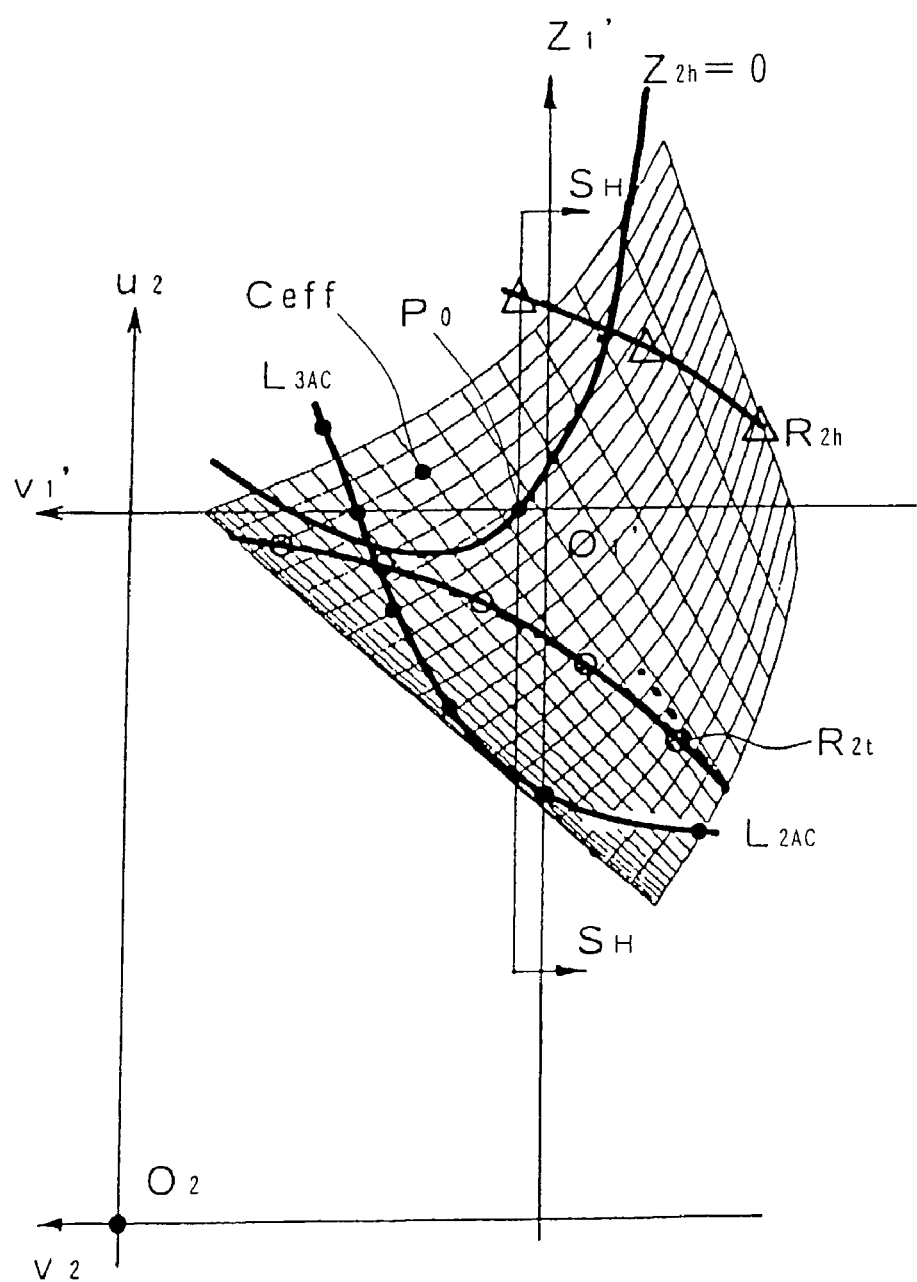
FIG. 33 is a figure showing the examples of the effective surface of action and the action limit curve of the hypoid gear, which corresponds to FIG. 30 and shows a surface of action in a case where the base cylinder is further reduced.

FIGS. 31-33 shows the effective surface of action $C_{eff}$ of the tooth surface C ($\phi_{n0C}=\phi_{n2z}-38°$) at this time. Because the base cylinder radius $R_{b10C}$ of the $g_{0C}$ becomes small, the $L_{3AC}$ moves to the inner of the large gear, and it is known that the $L_{3AC}$ is pretty improved in comparison with the $C_{eff}$ shown in FIGS. 28-30 when they are compared at the position of the point $P_0$. Consequently, it is shown that the tooth surface C can almost be realized in the zone of the large gear ($R_{2t}$-$R_{2h}$) by slightly altering $g_{0C}$.

(3) In Case of Expression (77)C

For ensuring the effective surface of action $C_{eff}$ (convexo-concave contact) in the vicinity of the design reference point $P_0$, as described above, it is necessary to incline $g_{0C}$ from $g_{2z}$ as large as possible to make the radius of the base cylinder of a pinion small for locating the $L_{3AC}$ on the small end side of the large gear (in the inner thereof if possible). On the other hand, to make the shape of the base cylinder small by inclining $g_{0D}$ from $g_{2z}$ by as much as possible results only in a decrease of the contact ratio, which is of little significance. In particular, if the tooth surface D is used on the drive side as in a hypoid gear for an automobile, it is rather advantageous to bring $g_{0D}$ as close as possible to $g_{2z}$. For making both of the tooth surface D and the tooth surface C effective in the given large gear zone ($R_{2t}$-$R_{2h}$), the selection near to the expression (77)B ($R_{b10D}$>$R_{b10C}$) is advantageous in almost all cases.

In the pair of gears having an involute helicoid as the tooth surface of a pinion described above, it is necessary that the action limit curve ($L_{3AC}$ in this case) on the convexo-concave contact side is brought to the inner from the small end of the large gear, which is a cause of employing unsymmetrical pressure angles (different base cylinders).

On the basis of the examination mentioned above, each of the inclination angles of the paths of contact $g_{0D}$, $g_{0C}$ is determined as follows.

$$g_{0D}(\psi_0, \phi_{n0D}=\phi_{n2z}; C_s)$$

$$g_{0C}(\psi_0, \phi_{n0C}=\phi_{n2z}-38°; C_s) \quad (78)$$

Here, it is practical to set the $\phi_{n0D}$ larger than the $\phi_{2z}$ a little for giving an allowance ($\Delta\phi_n$).

7. Boundary Surfaces of Equivalent Rack and a Pair of Gears 7.1 Specifications of Equivalent Rack FIG. 26 shows the shape of an equivalent rack on the plane $S_n$. If a design reference point $P_0$, a reference line (limiting path) $g_t$ of the equivalent rack and paths of contact $g_{0D}$, $g_{0C}$ are given, the specifications and a position of the equivalent rack to the design reference point $P_0$ can be obtained as follows.

(1) Normal Pitches $p_{g0D}$, $p_{g0C}$ $$p_{g0D}=2\pi R_{b10D}\cos\psi_{b10D}/N_1 \text{ (in the direction of } g_{0D})$$

$$p_{g0C}=2\pi R_{b10C}\cos\psi_{b10C}/N_1 \text{ (in the direction of } g_{0C}) \quad (79)$$

where $N_1$: the number of teeth of the gear I.

(2) Working Depth $h_k$ $$h_k=p_{g0D}\cos(\phi_{nt}-\phi_{n0C})/\sin(\phi_{n0D}-\phi_{n0C})-2t_{cn}/\{\tan(\phi_{n0D}-\phi_{nt})+\tan(\phi_{nt}-\phi_{n0C})\} \quad (80)$$

where $t_{cn}$: the cutter top land on the equivalent rack $c_r$: clearance.

(3) Addendum $A_{d2}$ of Large Gear $$P_0Q_{2n}A_{d2}=(u_{1p0}-R_{b10D})\sin(\phi_{n0D}-\phi_{nt})/\cos\phi_{10D}/\cos\psi_{b10D}$$

$$P_0Q_{1n}=A_{d1}=h_k-A_{d2} \quad (81)$$

(4) Phase Angle $\theta_{2wsC}$ of $W_{sC}$ to Point $P_0$ ($W_{sD}$)

$$\theta_{2wsC}=-2\theta_{2p}\{A_{d2}+(h_{cr}-h_k)/2\}\sin(\phi_{n0D}-\phi_{n0C})/\cos(\phi_{n0D}-\phi_{nt})/p_{g0C} \quad (82)$$

where $2\theta_{2p}$: the angular pitch of the large gear.

7.2 Face Surface of Large Gear

Because the paths of contact $g_{oD}$, $g_{oC}$ mutually incline in opposite directions to each other to the plane of rotation of large gear, it is advantageous for the face and root surfaces of a large gear to be planes of rotation of the large gear rather than to be a conical surface for realizing both of them reasonably. Accordingly, the plane of rotation of the gear passing the point $Q_{2n}$ is supposed to be the face surface of gear as follows, $$\text{face surface of gear } z_{2h} = z_{2Q2n} \tag{83}$$

where $Q_{2n}$ ($u_{2Q2n}$, $v_{2Q2n}$, $z_{2Q2n}$; $O_2$).

7.3 Pinion Face Cylinder

If a pinion face surface is supposed to be a cylinder passing the point $Q_{1n}$ in accordance with the large gear face surface, the pinion face cylinder radius can be expressed as follows, $$R_{1Q1n} = \sqrt{(u_{1Q1n}^2 + v_{1Q1n}^2)} \tag{84}$$

where $Q_{1Q}(u_{1Q1n}, v_{1Q1n}, z_{1Q1n}; O_2)$.

7.4 Inner and Outer Ends of Pinion

The outer and the inner ends of a pinion are supposed to be planes of rotation of the pinion passing intersection points of a large end cylinder and a small end cylinder of the large gear with the axis of the pinion. Consequently, the outer and the inner ends of the pinion can be expressed as follows in the coordinate system $O_1$, $$\text{pinion outer end } z_{1h} = \sqrt{(R_{2h}^2 - E^2)} - z_{1c0}$$

$$\text{pinion inner end } z_{1t} = \sqrt{(R_{2t}^2 - E^7)} - z_{1c0} \tag{85}$$

where $z_{1c0}$: a transformation constant from the coordinate system $C_1$ to the $O_1$.

8. Modification of Pinion Involute Helicoid

The pinion involute helicoid determined as above has the following practical disadvantages in the case where the tooth surfaces D, C severally have leads different from each other. In the case where the face surface of pinion is a cylinder, for example, the pinion top land may not be constant, and it may be necessary to determine the location of the pinion in the axial direction and to manufacture tooth surfaces separately, and so forth. Accordingly, in the present embodiment, the pinion involute helicoid is somewhat modified as follows for making the leads of the tooth surfaces D and C equal. Various methods for making the leads of the tooth surfaces D and C equal can be considered. Hereupon, it is supposed that the tooth surface D is left to be the given original form, and that tooth surface C is changed to be a tooth surface $C_c$ by the adjustment of only its helical angle $\psi_{b10C}$ (with base cylinder radius $R_{b10C}$ being left as it is).

(1) Helical Angle $\psi_{b10CC}$ of Tooth Surface $C_c$

Because the lead of the tooth surface $C_c$ is the same as that of the tooth surface D, the helical angle $\psi_{b10CC}$ can be obtained from the following expression.

$$\tan \psi_{b10CC} = R_{b10C} \tan \psi_{b10D}/R_{b10D} \tag{86}$$

(2) Path of Contact $g_{0CC}$ of Gear $C_c$

If the contact normal of a tooth surface $C_c$ on the plane of action $G_{10C}$ of the tooth surface C passing the design reference point $P_0$ is newly designated by a path of contact $g_{0CC}$, the inclination angle thereof can be expressed as follows.

$$g_{0CC}(\phi_{10C}, \psi_{b10CC}; O_1) \tag{87}$$

Consequently, the intersection point $P_{0CC}(u_{c0CC}, 0, z_{c0CC}; C_s)$ thereof with the plane $S_H$ expressed by the coordinate system $C_s$ can be obtained from the following expressions.

$$\sin \phi_{n0CC} = -\cos \psi_{10CC} \sin \phi_{10C} \sin \psi_{b10CC} \cos \Gamma_s$$

$$\tan \psi_{0CC} = \tan \phi_{10C} \cos \Gamma_s + \tan \psi_{b10CC} \sin \Gamma_s / \cos \phi_{10C}$$

$$u_{c0CC} = E \tan \psi_{0CC} \cos \Gamma_s \sin \Gamma_s$$

$$z_{c0CC} = (u_{1p0} - u_{c0CC} \sin \Gamma_s)/\cos \Gamma_s \tag{88}$$

If the intersection point $P_{0CC}$ is expressed by the coordinate systems $O_1$, $O_{q1}$, it can be expressed as follows.

$$P_{0CC}(u_{1p0}, -V_{cs1}, z_{1p0CC}; O_1)$$

$$P_{0CC}(q_{1p0C}, -R_{b10C}, z_{1p0CC}; O_{q1})$$

$$z_{1p0CC} = -u_{c0CC} \cos \Gamma_s + z_{c0CC} \sin \Gamma_s - z_{1c0} \tag{89}$$

(3) Phase Angle of Tooth Surface $C_c$

Figure 34:
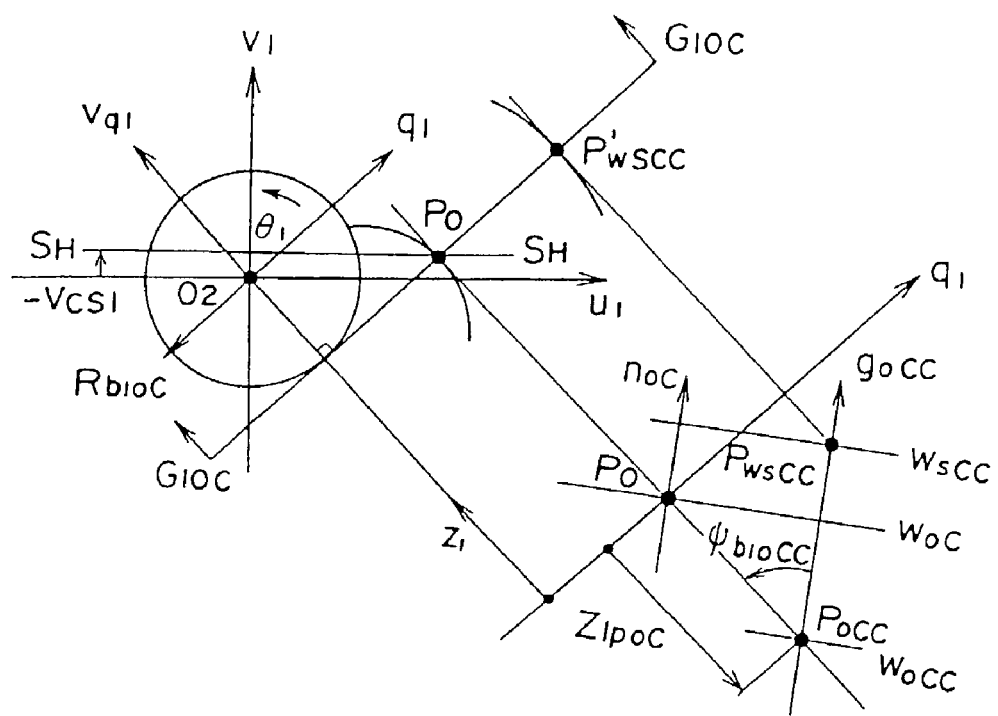
FIG. 34 is a figure showing a relationship of a point of contact $P_{wsCC}$ of a tooth surface $C_c$ at a rotation angle $\theta_1$ (=0) to the design reference point $P_0$.

FIG. 34 shows a relationship of a point of contact $P_{wsCC}$ of a tooth surface $C_c(g_{0CC})$ at the rotation angle $\theta_1$ (=0) to the design reference point $P_0$. When the rotation angle $\theta_1$=0, the tooth surface $C_c$ has rotated by a phase angle $\theta_{1wsC}$ to the point $P_0$ and intersects $g_{0CC}$ at $P_{wsCC}$, therefore the phase angle $\theta_{1wsCC}$ of the point $P_{wsCC}$ to the point $P_{0CC}$ can be obtained from the following expressions with respect to $g_{0CC}$, $$P_{0CC}P_{wsCC} = R_{b10C}\theta_{1wsC} \cos \psi_{b10CC} - z_{1p0CC} \sin \psi_{b10CC}$$

$$\theta_{1wsCC} = 2\theta_{1p}(P_{0C}P_{wsCC})/P_{g0CC}$$

$$P_{g0CC} = 2\pi R_{b10C} \cos \psi_{b10CC}/N_1 \tag{90}$$

where $2\theta_{1p}$: the angular pitch of the pinion.

(4) Equation of Path of Contact $g_{0CC}$

The equations of the path of contact $g_{0CC}$ to be determined finally by the modification described above can be expressed as follows in the coordinate systems $O_1$, $O_{q1}$.

$$q_1(\theta_1) = R_{b10C}(\theta_1 + \theta_{1wsCC})\cos^2 \psi + q_{b10CC}$$

$$\chi_1(\theta_1) = \chi_{10C} = \pi/2 - \phi_{10C}$$

$$u_1(\theta_1) = q_1 \cos \chi_{10C} + R_{b10C} \sin \chi_{10C}$$

$$v_1(\theta_1) = q_1 \sin \chi_{10C} - R_{b10C} \cos \chi_{10C}$$

$$z_1(\theta_1) = R_{b10C}(\theta_1 + \theta_{1wsCC})\cos \psi_{b10CC} \sin \psi_{b10CC} + z_{1p0CC} \tag{91}$$

The normal $n_{0C}$ of the tooth surface $C_c$ passing the design reference point $P_0$ does not become a contact normal.

9. Conjugate Large Gear Tooth Surface and Top Land

9.1 Conjugate Large Gear Tooth Surface

Figure 35:
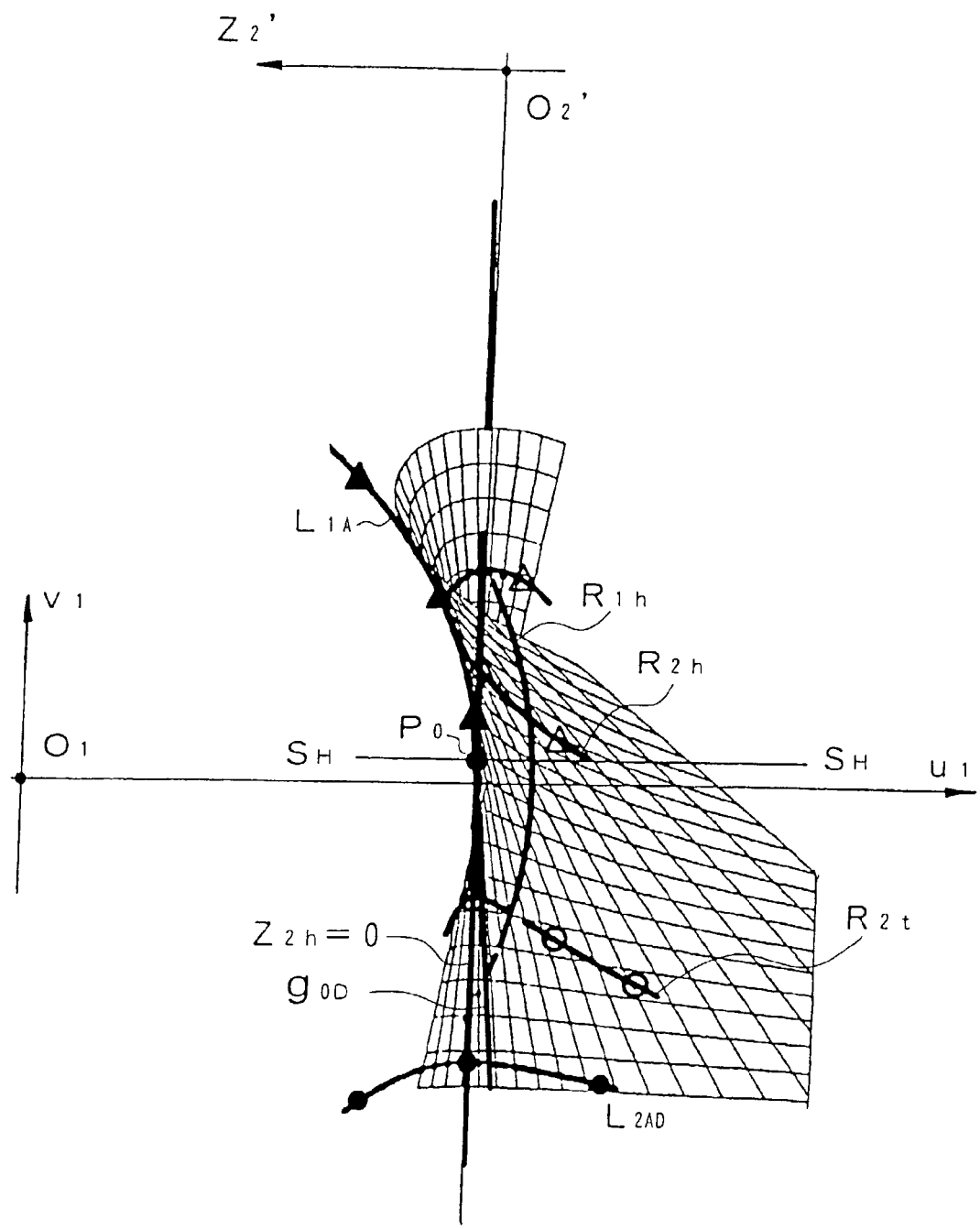
FIG. 35 is a figure showing an effective surface of action drawn by a pinion tooth surface D.

FIG. 34 and FIG. 35 show an effective surface of action (FIG. 34) drawn by the pinion involute helicoidal tooth surface D determined in such a way as described above and a generated gear conjugate tooth surface D (FIG. 35). R.sub.1h designates the radius of the face cylinder of pinion. The path of contact on which the contact ratio of the tooth surface D becomes maximum is located on the large end side far from the g.sub.0D, and the value thereof is about 2.1. Consequently, the tooth bearing of the tooth surface D must be formed on the large end side along the path of contact on which the contact ratio becomes maximum.

Figure 36:
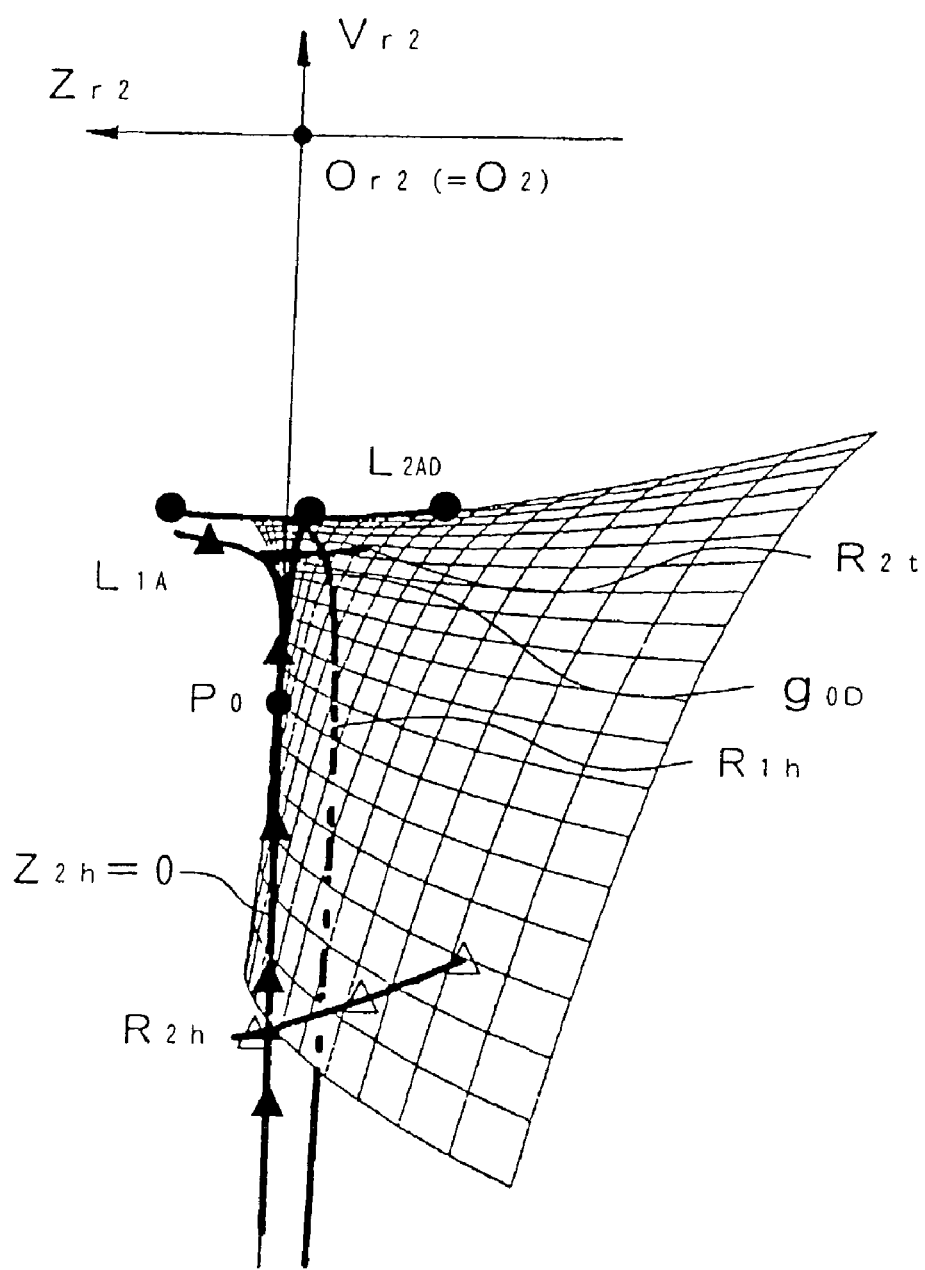
FIG. 36 is a figure showing a gear conjugate tooth surface D generated by the pinion tooth surface D shown in FIG. 35.
Figure 37:
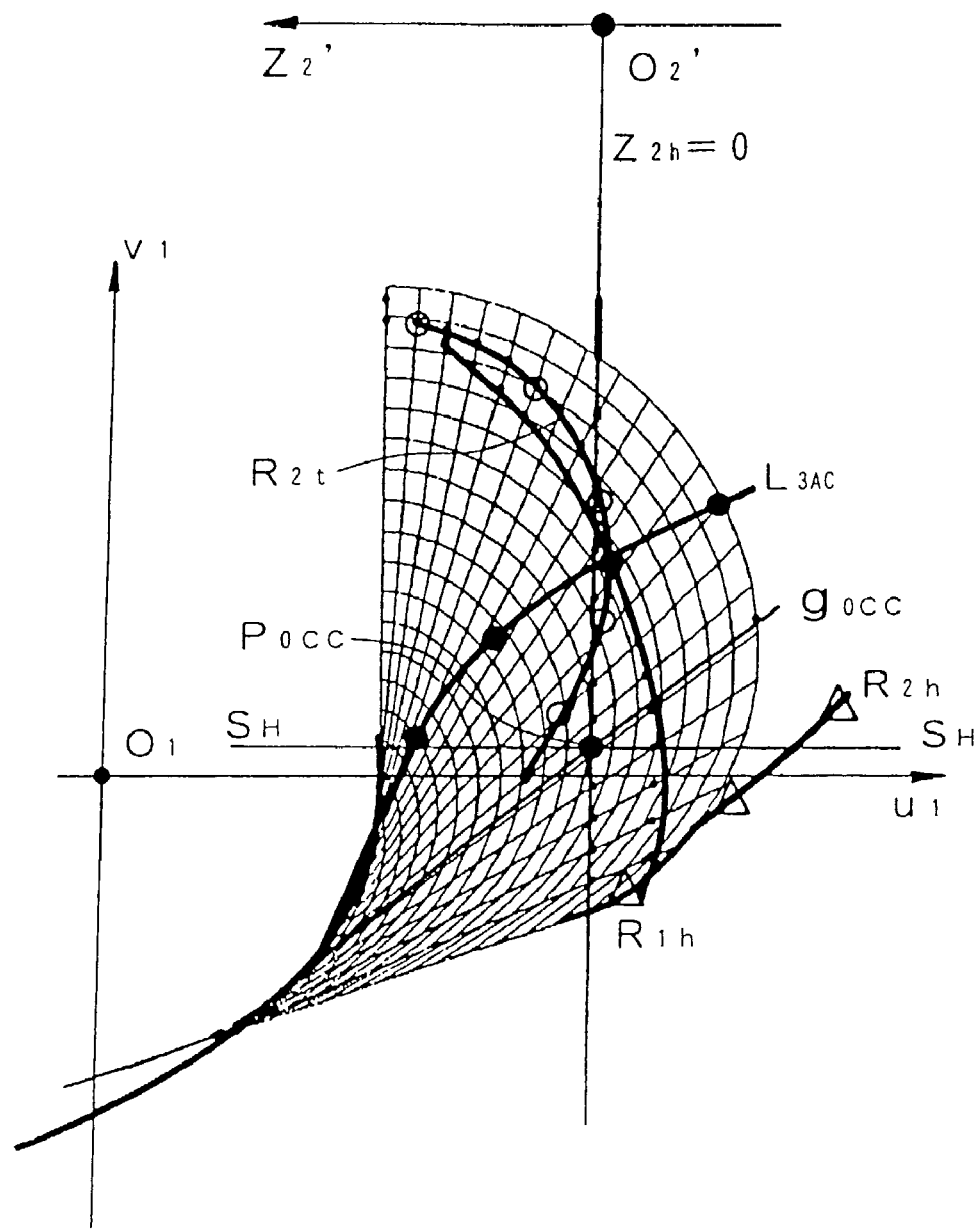
FIG. 37 is a figure showing an effective surface of action drawn by the pinion tooth surface $C_c$.

Similarly, FIG. 36 and FIG. 37 show an effective surface of action (FIG. 36) drawn by the pinion tooth surface $C_c$ and a generated gear conjugate tooth surface $C_c$ (FIG. 37). It is known that the effective surface of action and the large gear conjugate tooth surface $C_c$ are realized within the zone ($R_{2t}$-$R_{2h}$) of the large gear given by the selected pinion tooth surface $C_c$. The contact ratio along the path of contact is 0.9. Consequently, the tooth bearing of the tooth surface $C_c$ cannot but be formed on the small end side for the use of the lengthwise engagement. In the tooth surface $C_c$, the conditions of the fluctuation of a bearing load being zero is not satisfied.

9.2 Large Gear Top Land

Figure 38:
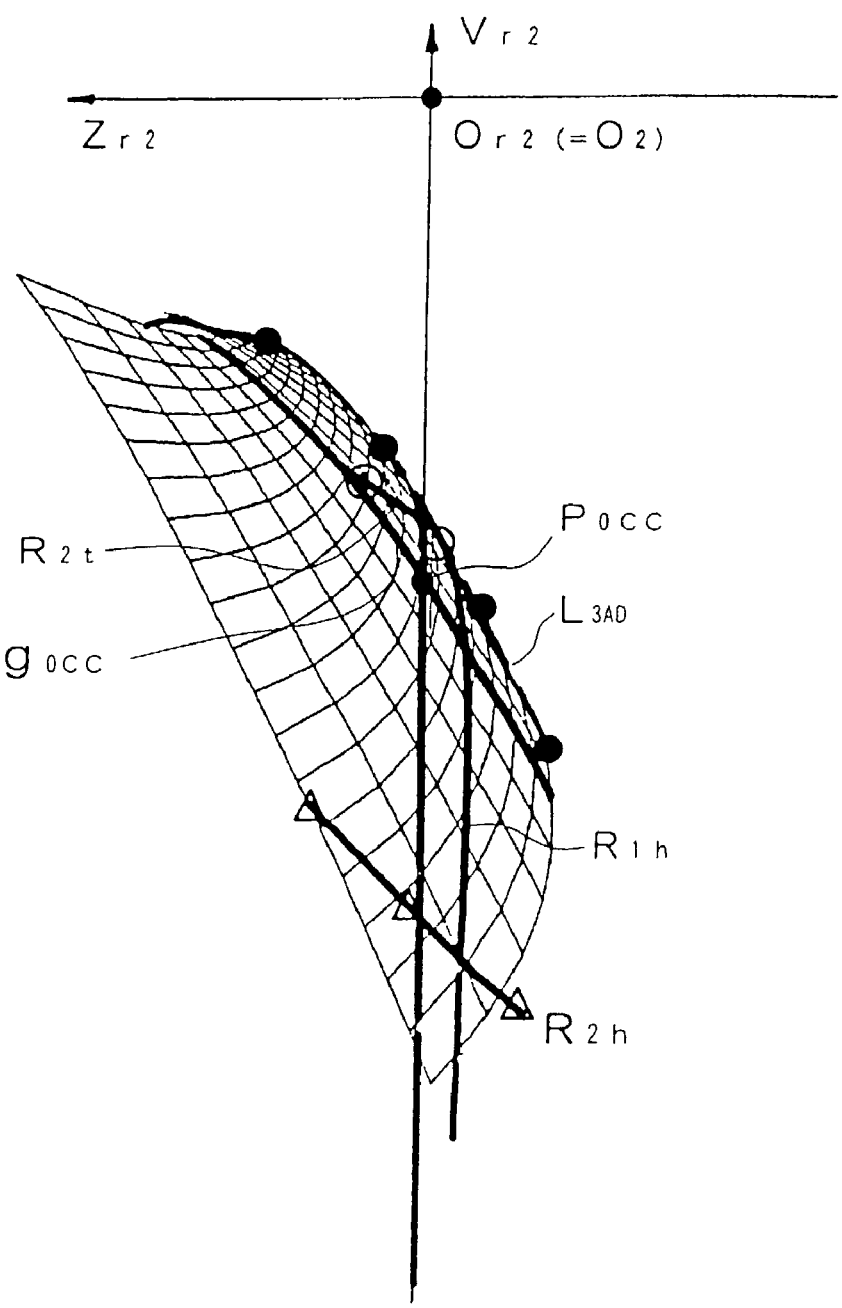
FIG. 38 is a figure showing a gear conjugate tooth surface $C_c$ generated by the pinion tooth surface $C_c$ shown in FIG. 37.
Figure 39:
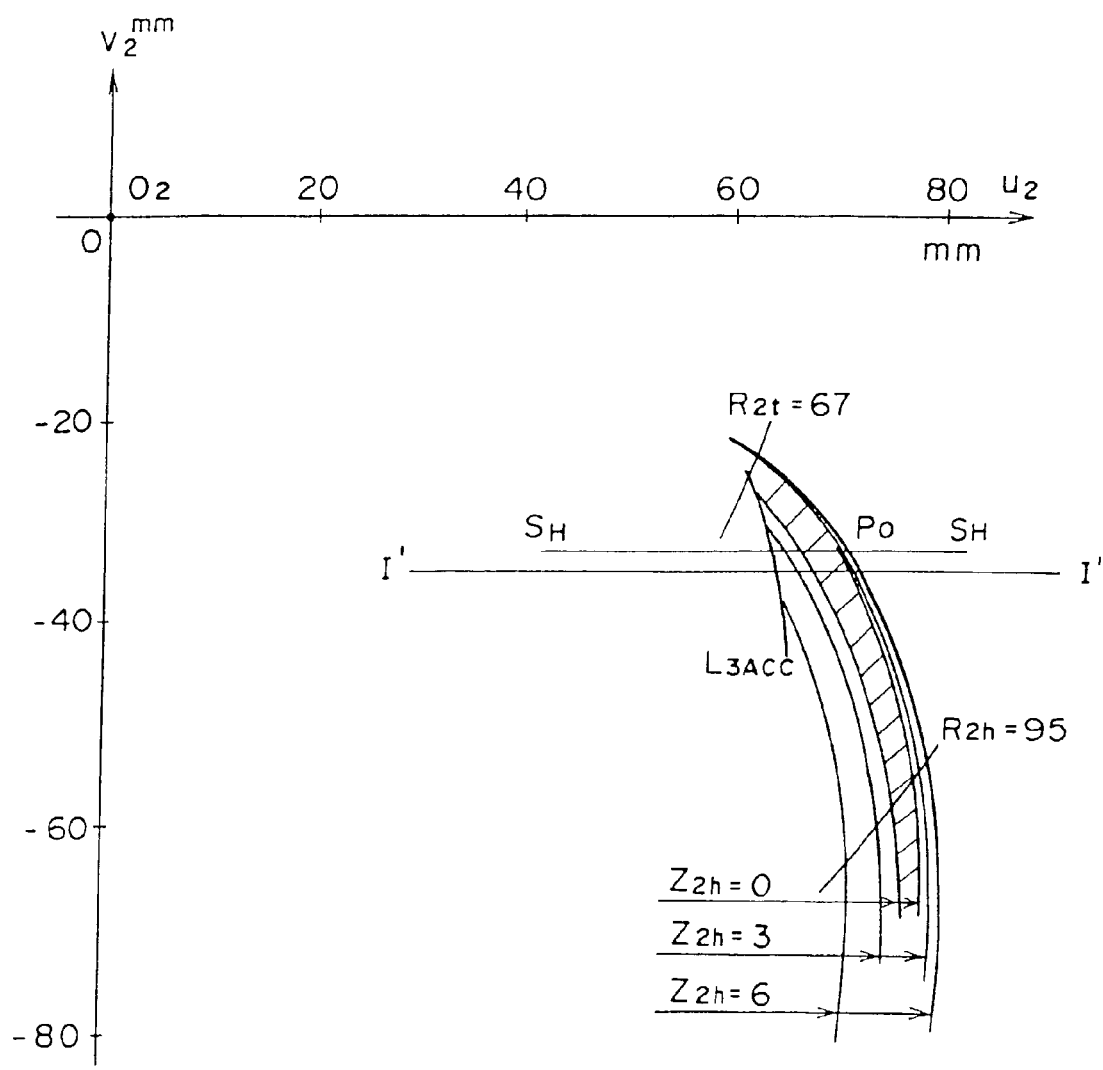
FIG. 39 is a figure showing a line of intersection of the conjugate gear tooth surfaces D, $C_c$ and planes of rotation of gear ($Z_{2h}$=0, 3, 6).

FIG. 38 shows a state of a tooth of a large gear viewed from the gear axis thereof, and draws lines of intersection of the aforesaid conjugate large gear tooth surfaces D, $C_c$ with the planes of rotation of the large gear at $Z_{2h}$=0 (face surface), $Z_{2h}$=3, $Z_{2h}$=6. In the figure, the widths of two lines at each of $Z_{2h}$=0, 3, 6 are large gear thicknesses. The thickness at the face surface $Z_{2h}$=0 (hatched zone in the figure) is the large gear face surface. Here, the ending of the line of intersection with $Z_{2h}$=0 at the point $P_0$ means that the tooth surface at the face surface does not exist from that point because $\phi_{nOD} \approx \phi_{n2z}$.

Furthermore, the fact that in the figure the lines of intersection of the aforesaid planes $Z_{2h}$=3, 6 with the tooth surface $C_c$ do not extend to the left side of the action limit curve $L_{3Acc}$ indicates that an undercut is occurred at the part. However, a tooth surface is realized in a large gear zone at the top part as it has been examined at paragraph 7.1.

Generally, a sharpened top is generated on the large end side of a large gear in a combination of a cylinder pinion and a disk gear. In the present embodiment, the top land becomes somewhat narrower to the large end, but a top land that is substantially allowable for practical use is realized. This fact is based on the following reason.

In the present embodiment, the paths of contact $g_{0D}$, $g_{0C}$ are both located at the vicinity of the limiting path $g_{2z}$, and incline to the $g_{2z}$ in the reverse directions mutually. Consequently, the base cylinder radii $R_{b20D}$, $R_{b20C}$ of the $g_{0D}$ and the $g_{0C}$ on the gear side are near to the base cylinder radius $R_{b2z}$ of the $g_{2z}$, and the difference between them is small. Then, by modification of the tooth surface C to the tooth surface $C_c$ (point $P_{0C}$ is changed to the point $P_{0CC}$), the difference becomes still smaller as a result.

If an arbitrary path of contact in a surface of action in the vicinity of the paths of contact $g_{0D}$, $g_{0C}$ drawn by an involute helicoid of a pinion is designated by $g_m$, the inclination angle $g_m$ of the arbitrary path of contact $g_m$ can be expressed as follows by transforming the inclination angle $g_m(\phi_{1m}, \psi_{b1m}; O_1)$ given by the coordinate system $O_1$ to the inclination angle in the coordinate system $O_2$, $$\tan_{100} 2m = \tan \psi_{b10} / \cos \phi_{1m}$$

$$\sin \psi_{b2m} = -\cos \psi_{b10} \sin \phi_{1m} \quad (92)$$

where $\Sigma = \pi/2$, $\psi_{b1m} = \psi_{b10}$ (constant).

As a design example, in a case wherein the $i_0$ is large and the $\psi_0$ is also large (60°), the $\psi_{b10}$ is large, and the changes of the inclination angle $\phi_{2m}$ of the path of contact is small as shown in FIGS. 28-30. Consequently, the changes of the $\psi_{b2m}$ becomes further smaller from the expressions (92).

On the other hand, because the gear tooth surface is the conjugate tooth surface of an involute helicoid, the following relationship is concluded.

$$R_{b2m} \cos \psi_{b2m} = i_0 R_{b10} \cos \psi_{b10} \quad (93)$$

If the changes of the $\psi_{2m}$ are small, the changes of the $R_{b2m}$ also becomes small from the expression (93). Consequently, the large gear tooth surfaces D, $C_c$ can be considered as involute helicoids having base cylinders $R_{b20D}$ and $R_{b20C}$ whose cross sections of rotation are approximate involute curves. Because the difference between $R_{b20D}$ and $R_{b20C}$ is small, the two approximate involute curves are almost parallel with each other, and the top land of the large gear is almost constant from the small end to the large end.

By the selection of the design variables $\psi_0$, $\phi_{nOD}$, $\phi_{nOC}$ as described above, the undercut at the small end and the sharpening of the top, which are defects of a conventional face gear, are overcome, and it becomes possible to design an involute hypoid gear for power transmission.

Furthermore, the following points are clear as the guidelines of design of a hypoid gear having an involute helicoidal tooth surface.

(1) The radius $R_{20}$ of the design reference point $P_0$ is located at the center of the inner radius and the outer radius of the large gear, and the inclination angle $\psi_0$ of the plane $S_n$ perpendicular to the relative velocity at the point $P_0$ is determined so as to substantially satisfy the following expressions.

$$R_{20} = (R_{2t} + R_{2h})/2$$

$$\epsilon_{20} = \sin^{-1}(-v_{cs2}/R_{20})$$

$$\psi_0 = \pm\cos^{-1}(R_{2t}/R_{20}) - \epsilon_{20}$$

where for + of the double sign: ordinal hypoid gear ($\psi_0 \geq -\epsilon_{20}$)

for − of the double sign: face gear ($\psi_0 < -\epsilon_{20}$).

By the $\psi_0$ determined in this manner, the radius of the action limit curve of each path of contact constituting a surface of action becomes smaller than the radius $R_{2t}$ in the large gear. That is, the action limit curve can be located on the outer of the face width, and thereby the whole of the face width can be used for the engagement of the gear.

(2) The line of intersection of the plane of rotation of large gear $Z_{20}$ passing the design reference point $P_0$ and the plane $S_n$ is supposed to be a limiting path $g_{2z}$. The inclination angle of the limiting path $g_{2z}$ on the plane $S_n$ is designated by $g_{2z}(\psi_0, \phi_{n2z}; C_s)$. A normal (path of contact) $g_{0D}$ of the tooth surface D passing the point $P_0$ is selected at a position near to the limiting path $g_{2z}$. That is, if the inclination angle of the $g_{0D \, on \, the \, plane \, Sn}$ is designated by $g_{0D}(\psi_0, \phi_{nOD}; C_s)$, the $\phi_{nOD}$ is selected as follows.

$$\phi_{nOD} \approx \phi_{n2z} \, (\phi_{nOD} > \phi_{n2z})$$

This condition meets the case where the contact of the tooth surface D at the point $P_0$ becomes a convexo-convex contact ($\psi_0 \geq -\epsilon_{20}$) as the result of the selection of the $\psi_0$. On the other hand, in case of a convexo-concave contact ($\psi_0 < -\epsilon_{20}$), a normal of the tooth surface C on the opposite side is selected as described above.

(3) If the inclination angle of the normal (path of contact) $g_{0C}$ of the tooth surface C passing the point $P_0$ on the plane $S_n$ is supposed to be designated by $g_{0C}(\psi_0, \phi_{nOC}; C_s)$, $\phi_{nOC}$ can be selected as follows.

$$\phi_{nOC} = \phi_{nOD} - 2\phi_{nOR}$$

Here, the $2\phi_{nOR}$ is the vertex angle of an equivalent rack, and is within a range of 30°-50°, being 38° or 40° ordinarily. By the selection of the $\phi_{nOD}$, $\phi_{nOC}$ in such a way mentioned above, a wide effective surface of action can be formed in the vicinity of the design reference point $P_0$. In other words, the radius of the action limit curve being a boundary of the effective surface of action can be made to be smaller than the radius $R_{2t}$ in the large gear.

Figure 42:
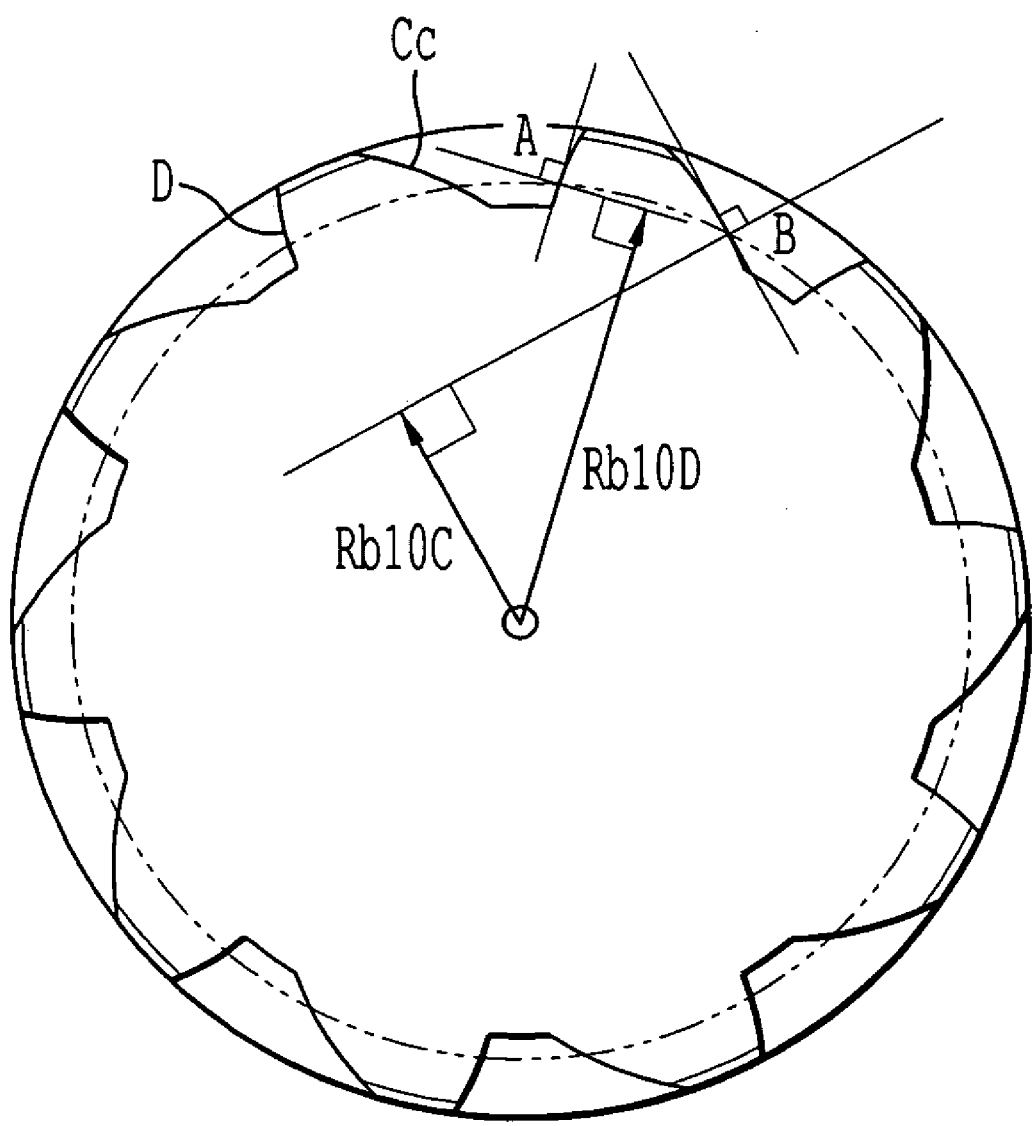
FIG. 42 is a plan view of a gear according to the invention, showing the base cylinder radii of the gear tooth surfaces.

(4) The face surface of a gear (plane of rotation of the gear) is located on the outer of a base cylinder determined by the paths of contact $g_{oD}$, $g_{oC}$ determined as described in (2), (3). By use of an equivalent rack having the line of intersection (limiting path $g_t$) of the plane $S_n$ and the plane $S_t$ formed by the peripheral velocities of the design reference point $P_0$ as its reference line and the $g_{oD}$ and the $g_{oC}$ as its tooth surface normal, a tooth depth having given top lands of a pinion and a large gear and the face surface (cylinder) of the pinion are determined. The face surface of the gear is selected to be on the outer of the base cylinder radii $R_{b10D}$, $R_{b10C}$ of the pinion, that is, the radii between the center O of the gear and normals to points A and B, which points are respectively located on the intersection of the tooth surface D and Cc with a circle coaxial with the gear center O (FIG. 42).

(5) An involute helicoid having tooth surface normals of the paths of contact $g_{oD}$, $g_{oC}$ is given to the pinion side or the large gear side, and further a mating surface is generated. The values for $g_{oD}$ or $g_{oC}$ are modified such that the tooth surface D and the tooth surface C on the pinion side have almost the same leads and the base cylinder radii to which the $g_{oD}$ and the $g_{oC}$ on the large gear side are tangent are almost the same. By the modification of the tooth surfaces D, C of the pinion to have the same leads, the top land of the pinion becomes constant in the axis direction. Furthermore, by the modification of the base cylinder radii on the large gear side, the top land of the gear also becomes almost the same in the radius direction.

Figure 40:
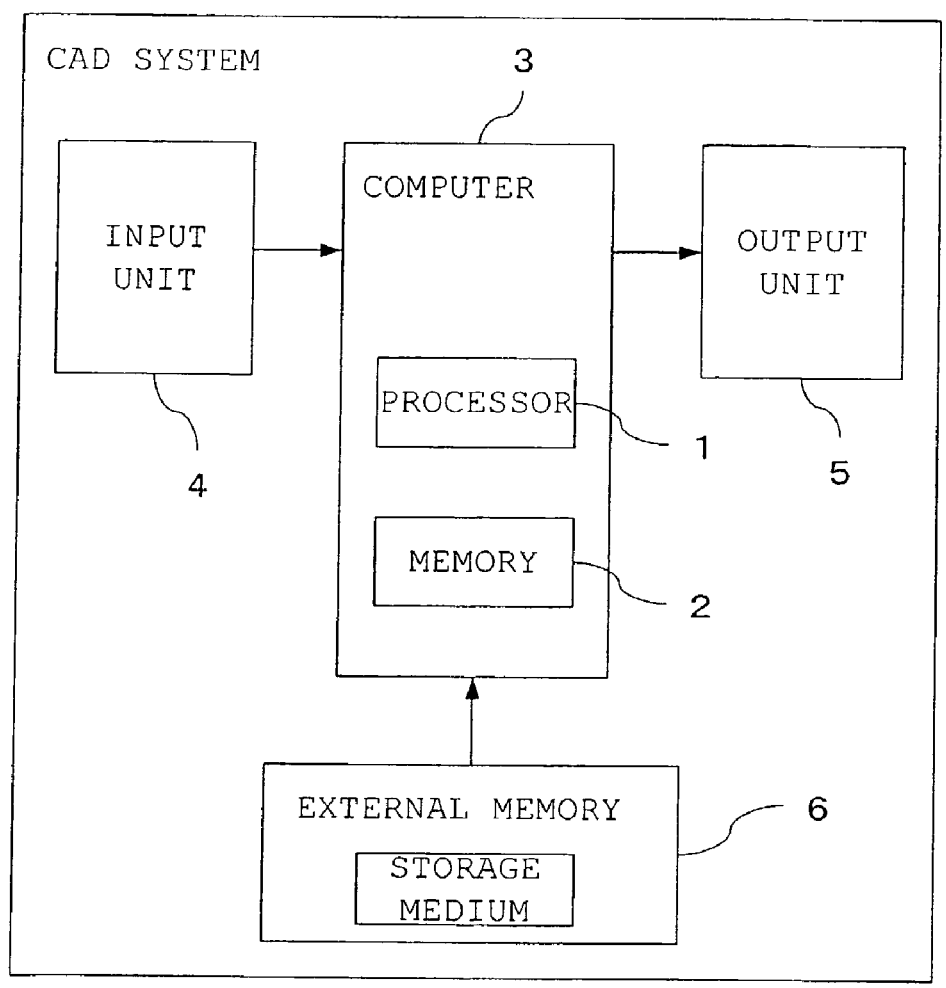
FIG. 40 is a schematic block diagram of a system for supporting gear designing.

In the hypoid gear design described above, a computer support design system (CAD system) shown in FIG. 40 performs design support. The CAD system is provided with a computer 3 including a processor 1 and a memory 2, an input unit 4, an output unit 5 and an external memory 6. In the external memory 6, data are read from and written into a recording medium. A gear design program for implementing the gear design method mentioned above is recorded in the recording medium in advance. As the occasion demands, the program is read out from the recording medium to be executed by the computer 3.

Figure 41:
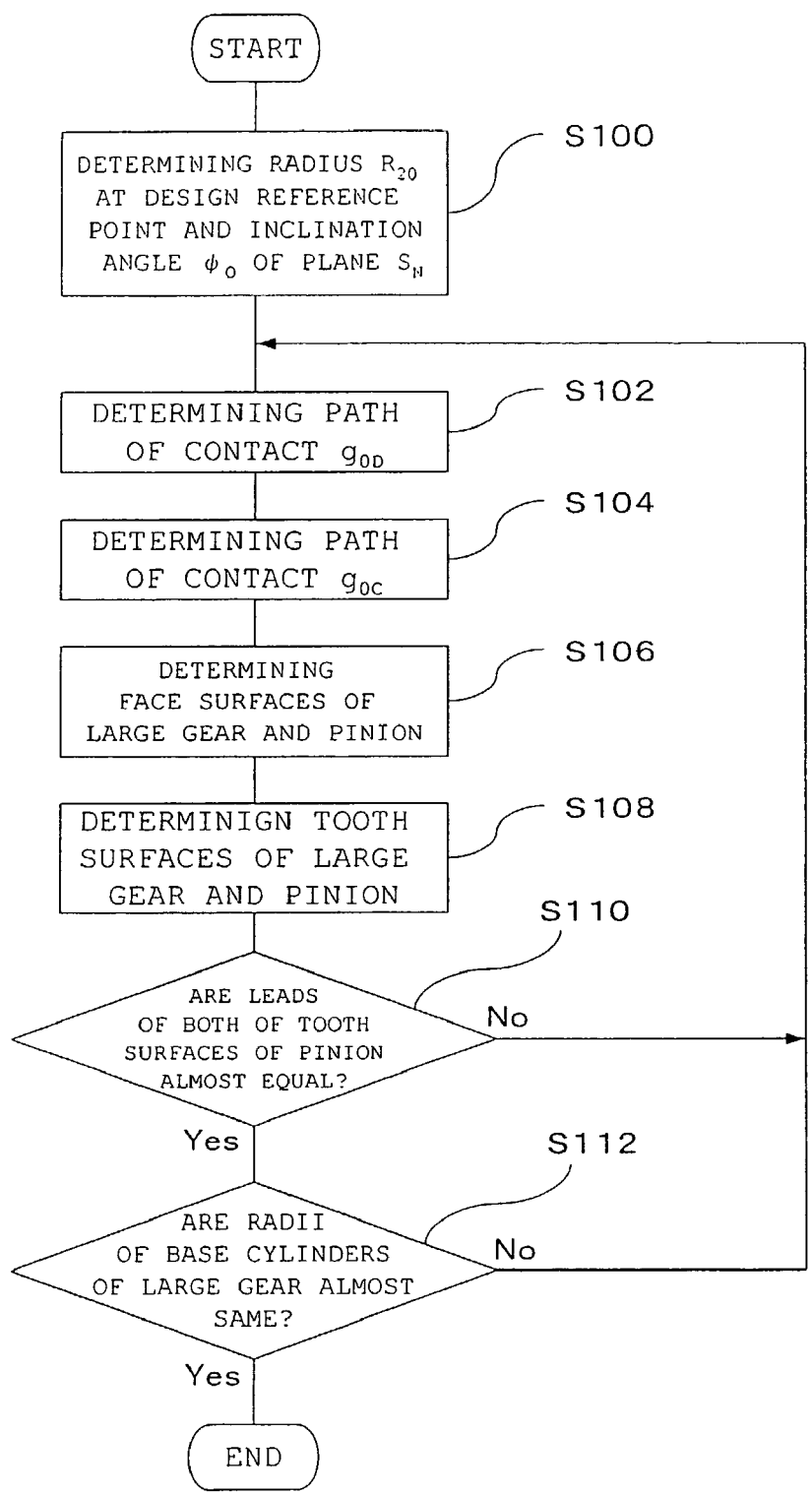
FIG. 41 is a flowchart showing of the gear designing process.

The program, more concretely, executes operations in accordance with the design guides (1)-(5) of the hypoid gear described above. FIG. 41 shows the outline of the operation flow. At first, the radius $R_{20}$ of the design reference point $P_0$ and the inclination angle $\psi_0$ of the plane $S_n$ are determined on the basis of requirement values of the design of a hypoid gear (S100). Next, the normal (path of contact) $g_{oD}$ of the tooth surface D passing at the design reference point $P_0$ is determined from the limiting path $g_{2z}$ (S102). Furthermore, the normal (path of contact) $g_{oC}$ of the tooth surface C passing at the design reference point $P_0$ is determined (S104). Moreover, the face surface of the gear and the face surface of the pinion are determined on the basis of the paths of contact $g_{oD}$, $g_{oC}$ (S106). One of either the pinion side or the large gear side of the involute helicoid having the paths of contact $g_{oD}$, $g_{oC}$ c as its tooth surface normal is given, and the other side is then determined (S108). Whether the formed tooth surfaces C, D of the pinion have almost the same leads or not is then judged (S110). If the tooth surfaces C, D do not have almost the same leads, the system returns to the step S102 and obtains the path of contact again. Furthermore, whether the base cylinder radii contacting with the paths of contact $g_{oD}$, $g_{oC}$ of the formed large gear are almost the same to each other or not is judged (S112). If the base cylinder radii are not almost the same to each other, the system returns to the step S102, and the paths of contact are obtained again.

Table 1 shows an example of calculated specifications of a hypoid gear. Table 1 refers to a hypoid gear such as that shown in FIG. 42, having a gear tooth coast surface Cc with a base cylinder radius $R_{b10C}$, and gear tooth drive surface D with a base cylinder radius $R_{b10D}$.

TABLE 1

| | |
|---|---|
| CYLINDER RADIUS FOR DESIGNING LARGE GEAR $R_{20}$ (mm) | 77 |
| INCLINATION ANGLE OF PLANE $S_n$ $\psi_0$ (°) Designed value in coordinate system $C_s$ | 60 |
| SPECIFICATIONS OF EQUIVALENT RACK | |
| $P_0$ ($u_{c0}$, 0, $z_{c0}$; $C_s$) (mm) | (13.96, 0, 75.00) |
| $g_{2z}$ ($\psi_0$, $\Phi_{n2z}$; $C_s$) (°) | (60.0, 11.93) |
| $g_t$ ($\psi_0$, $\Phi_{nt}$; $C_s$) (°) | (60.0, 7.13) |
| $g_{oD}$ ($\psi_0$, $\Phi_{noD}$; $C_s$) (°) | (60.0, 13.93) |
| $g_{oC}$ ($\psi_0$, $\Phi_{noC}$; $C_s$) (°) | (60.0, 24.07) |
| GEAR ADDENDUM $A_{d2}$ (mm) | 0.0 |
| NORMAL PITCH $P_{goD}$ (mm) | 9.599 |
| $P_{goC}$ (mm) | 8.269 |
| $P_{gt}$ (mm) | 9.667 |
| WORKING DEPTH $h_k$ (mm) where $t_n$ = 2 mm and $C_R$ = 2 mm are supposed | 3.818 |
| PHASE ANGLE OF TOOTH SURFACE C $\theta_{2wsC}$ (°) SPECIFICATIONS OF TOOTH SURFACE $C_c$ | −3.13 |
| $P_{0CC}$ ($u_{c0CC}$, 0, $z_{c0CC}$; $C_s$) (mm) | (15.35, 0, 69.30) |
| $g_{oCC}$ ($\psi_{0CC}$, $\Phi_{noCC}$; $C_s$) (°) | (62.30, 0, −21.60) |
| PHASE ANGLE OF TOOTH SURFACE $C_c$ $\theta_{1wsCC}$ (°) SPECIFICATIONS OF PINION | 6.37 |
| RADIUS OF CYLINDER TO BE DESIGNED $R_{10}$ (mm) | 31.391 |
| MAJOR DIAMETER $R_{1h}$ (mm) | 35.18 |
| MINOR DIAMETER $R_{1t}$ (mm) | 29.39 |
| TOOTH SURFACE WIDTH (mm) | 28 |
| LEAD (mm) | 109.83 |
| HELICAL ANGLE ON CYLINDER TO BE DESIGNED (°) | 60.89 |

| SPECIFICATIONS OF INVOLUTE HELICOID | | |
|---|---|---|
| | TOOTH SURFACE D | TOOTH SURFACE $C_c$ |
| BASE CYLINDER RADIUS (mm) | 31.389 | 17.754 |
| HELICAL ANGLE (°) | 60.89 | 45.44 |
| THICKNESS IN RIGHT ANGLE DIRECTION TO AXIS OF CYLINDER | | |
| TO BE DESIGNED | 12.685 | |
| TOP THICKNESS | 6.556 | |
| MAXIMUM CONTACT RATIO ALONG PATH OF CONTACT | | |
| | 2.10 | 0.88 |
| TOTAL CONTACT RATIO | 4.21 | 2.10 |

The invention claimed is:

1. A method for designing a hypoid gear consisting of a pair of gears including a pinion and a large gear, either of said gears being a first gear having an involute helicoid as a tooth surface, the other of said gears being a second gear having a tooth surface conjugate to the former tooth surface, said method comprising the steps of:

assigning to said gears (a) a stationary coordinate system in which one of three mutually orthogonal coordinate axes coincides with a rotation axis of the gear and one of other two coordinate axes coincides with a common perpendicular for the rotation axis of the gear and a rotation axis of a mating gear to be engaged with the gear, (b) a rotary coordinate system in which one of three mutually orthogonal coordinate axes coincides with the axis of said stationary coordinate system that coincides with the rotation axis of the gear among the three coordinate axes of said stationary coordinate system, said rotary coordinate system rotating about the coincided coordinate axis together with the gear, the other two coordinate axes of the three orthogonal axes coinciding with the other two axes of said stationary coordinate system respectively when a rotation angle of the gear is zero, and (c) a parameter coordinate system in which said stationary coordinate system is rotated and transformed about the rotation axis of the gear so that one of the other two coordinate axes of said stationary coordinate system becomes parallel with the plane of action of the gear, respectively;

describing a path of contact of a pair of tooth surfaces of the gear and the mating gear which engage with each other during the rotation of the gears and an inclination angle of a common normal which is a normal at each point of contact for the pair of tooth surfaces respectively in terms of a first function, in which a rotation angle of the gear is used as a parameter, in said parameter coordinate system;

describing the path of contact and the inclination angle of the common normal respectively in terms of a second function, in which a rotation angle of the gear is used as a parameter, based on the first function and a relationship between relative positions of said stationary coordinate system and said parameter coordinate system, in said stationary coordinate system;

acquiring the path of contact and the inclination angle of the common normal in the stationary coordinate system, respectively, and acquiring a tooth profile by describing the path of contact and the inclination angle of the common normal, respectively, in terms of a third function, in which the rotation angle of the gear is used as a parameter, based on the second function and the relationship between the relative positions of said rotary coordinate system and said stationary coordinate system, in said rotary coordinate system;

acquiring a surface of action for the pair of tooth surfaces having the tooth profile;

acquiring action limit curves which are orthogonal projections of axes of the two gears on the surface of action, and acquiring a tip line of the second gear in the surface of action, based on the tooth surface of the second gear, and further acquiring an effective surface of action existing between the action limit curves and the tip line; and judging whether or not the effective surface of action exists over a whole face width of the gear.

2. A hypoid gear design method according to claim 1, said method further comprising the step of:

acquiring an angle between paths of contact for the tooth surface of a drive side of the first gear and the tooth surface of a coast side of the first gear such that the teeth of the first gear have an appropriate strength.

3. A hypoid gear design method according to claim 2, said method further comprising the steps of:

acquiring specifications of an equivalent rack including a tooth surface based on the path of contact of the respective tooth surfaces of the drive side and the coast side; and acquiring a distance of the respective tip lines of the tooth surface of the drive side and the tooth surface of the coast side of the second gear, based on the specifications of the equivalent rack, and judging whether the acquired distance is equal to or greater than a predetermined value.

4. A hypoid gear design method according to claim 3, wherein at the acquiring of the pair of tooth surfaces a design reference point is set near a center of the face width of the gear, and when the distance of the tip line is insufficient at a large end side, the design reference point is shifted toward the large end side of the face width of the gear, and the effective surface of action is acquired again.

5. A hypoid gear design method according to claim 3, wherein at the acquiring of the pair of tooth surfaces a design reference point is set near a center of the face width of the gear, and when the effective surface of action is insufficient at a small end side of the face width of the gear and the distance of the tip line is insufficient at a large end side, the face width of the gear is reduced.

6. A hypoid gear design method according to claim 1, wherein at the acquiring of the pair of tooth surfaces a design reference point is set near a center of the face width of the gear, and when the effective surface of action is insufficient at a small end side of the face width of the gear, the design reference point is shifted toward the small end side of the face width of the gear, and the effective surface of action is acquired again.

7. A program for executing a hypoid gear design method according to claim 1 with a computer.

8. A hypoid gear comprising:

a first gear including an involute helicoid as a tooth surface; and a second gear which is one of a pair of gears including the first gear, wherein the second gear has a tooth surface conjugate to the first gear surface, wherein the tooth surface of the first gear and the tooth surface of the second gear define a line of contact, and wherein a radius of a base circle of the first gear differs between a drive side and a coast side, and wherein, when a helical angle $\Psi_0$ is greater than or equal to $-\epsilon_{20}$, a pressure angle $\phi_{n0D}$ of a drive-side tooth surface and a pressure angle $\phi_{n0C}$ of a coast-side tooth surface are:

$$\phi_{n0D}=\phi_{n2z}+\Delta\phi_n, \phi_{n0C}=\phi_{n0D}-2\phi_{n0R},$$

where $\epsilon_{20}=\sin^{-1}(-v_{cs2}/R_{20})$ $V_{cs2}=E \tan \Gamma_s/\{\tan(\Sigma-\Gamma_s)+\tan \Gamma_s\}$ $\phi_{n2z}$ is an inclination angle of limit trajectory ($\phi_{n2z=tan}^{-1}$ (sin $\Psi_0$/tan $\Gamma_s$))

$2\phi_{n0R}$ is a vertex angle of an equivalent rack and has a value of 30° to 50°, and $\Delta\phi_n$=2° to 10°.

9. A hypoid gear according to claim 8, wherein leads of tooth surfaces on the drive side and the coast side of the gear provided with the involute helicoid are the same.

10. A hypoid gear according to claim 8, wherein a ratio of an offset E being the shortest distance between each axis of a pinion and a gear constituting said hypoid gear and a radius $R_{20}$ at a design point of the gear ($E/R_{20}$) is larger than 0.25.

11. A hypoid gear according to claim 8, a gear ratio $i_0$ thereof is within a range of 2.5 to 5.

12. A hypoid gear according to claim 8, wherein a helical angle $\Psi_0$ thereof is within a range of 35° to 70°.

13. A hypoid gear according to claim 8, wherein at least one of the tooth surface of the first gear and the tooth surface of the second gear is modified.

14. A hypoid gear according to claim 8, wherein the base circle radius corresponds to an action limit curve radius.

15. A hypoid gear comprising:
a first gear including an involute helicoid as a tooth surface; and
a second gear which is one of a pair of gears including the first gear,
wherein the second gear has a tooth surface conjugate to the first gear surface,
wherein the tooth surface of the first gear and the tooth surface of the second gear define a line of contact, and
wherein a radius of a base circle of the first gear differs between a drive side and a coast side, and
wherein, when a helical angle $\Psi_0$ is less than $-\epsilon_{20}$, a pressure angle $\phi_{nOD}$ of a drive-side tooth surface and a pressure angle $\phi_{nOC}$ of a coast-side tooth surface are:

$\phi_{nOD} = \phi_{nOC} + 2\phi_{nOR}, \phi_{nOC} = \phi_{n2z} - \delta\phi_n$, where $\epsilon_{20} = \sin^{-1}(-v_{cs2}/R_{20})$
$v_{cs2} = E \tan \Gamma_s / \{\tan(\Sigma - \Gamma_s)\}$
$\phi_{n2z}$ is an inclination angle of limit trajectory ($\phi_{n2z} = \tan^{-1}(\sin \Psi_0/\tan \Gamma_s)$)
$2\phi_{nOR}$ is a vertex angle of an equivalent rack and has a value of 39° to 50°, and $\Delta\phi_n = 2°$ to 10°.

16. A hypoid gear according to claim 15, wherein leads of tooth surfaces on the drive side and the coast side of the gear provided with the involute helicoid are the same.

17. A hypoid gear according to claim 15, wherein a ratio of an offset E being the shortest distance between each axis of a pinion and a gear constituting said hypoid gear and a radius $R_{20}$ at a design point of the gear ($E/R_{20}$) is larger than 0.25.

18. A hypoid gear according to claim 15, a gear ratio $i_0$ thereof is within a range of 2.5 to 5.

19. A hypoid gear according to claim 15, wherein a helical angle $\Psi_0$ thereof is within a range of 35° to 70°.

20. A hypoid gear according to claim 15, wherein at least one of the tooth surface of the first gear and the tooth surface of the second gear is modified.

21. A hypoid gear according to claim 15, wherein the base circle radius corresponds to an action limit curve radius.

22. A hypoid gear comprising:
a first gear including an involute helicoid as a tooth surface; and
a second gear which is one of a pair of gears including the first gear,
wherein the second gear has a tooth surface conjugate to the first gear surface,
wherein the tooth surface of the first gear and the tooth surface of the second gear define a line of contact, and
wherein a radius of a base circle of the first gear differs between a drive side and a coast side, and
wherein, when a helical angle $\Psi_0$ is greater than or equal to $-\epsilon_{20}$, a pressure angle $\phi_{nOD}$ of a drive-side tooth surface and a pressure angle $\phi_{nOC}$ of a coast-side tooth surface are:

$\phi_{nOD} = \phi_{n2z} + \Delta\phi_n, \phi_{nOC} = \phi_{nOD} - 2\phi_{nOR}$, where $\epsilon_{20} = \sin^{-1}(-v_{cs2}/R_{20})$ $v_{cs2} = E \tan \Gamma_s / \{\tan(\Sigma - \Gamma_s) + \tan \Gamma_s\}$ $\phi_{n2z}$ is an inclination angle of limit trajectory ($\phi_{n2z} = \tan^{-1}(\sin \Psi_0/\tan \Gamma_s)$)

$2\phi_{nOR}$ is a vertex angle of an equivalent rack and has a value of 30° to 50°, and $\Delta\phi_n = 0°$ to 4°.

23. The hypoid gear according to claim 22, wherein $\Delta\phi_n = 0°$ to 2°.

24. A hypoid gear comprising:
a first gear including an involute helicoid as a tooth surface; and
a second gear which is one of a pair of gears including the first gear,
wherein the second gear has a tooth surface conjugate to the first gear surface,
wherein the tooth surface of the first gear and the tooth surface of the second gear define a line of contact, and
wherein a radius of a base circle of the first gear differs between a drive side and a coast side, and
wherein, when a helical angle $\Psi_0$ is less than $-\epsilon_{20}$, a pressure angle $\phi_{nOD}$ of a drive-side tooth surface and a pressure angle $\phi_{nOC}$ of a coast-side tooth surface are:

$\phi_{nOD} = \phi_{nOC} + 2\phi_{nOR}, \phi_{nOC} = \phi_{n2z} - \Delta\phi_n$, where $\epsilon_{20} = \sin^{-1}(-v_{cs2}/R_{20})$ $v_{cs2} = E \tan \Gamma_s / \{\tan(\Sigma - \Gamma_s) + \tan \Gamma_s\}$ $\phi_{n2z}$ is an inclination angle of limit trajectory ($\phi_{n2z} = \tan^{-1}(\sin \Psi_0/\tan \Gamma_s)$)

$2\phi_{nOR}$ is a vertex angle of an equivalent rack and has a value of 39° to 50°, and $\Delta\phi_n = 0°$ to 4°.

25. The hypoid gear according to claim 24, wherein $\Delta\phi_n = 0°$ to 2°.

* * * * *